(12) United States Patent
Zhang

(10) Patent No.: US 6,873,639 B2
(45) Date of Patent: Mar. 29, 2005

(54) MULTIPASS GEOMETRY AND CONSTRUCTIONS FOR DIODE-PUMPED SOLID-STATE LASERS AND FIBER LASERS, AND FOR OPTICAL AMPLIFIER AND DETECTOR

(76) Inventor: Tong Zhang, 245 S. 800 E., # 6, Salt Lake City, UT (US) 84102

(*) Notice: Subject to any disclaimer, the term of this patent is extended or adjusted under 35 U.S.C. 154(b) by 356 days.

(21) Appl. No.: 10/099,656

(22) Filed: Mar. 15, 2002

(65) Prior Publication Data

US 2002/0105997 A1 Aug. 8, 2002

Related U.S. Application Data

(63) Continuation-in-part of application No. 08/861,247, filed on May 20, 1997, now Pat. No. 6,373,868, which is a continuation-in-part of application No. 08/538,868, filed on Oct. 4, 1995, now abandoned, which is a continuation-in-part of application No. 08/043,006, filed on May 28, 1993, now Pat. No. 5,515,394.

(51) Int. Cl.[7] .............................. H01S 3/08; H01S 3/09
(52) U.S. Cl. .......................................... 372/69; 372/92
(58) Field of Search ........................ 372/39–50, 69–75, 372/92–108

(56) References Cited

U.S. PATENT DOCUMENTS

| 3,307,113 A | * | 2/1967 | Hughes | 359/347 |
|---|---|---|---|---|
| 4,156,852 A | * | 5/1979 | Hagen | 359/348 |
| 4,528,671 A | * | 7/1985 | Robbins | 372/68 |
| 4,555,786 A | * | 11/1985 | Byer | 372/70 |
| 4,809,291 A | | 2/1989 | Byer et al. | 372/75 |
| 4,949,346 A | | 8/1990 | Kuper et al. | 372/36 |
| 4,969,155 A | | 11/1990 | Kahan | 372/70 |
| 5,033,058 A | | 7/1991 | Cabaret et al. | 372/75 |
| 5,103,457 A | | 4/1992 | Wallace et al. | 372/92 |
| 5,285,310 A | * | 2/1994 | Miller et al. | 359/338 |
| 5,307,365 A | | 4/1994 | Stappaerts et al. | 372/72 |
| 5,307,430 A | | 4/1994 | Beach et al. | 385/31 |
| 5,317,585 A | | 5/1994 | Gregor | 372/35 |

(Continued)

OTHER PUBLICATIONS

A.D. Hays and R. Burnham, "High duty–cycle diode–pumped Nd:YLF slab laser", Advanced Solid–State Lasers Conference, Feb. 1–3, 1993, New Orleans, LA.

(Continued)

*Primary Examiner*—Quyen Leung

(57) ABSTRACT

In order to effectively solve thermal distortion problems and obtain high-power $TEM_{00}$-mode operations for DPSS lasers, two major steps are presented in this invention. First, novel multipass pumping approaches and corresponding engineering designs have been developed for slab lasers and thin-disk lasers. They are characterized by using multipass and zig-zag pumping paths and confining pumping beams substantially via total-internal-reflection (TIR) to significantly reduce multiple reflection losses. Second, a zig-zag slab laser in combination with a beam-expanding cavity is employed to realize mode-matching pumping and maximize the energy extraction from laser slabs. It also leads to achieving high-power intracavity frequency conversions over wide spectral ranges and producing red and blue visible lasers with the aid of minimizing spatial hole burning. Besides, the invented optical multipass geometry and TIR-guide constructions can also be utilized for pumping rod lasers, fiber lasers and fiber amplifiers, and for optical amplifiers and optical or spectral detectors.

30 Claims, 32 Drawing Sheets

U.S. PATENT DOCUMENTS

| | | | |
|---|---|---|---|
| 5,349,600 | A | 9/1994 | Shinbori et al. ............... 372/92 |
| 5,351,251 | A | 9/1994 | Hodgson ........................ 372/4 |
| 5,418,880 | A | 5/1995 | Lewis et al. ................. 385/123 |
| 5,533,163 | A | 7/1996 | Muendel ..................... 385/126 |
| 5,553,088 | A | 9/1996 | Brauch et al. ................. 372/34 |
| 5,557,628 | A | 9/1996 | Kuba et al. ................... 372/70 |
| 5,581,573 | A | 12/1996 | Tanuma ........................ 372/72 |
| 5,619,522 | A | 4/1997 | Dube ........................... 372/72 |
| 5,627,849 | A | 5/1997 | Baer ............................ 372/31 |
| 5,636,239 | A | 6/1997 | Bruesselbach et al. ......... 372/70 |
| 5,841,805 | A | 11/1998 | Injeyan et al. ................. 372/69 |
| 5,867,324 | A | 2/1999 | Kmetec et al. ............. 359/625 |
| 5,949,805 | A | 9/1999 | Mordaunt et al. ............ 372/34 |
| 6,055,260 | A | 4/2000 | Byren et al. ................... 372/72 |
| 6,094,297 | A | 7/2000 | Injeyan et al. ............... 359/345 |
| 6,134,258 | A | 10/2000 | Byer et al. ..................... 372/99 |
| 6,222,872 | B1 | 4/2001 | Beach et al. ................. 372/101 |
| 6,256,142 | B1 | 7/2001 | Injeyan et al. ............... 359/345 |
| 6,268,956 | B1 | 7/2001 | Injeyan et al. ............... 359/345 |
| 6,320,889 | B1 | 11/2001 | MacKinnon ................. 372/32 |
| 6,370,297 | B1 | 4/2002 | Hakimi et al. ................. 385/27 |
| 6,418,156 | B1 | 7/2002 | Peressini ..................... 372/66 |

OTHER PUBLICATIONS

T. S. Rutherford, W. M. Tulloch, S. Sinha, and R. L. Byer, "Yb:YAG and Nd:YAG edge–pumped slab lasers" Opt. Lett. 26 (Jul. 2001) 13, 986.

Gregory D. Goodno, Stephen Palese, Joseph Harkenrider, and Hagop Injeyan, "Yb:YAG power oscillator with high brightness and linear polarization", Opt. Lett. 26 (Nov. 1, 2001) 21, 1672.

R. J. Shine, Jr., A. J. Alfrey, and R. L. Byer, "40–W cw, TEM00–mode, diode–laser–pumped, Nd:YAG minature–slab laser", Opt. Lett. 20 (Mar. 1, 1995) 5, 459.

Luis Zapata, Ray Beach and Steve Payne, "Composite thin–disk laser scaleable to 100 kW average power output and beyond", Solid State and Diode Laser Technology Review 2000, Jun. 5–8, 2000, Albuquerque, New Mexico.

Edward F. Stephens and Damian L. Wise, "A ruggedized fiber laser for force protection capabilities", Solid State and Diode Laser Technology Review 2000, Jun. 5–8, 2000, Albuquerque, New Mexico.

Y. Hirano, T. Yanagisawa; S. Ueno, and T. Tajime, O. Uchino, T. Nagai, and C. Nagasawa, "All–solid–state high–power conduction–cooled Nd:YLF rod laser", Opt. Lett. 25 (Aug. 15, 2000) 16, 1168.

Tetsuo Kojima and Koji Yasui, "Efficient diode side–pumping configuration of a Nd:YAG rod laser with a diffusive cavity", Appl. Opt. 36 (Jul. 1997) 21, 4981.

Hee–Jong Moon, Jonghoon Yi, Jaemin Han, Byungheon Cha, and Jongmin Lee "Efficient diffusive reflector–type diode side–pumped Nd:YAG rod laser with an optical slope efficiency of 55%", Appl. Opt. 38 (Mar. 20, 1999) 9, 1772.

Keming Du, Jian Zhang, Michael Quade, Yan Liao, Stephan Falter, Markus Baumann, Peter Loosen, and Reinhart Poprawe, "Nd:YAG 30–W cw laser side pumped by three diode laser bars", Appl. Opt. 37 (Apr. 20, 1998) 12, 2361.

Sungman Lee, Sun Kook Kim, Mijeong Yun, Hyun Su Kim, Byung Heon Cha, and Hee–Jong Moon, "Design and fabrication of a diode–side–pumped Nd:YAG laser with a diffusive optical cavity for 500–W output power", Appl. Opt. 41 (Feb. 20, 2002) 6, 1089.

G. Hollemann, E. Peik, A. Rusch, and H. Walther, "Injection locking of a diode–pumped Nd:YAG laser at 946 nm", Opt. Lett. 20 (Sep. 15, 1995) 18, 1871.

* cited by examiner

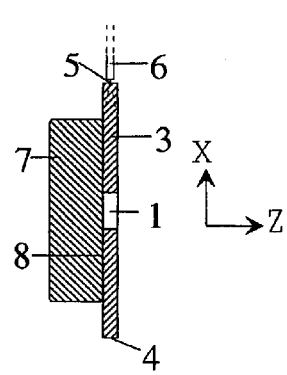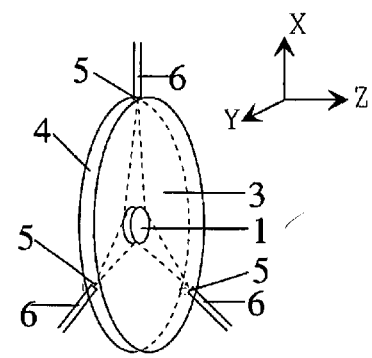
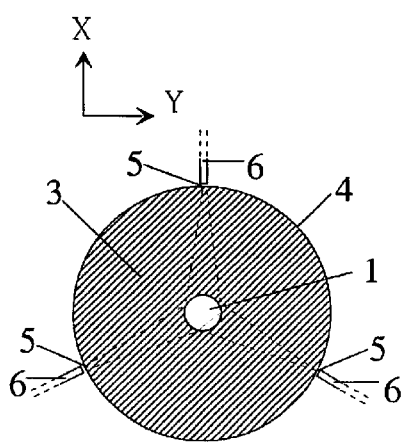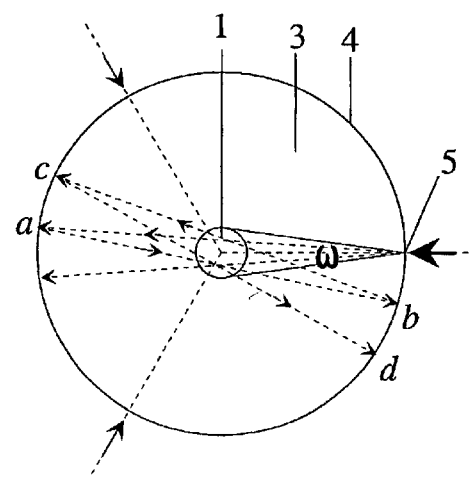
Fig. 1A  Fig. 1B
Fig. 1C  Fig. 1D

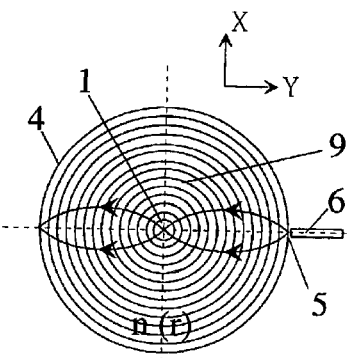
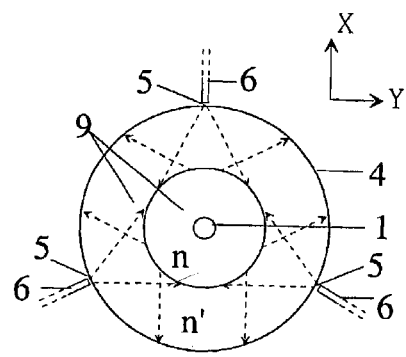
Fig. 1E    Fig. 1F
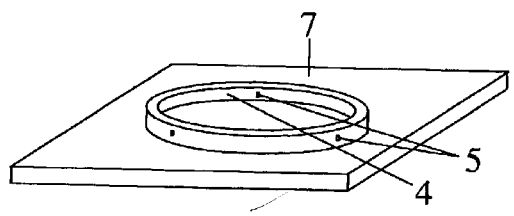
Fig. 1G
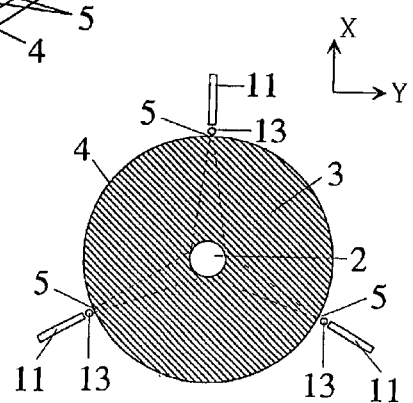
Fig. 2A

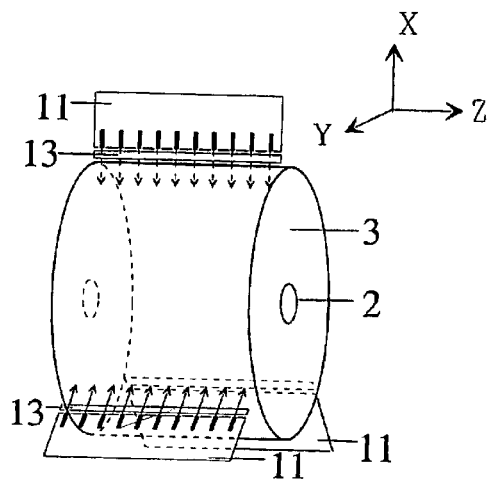
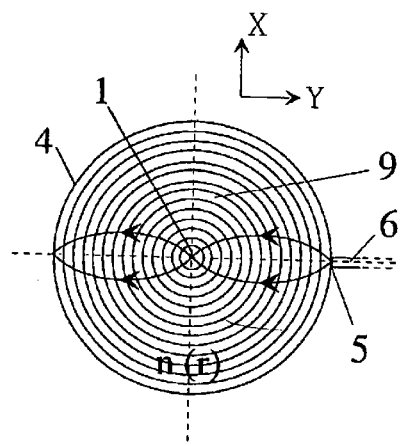
Fig. 2B　　　　　　　　　Fig. 2C
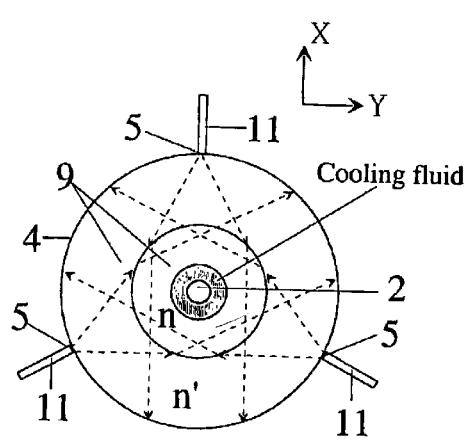
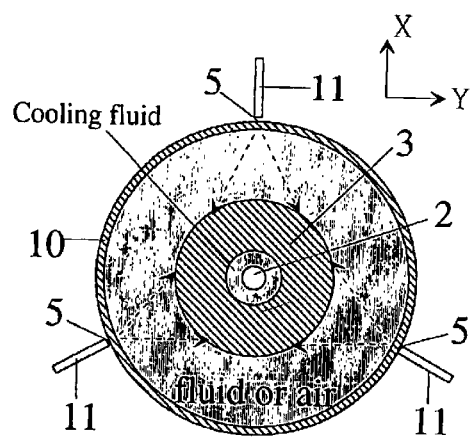
Fig. 2D　　　　　　　　　Fig. 2E

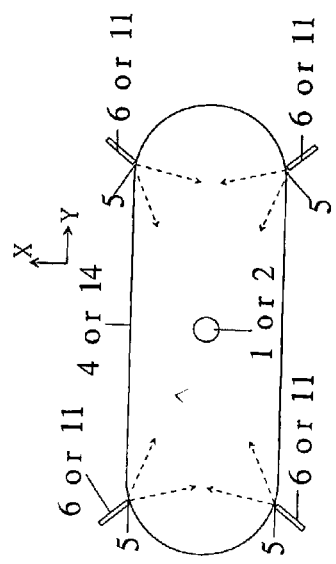

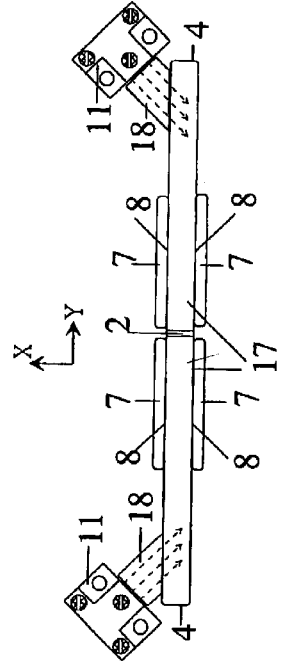
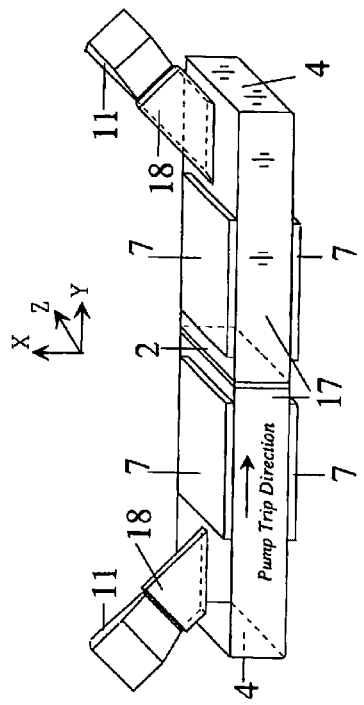
Fig. 5 A
Fig. 5 B
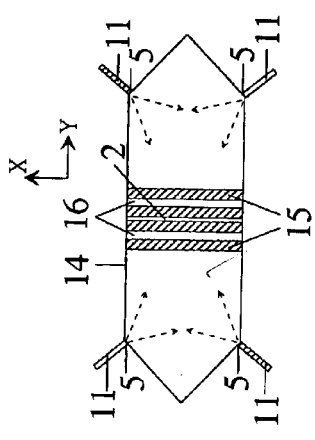
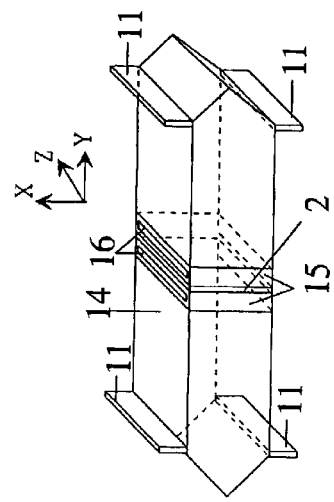
Fig. 4 C
Fig. 4 D

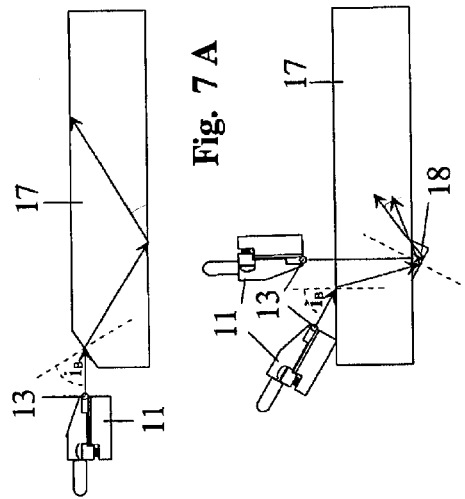
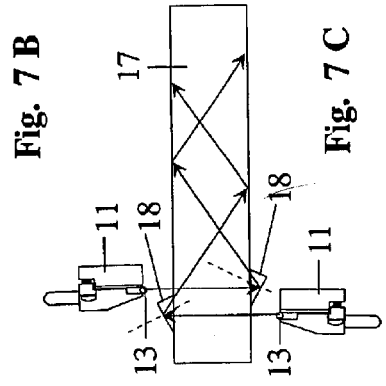
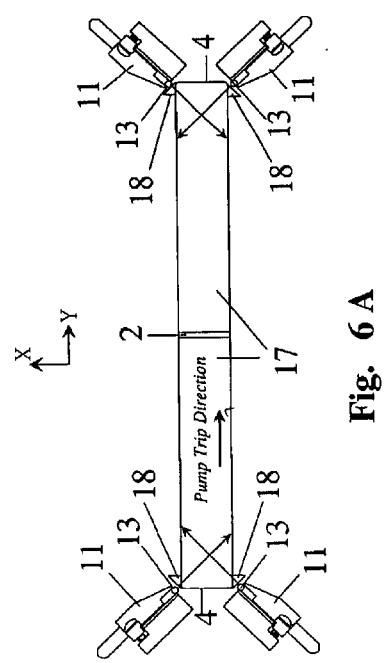
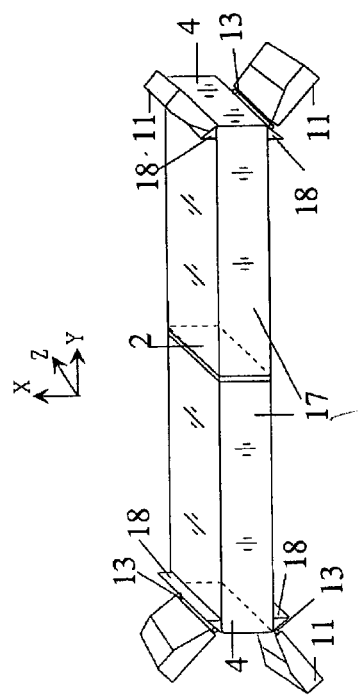
Fig. 7A
Fig. 7B
Fig. 7C
Fig. 6A
Fig. 6B

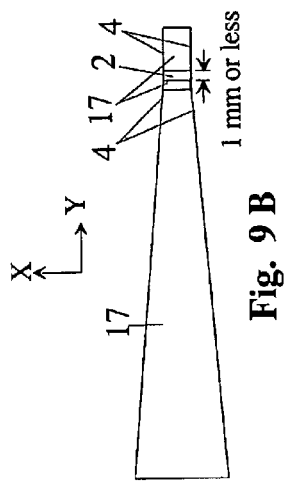
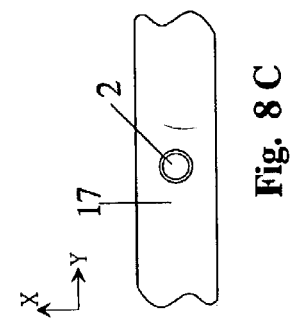
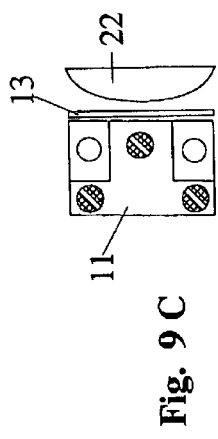
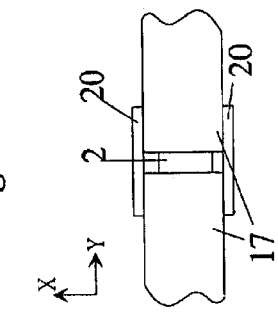
Fig. 9 C
Fig. 9 A
Fig. 9 B
Fig. 8 A
Fig. 8 B
Fig. 8 C

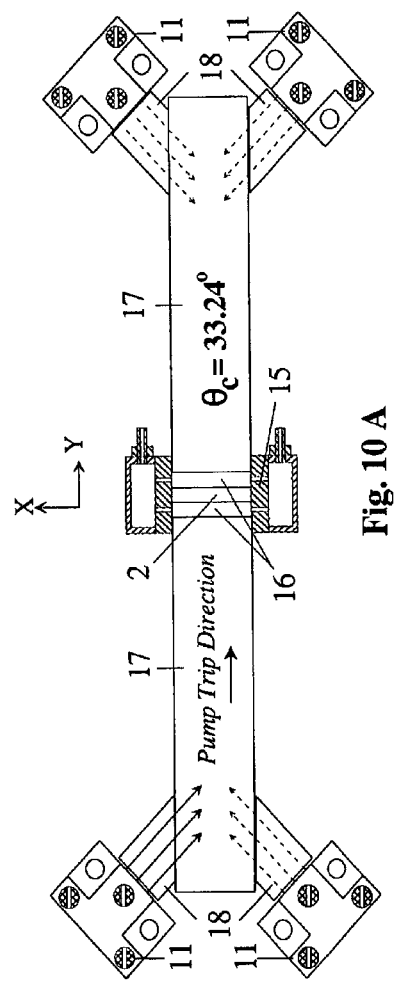
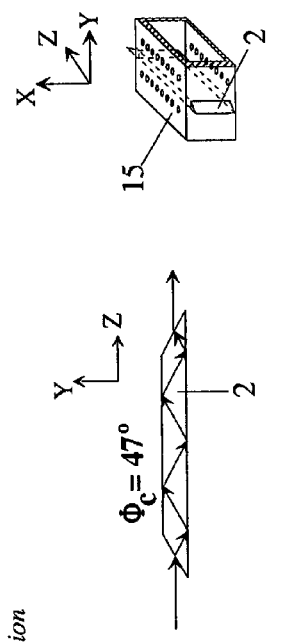
Fig. 10 A
Fig. 10 B
Fig. 10 C
Fig. 10 D

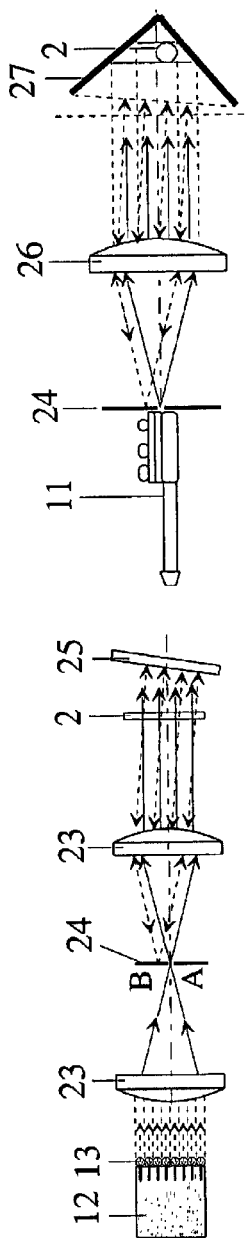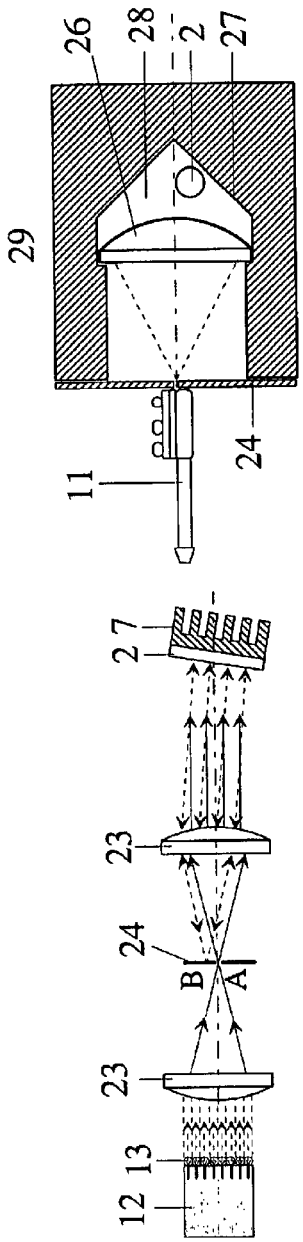

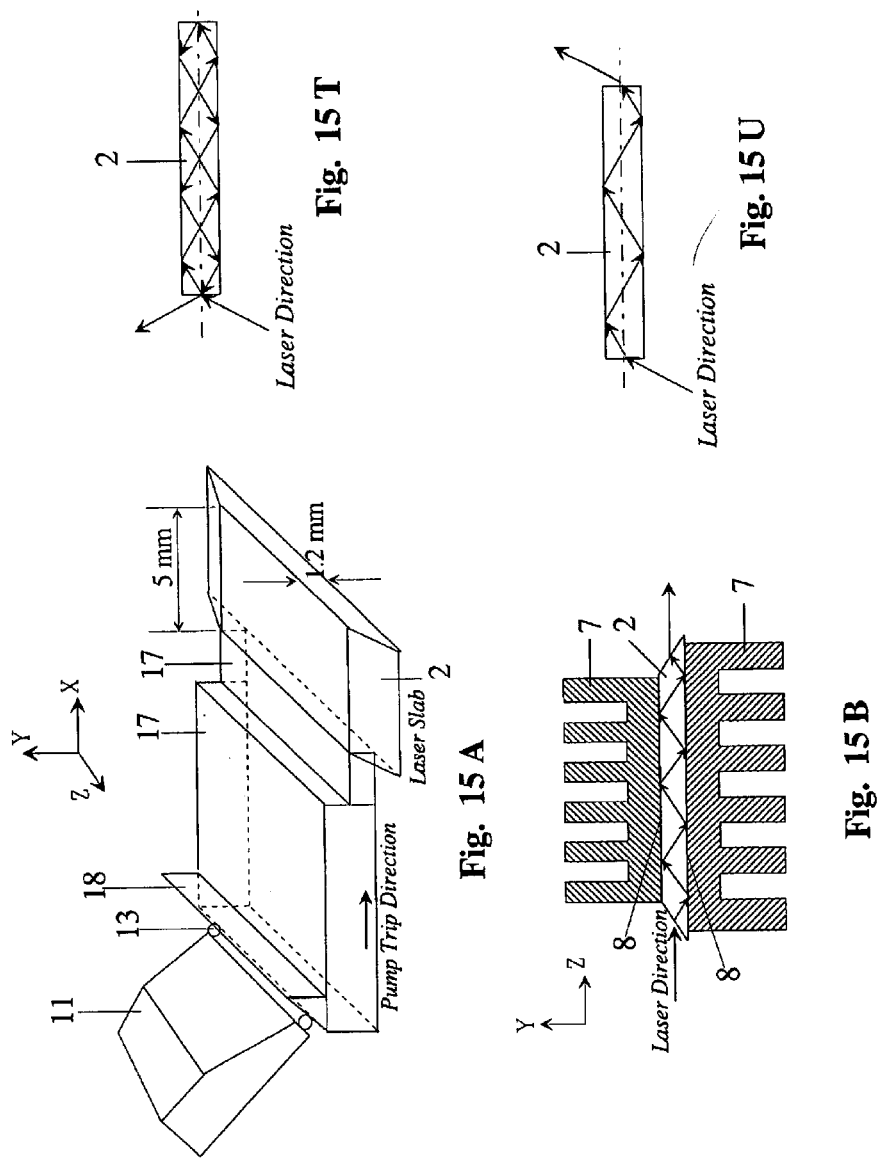

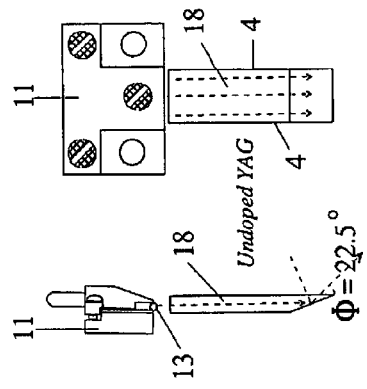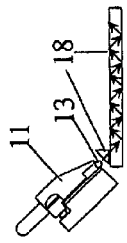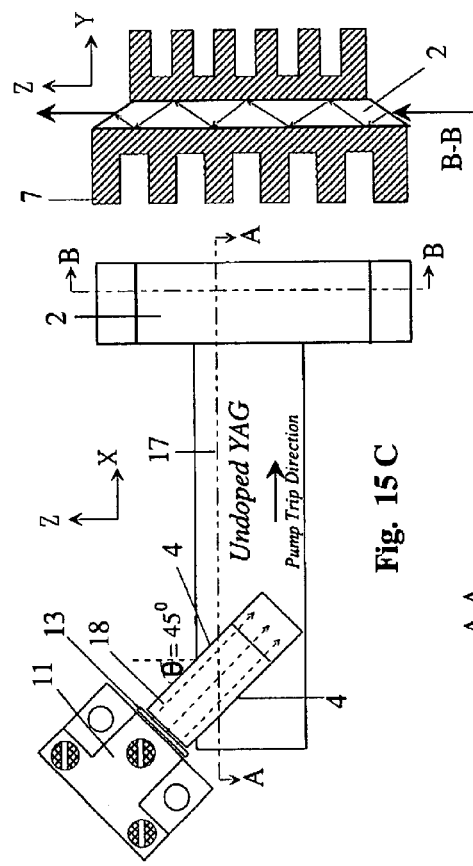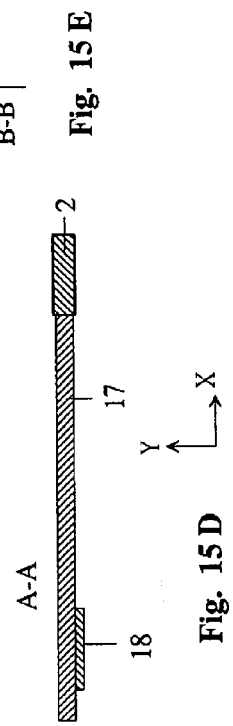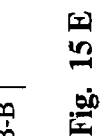

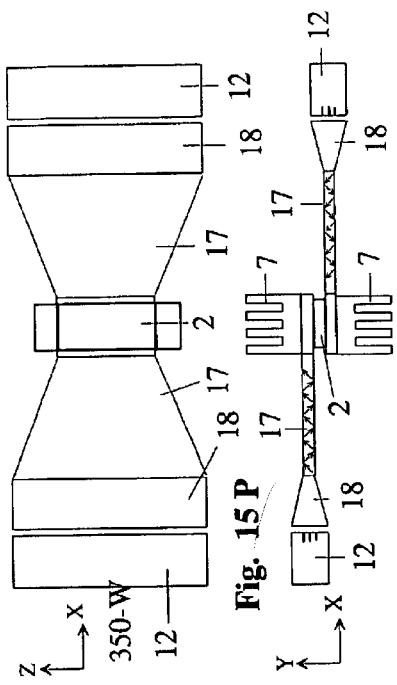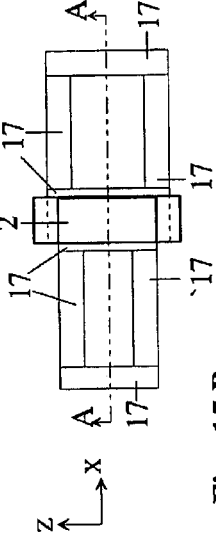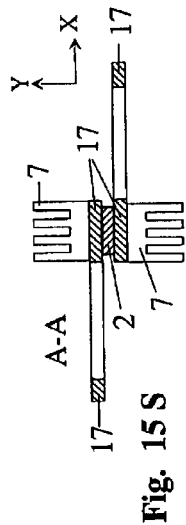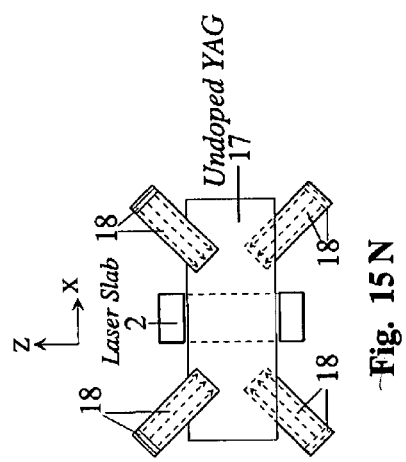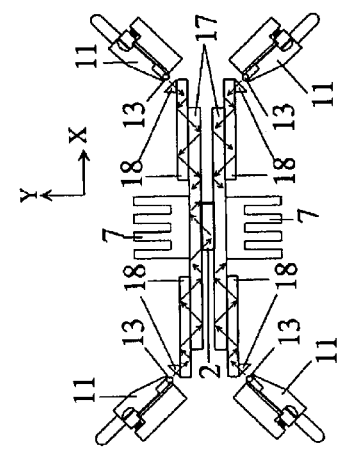
Fig. 15 P  Fig. 15 Q  Fig. 15 R  Fig. 15 S  Fig. 15 N  Fig. 15 O

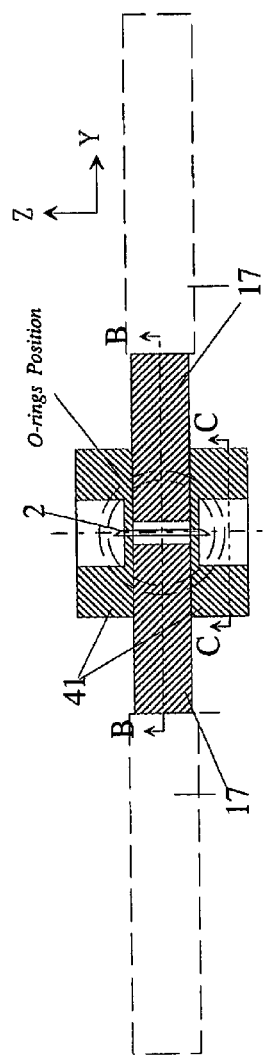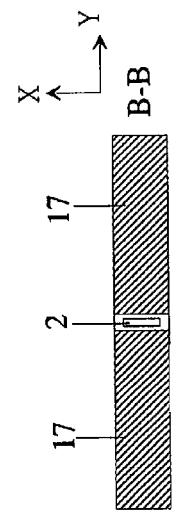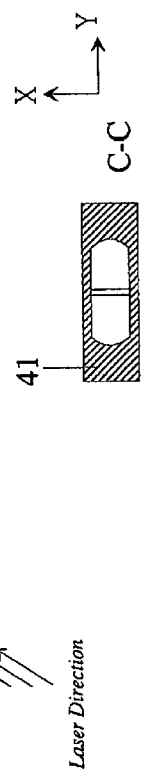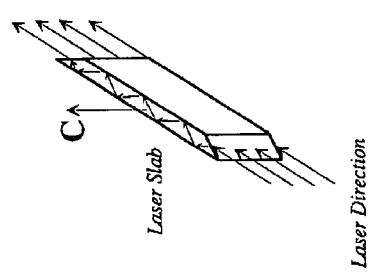
Fig. 16 B
Fig. 16 C
Fig. 16 D

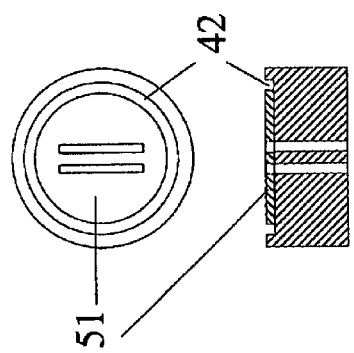
Fig. 16 O
Fig. 16 N
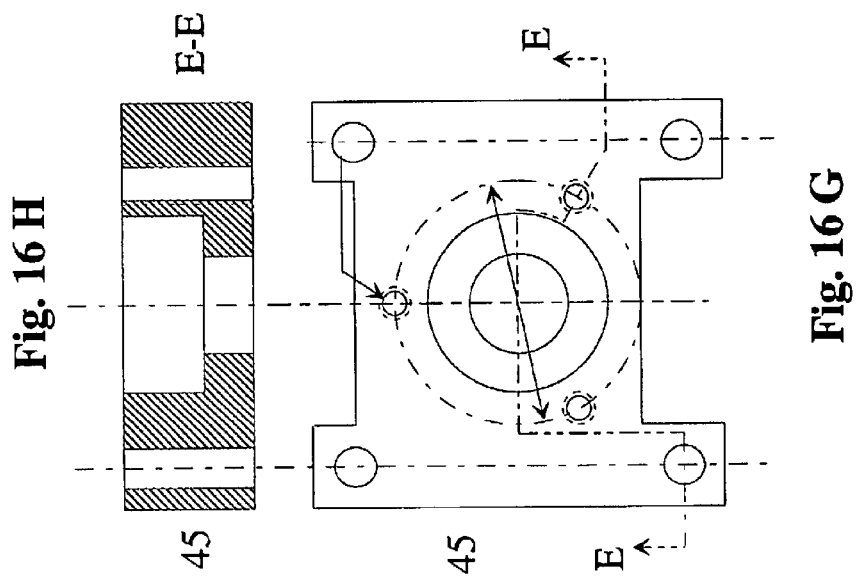
Fig. 16 H
Fig. 16 G

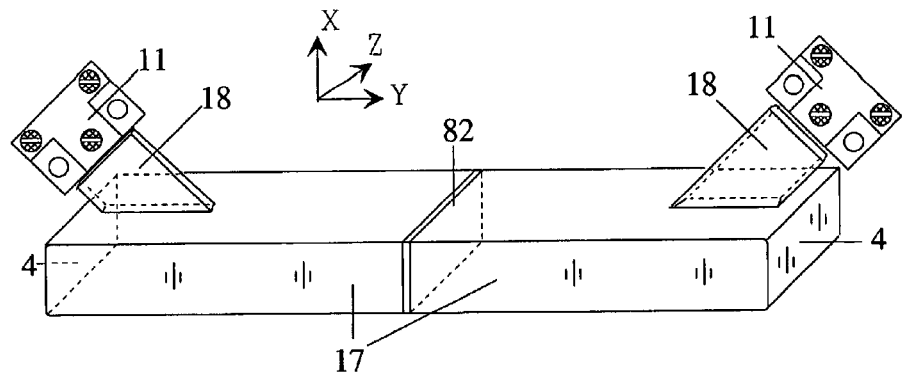
Fig. 19 A
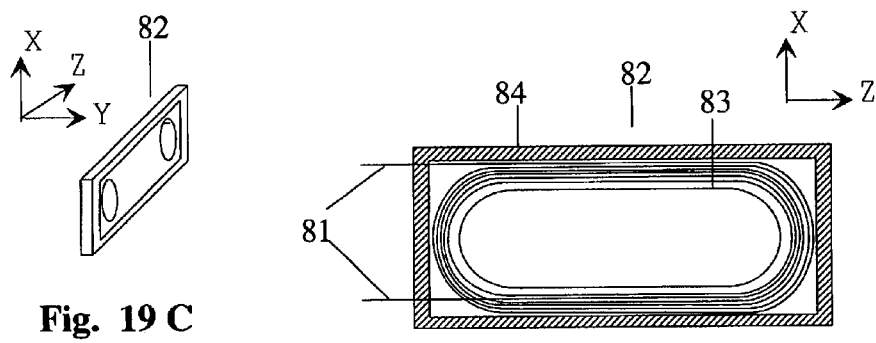
Fig. 19 C
Fig. 19 B
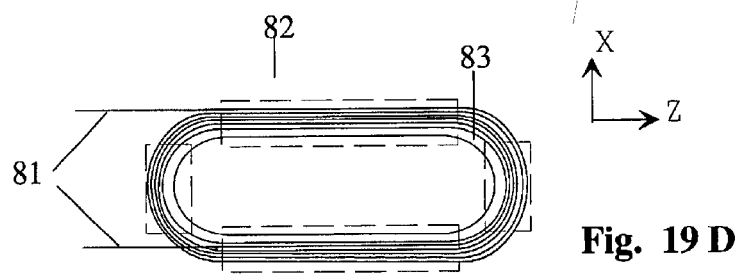
Fig. 19 D

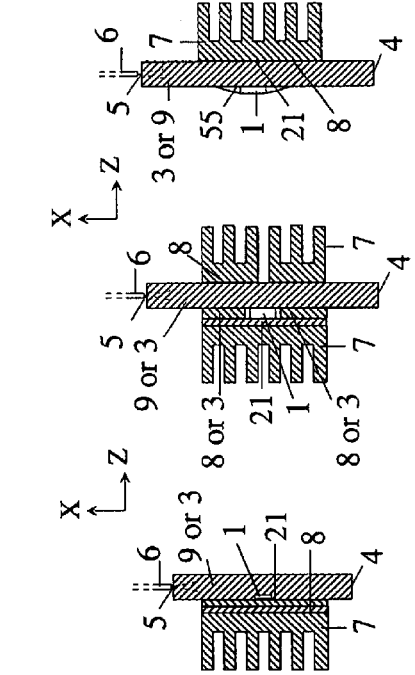
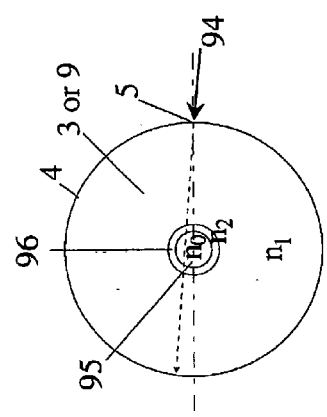
Fig. 21
Fig. 20 A
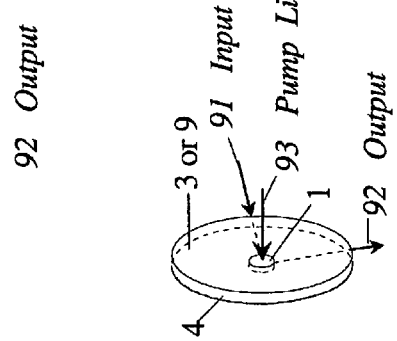
Fig. 20 B
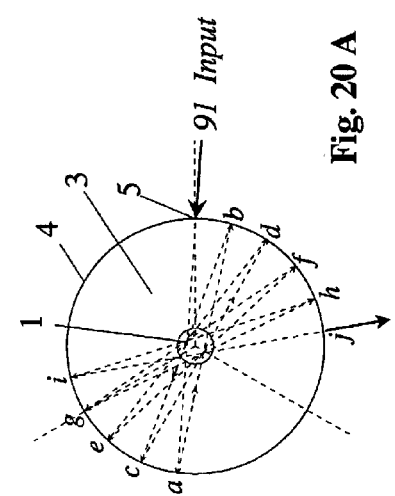
Fig. 22 A   Fig. 22 B   Fig. 22 C

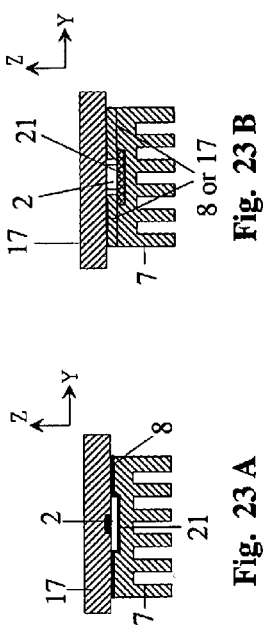
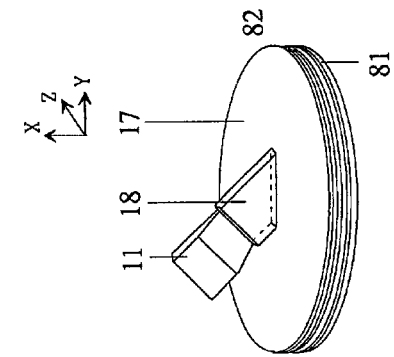
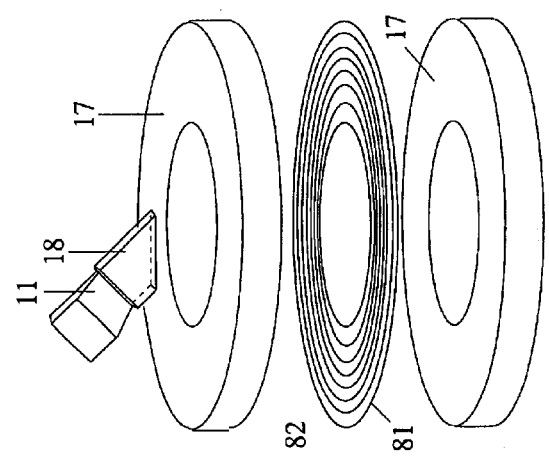
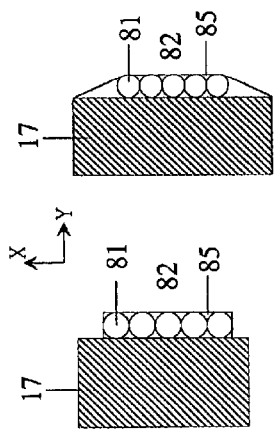
Fig. 23 A
Fig. 23 B
Fig. 24 A
Fig. 24 B
Fig. 24 C
Fig. 24 D

MULTIPASS GEOMETRY AND CONSTRUCTIONS FOR DIODE-PUMPED SOLID-STATE LASERS AND FIBER LASERS, AND FOR OPTICAL AMPLIFIER AND DETECTOR

This is a continuation-in-part of the patent pending of Ser. No. 08/861,247, Filed May 20, 1997, now U.S. Pat. No. 6,373,868, granted 2002, in turn a continuation-in-part of Ser. No. 08/538,868, Filed Oct. 4, 1995, now abandoned after receiving the allowance, in turn a continuation-in-part of Ser. No. 08/043,006, Filed May 28, 1993, now U.S. Pat. No. 5,515,394, granted 96. The former two refer to multipass pumping geometry for diode-pumped solid-state lasers, fiber lasers and optical amplifier; and the latter refers slab lasers and to one-dimensional beam expanding cavity.

FIELD OF INVENTION

This invention relates generally to the field of lasers and, in particular, to pump-cavity design for high power $TEM_{00}$-mode operation and intracavity frequency conversions, and more particularly to using optical multipass geometry and configurations for diode-pumped solid-state lasers and fiber lasers, and for optical amplifiers and detectors.

BACKGROUND OF INVENTION

There are two dominant difficulties for high-power DPSS lasers in the art, particularly for CW, $TEM_{00}$-mode operations. The first issue is the heavy thermal loading management. The second is the intense pumping. These two issues are especially acute for the laser materials of a low stimulated emission cross-section, or for a quasi-3-level system, such as Yb: YAG, Tm: $YVO_4$, Tm,Ho:YAG, Er: glass and minor lasing lines in Nd:YAG and Nd: $YVO_4$, as well as for the tunable laser material Cr: LiSAF with the wing-pumping.

Further, after many years development, the effective and efficient pumping configurations, the key technology for modest-to-high power DPSS lasers, are still very limited. Besides, there is no architecture available in the known prior art which can be used to build modest-to-high power UV DPSS lasers, or to attain high-power operations at the minor laser line, leading to red and blue visible lasers with modest-to-high CW output power.

Briefly stated, the present invention intends to develop effective approaches in order to solve these dominant difficulties. Particularly, novel multipass pumping approach and engineering design have been developed for, thin-disk lasers, slab lasers and rod lasers.

The intense multiply or multipass pumping is employed to generate a uniform pump distribution within laser media so as to minimize thermal aberration and provide high optical gain. They are characterized by using multipass and zig-zag pumping paths and confining pumping beams mainly via total-internal-reflection (TIR) to significantly reduce multiple reflection losses. They will readily allow pump power and pump density, and output power scaling to much higher levels. Their pumping intensity and efficiency are able to compare to the end-pumping scheme.

The corresponding engineering designs for the zig-zag slab laser in solving cooling problems and multiply pumping are completely different with traditional arrangement in the art. They provide stress-free and O-ring-free slab mounting and sealing. They enable an entire slab pumping and cooling from tip to tip with both direct and conductive cooling systems with a zig-zag optical path. They are highly cost-effective and compact. Meanwhile, they provide intense uniform multipass pumping and high-gain aberration-free laser slabs.

A zig-zag slab laser combined with a one-dimensional beam-expanding cavity would enable one to effectively solve thermal distortion problems, obtain $TEM_{00}$-mode operation and maximize the energy extraction from a laser slab. Such combination also leads to achieving high-performances of intracavity harmonic generations and true CW operation over wide spectral ranges, from red to ultra-violet. Further, when some slab-shaped nonlinear crystals and/or Q-switch are inserted to the expanded mode portion of such a laser cavity, the high-power, high-energy operations in the infrared, visible or UV spectra range can be realized. The modest-to-high power UV DPSS laser would become a strong competitor for the eximer laser particularly when some appreciated nonlinear crystal for FHG is available.

Besides, based on achieving intense pumping and high-power $TEM_{00}$-mode operations and with the aid of an additional approach for minimizing spatial hole burning, one is able to realize high-power laser operation at minor lasing lines, leading to generations of CW red and blue visible coherent light with modest-to-high levels of output power for laser display.

One of the key gains of going to diode pumping is reducing thermal loads on the laser rods and the concomitant thermal distortion and fracture. However, thermal loading is still a big area of concern for high power DPSS lasers. In the high-power pumping condition a laser material itself is optically and mechanically distorted by power dissipated as heat. The thermal distortions severely prevent the laser from efficient operation in the $TEM_{00}$ mode. Even for side-pumped lasers, energy distortion can be quite uneven due to the deviation from uniform pump distribution and thermal distortion remains a problem.

In the prior art, the technique with two identically pumped laser rods is commonly used to compensate the birefringence and bifocusing. However, stable operation only can be obtained within a certain pump-power range. It is difficult to correct in a lumped laser rod and to provide massive products. Besides, the disk laser developed by Germany has a complex pump approach and some practical limitations in the cavity arrangements.

A properly designed slab laser with zig-zag path is well suited for reducing undesired thermo-optic effects. However, the related critical design issues and engineering problems are extremely tough in the art. After two decades of development work, the laser community has still not accepted the slab laser. The reasons for that are a number of practical engineering problems which have prevented so far the realization of the potential advantages of the zig-zag slab laser over the rod geometry.

In general, the first problem is low efficiency. The awkward rectangular beam geometry which requires conversion to a circular beam in useful optical applications, combined with the fact that the full width of the slab can usually not be used because of distortions at the edges. The second one is residual distortions. Deformation of the ends and pump faces of the slab due to thermal strain have resulted in beam qualities considerably below expectations. The third problem is high fabrication cost. The very demanding and therefore expensive laser head design are resulted from the complicated mechanical mounting and sealing geometry, and stringent pumping and cooling requirements.

In the prior art, side-pumping geometry puts very stringent requirements on the diode wavelength tolerance with the use of regular laser materials because of the short absorption lengths available. The absorption efficiency is seriously limited. Beam quality can also be negatively impacted because of axially asymmetric gain profiles that can be imprinted on the output beams.

Meanwhile, deviation from uniform pump distribution causes thermally induced optical aberration in laser material. The transmitted and aberration wave front from laser material induces diffraction loss in the resonator. The optical efficiency of the laser is essentially determined by the ratio of round-trip optical loss to optical gain. Compared with the increment of laser gain, proportional to the pump power, the diffraction loss, caused by thermally induced aberration increases more rapidly as the pump power increases. The optical efficiency decreases relative to the pump power, and consequently the output power is limited.

The multipass pumping approach can be employed to obtain uniform pump distribution in laser materials. However, it is vital in practice to obtain a high reflectivity in order to ensure the successful multi-reflecting pump process. In this process, the pumping beams are multiply reflected and multipass through the gain medium repetitively until they are completely absorbed. The angles of incidence of the pumping beams within the pump cavity usually vary and spread widely. And the pumping beams commonly need more than tens or a few tens of reflections for pumping. With conventional multilayer dielectric coatings, the reflectance is very sensitive to the incident angle. Meanwhile, the reflectivity of the metallic coatings such as gold or silver drops dramatically at large incident angles.

SUMMARY OF THE INVENTION

Concurrently, the objects of the present invention are presented as follows.

The major object of the invention is to develop novel multipass pumping approaches and engineering designs for DPSS lasers, particularly for DPSS slab lasers and thin-disk lasers, in order to effectively solve thermal distortion problems and obtain high-power $TEM_{00}$-mode operations for DPSS lasers. These multipass pumping approaches are capable of generating an intense uniform pump distribution to minimize thermal aberration. The $TEM_{00}$-mode operation is the priority of efficient cw-mode intracavity frequency conversions.

Consequently, it is also the major object of the invention is to provide an arrangement in which a zig-zag laser slab is combined with multiply pumping and a one-dimensional beam-expanding cavity. This combination is capable of employing a laser slab with a large aspect ratio of its height to its thickness, and effectively solving thermal distortion problems, obtaining $TEM_{00}$-mode operation and all-out energy extraction from a laser slab in high power DPSS lasers. It leads to achieving high-performances of intracavity harmonic generations and true cw-mode operations over wide spectral ranges, from red, blue to ultraviolet. Further, when some slab-shaped nonlinear crystals and/or Q-switch are inserted to the expanded mode portion of such a cavity, the extra-high power/energy operations with SHG or high order harmonic generations can be obtained. Meanwhile, a white DPSS laser or multi-wavelength DPSS laser can be produced with the use of this configuration.

Accordingly, a further object of the invention is to provide some innovative and practicable engineering designs for the highly compact zig-zag slab laser in solving cooling issues and constructing a multipass pump head with zig-zag pumping path. It provides stress-free or O-ring-free slab mounting and sealing. It enables an entire slab cooling from tip to tip with both direct and conductive cooling systems with zig-zag laser path. It is highly cost-effective and compact. Meanwhile, it provides intense uniform multipass pumping and high-gain aberration-free laser slabs. The pumping intensity and efficiency are able to compare to the end-pumping scheme.

Based on achieving intense pumping and high-power $TEM_{00}$-mode operations, a further major object of the invention is to realize high-power laser operation at minor lasing lines, such as that at 1313 or 914 nm, leading to generations of CW red and blue visible coherent light with modest-to-high levels of output power.

A further object of the invention is to provide the simplest pump approach for thin-disk lasers, i.e., the multipass TIR-guide disk pump head, such as the step-index TIR-guide disk pump head for pumping laser chips. They are able to produce a thin gain zone, maximize the absorption and concentrate pumping power. The thin gain zone is able to minimize or eliminates the spatial hole-burning effect in laser operations.

Another further object of the invention is to provide several novel optical multipass geometry and constructions in order to achieve effective and efficient uniform pumping. They are much better and simpler than others and characterized by a broad pump angular acceptance, so that diode bars can directly be coupled for pumping without a coupling optics or collimating lens. Those approaches include i) TIR-guide configuration, ii) noncircular profile reflector, such as noncircular-profile corner reflector pump head for pumping laser rods, and iii) the graded-index or step-index structure, such as hollow step-index reflector pump head for pumping laser rods.

A still further further object of the invention is to construct a multipass TIR-guide pump head by use of total-internal-reflection in order to substantially reduce the reflection losses. (TIR is the abbreviation for Total-Internal-Reflection)

Accordingly, a further object of the invention is to provide an approach by use of interposing a metal foil or metalized mirror surface to preserve TIR for an optical surface from the so-called "frustrated total-internal-reflection" when it is contacted with other substances.

Another object of the invention is to provide highly cost-effective pump approaches, including non-fiber-optic-coupling pump approaches, for DPSS lasers and fiber lasers, particularly to those with high power operations.

Yet, another object of the invention is to provide a novel approach by use of a beam guide input coupler to couple the collimated or uncollimated pumping beams from diode bars into a TIR-guide pump head in order to meet the need for total internal-reflection and pumping.

Another object of the invention, based on those pump methods relative to TIR-guide disk pump heads at the present invention, is to develop multipass pumping approaches for pumping laser rods or slabs, or even for pumping optical fibers with rare-earth dopants. Particularly, it can be used to directly pump high-power fiber lasers and fiber amplifiers with diode bars.

Yet, another object of the invention is to provide a novel multipass optical-amplifier design in accordance with the present optical multipass geometry and TIR-guide disk construction.

Also it is the object of the invention is to a multipass laser intensified detector for optical or spectral detection, including particle detection, in accordance with the present optical multipass geometry and TIR-guide disk constructions.

This CIP patent application also is a divisional application. In order to maintain the original arrangement, facilitate rewriting, identify the priority and what is the newly developed designs, therefore, the organization and context of the following material may not be optimized as they should be.

DESCRIPTION OF THE DRAWINGS

In the drawings, closely related figures have the same number but different alphabetic suffixes. As to the XYZ directions presented in the figures where a laser cavity could be involved, the Z direction is always along and the XY plane is always perpendicular to the optical axis of the laser cavity, respectively. All the drawings are presented with the schematic diagram for illustrative purposes.

FIGS. 1A, 1B and 1C outline a TIR-Guide Disk Pump Head for pumping a laser chip surrounded by a pump cladding, which is directly mounted onto an actively cooled heat sink and pumped by fiber bundles from three directions. This is one of the basic pump embodiments in accordance with the present invention.

FIG. 1D is a geometric optics illustration for FIGS. 1A–B. The multi-reflected pump light repeatedly passes through a gain medium at the center of a TIR-guide disk.

FIG. 1E is the side sectional view of a Graded-Index TIR-Guide Disk Pump Head in the case of 3-side pumping similar to FIGS. 1A–C, in which a solid-state laser chip is surrounded by a graded-index pump cladding.

FIG. 1F is the side sectional view of a Step-Index TIR-Guide Disk Pump Head in the case of 3-side pumping similar to FIGS. 1A–C, in which a solid-state laser chip is surrounded by a step-index pump cladding. This is one of the important pump embodiments in accordance with the present invention.

FIG. 1G shows a heat sink chamber for retaining the disk.

FIGS. 2A and 2B are, respectively, the side sectional and perspective views of a Cylinder Reflector Pump Head with a multipass pumping geometry for pumping a regular solid-state laser rod surrounded by a pump cladding pumped by three linear array laser diode bars from three directions.

FIG. 2C is the side sectional view of a Graded-Index Cylinder Reflector Pump Head in the case of 3-side pumping similar to FIGS. 2A–B, in which a regular solid-state laser rod is surrounded by a graded-index pump cladding instead of a regular one. The cooling parts are not shown for simplicity.

FIG. 2D is the side sectional view of a Step-Index Cylinder Reflector Pump Head in the case of 3-side pumping similar to FIGS. 2A–B. A solid-state laser rod is surrounded by a cooling channel and then received in by a step-index pump cladding instead of a regular one.

FIG. 2E is the side sectional view of a Hollow Step-Index Cylinder Reflector Pump Head with a cylindrical envelope in the case of 3-side pumping similar to FIGS. 2A–B. A solid-state laser rod is surrounded by a cooling channel and then received in by a regular pump cladding. A fluid with a proper refractive index is filled to provide the step-index structure. This is one of the important pump embodiments in accordance with the present invention.

FIG. 3A is the side sectional view of the pump head with a noncircular-profile reflector in the shape of a rounded rectangle in the case of 4-side pumping. It shows the cross-section of either a TIR-guide disk pump head with fiber pumping similar to that shown in FIGS. 1A–C, or a regular pump head used for pumping a laser rod with diode bars similar to that shown in FIGS. 2A–E.

FIG. 3B is a hollow or solid Noncircular-Profile Reflector Pump Head used for pumping a laser rod with four linear array laser diode bars.

FIGS. 4A–B are a Solid Noncircular-Profile Reflector Pump Head used for pumping a laser slab with four linear array laser diode bars; in which the reflector is solid and made from pump cladding with outside coating.

FIGS. 4C–D are, respectively, the side sectional and perspective views of a Hollow Noncircular-Profile Reflector Pump Head used for pumping a laser slab with four linear array laser diode bars, in which the reflector is made from a hollow envelope. The laser slab is sandwiched between two cooling channel blocks which provide coolant passages for cooling.

FIG. 4E is a TIR-guide planar pump head used for pumping a regular laser rod.

FIGS. 6A–B are a TIR-guide planar pump head used for pumping a laser slab with four linear array laser diode bars. The pumping beams, before entering via a prism coupler, are collimated by a collimating lens, so that the angles of incidence of the pumping beams within a optical plate, i.e., TIR-guide optical duct, distribute over a small range, leading to a satisfaction for total-internal-reflection.

FIGS. 7A–C show some alternative approaches to input pumping beams and input those combined pumping beams that come from multiple diode bars. $I_B$ is a Brewster angle.

FIGS. 8A and 8B both show a part of a TIR-guide planar pump head, in which the size of the pumping region or the laser slab along the X dimension is smaller than that of the optical duct.

FIG. 8C shows a part of a TIR-guide planar pump head, in which a laser rod replaces the laser slab.

FIGS. 9A–C illustrate another important variant of the multipass planar TIR-guide pump head, in which a thin, tapered, planar optical duct is devised to provide a restricted, line-shaped pumping region. This is one of the important pump embodiments in accordance with the present invention.

FIGS. 10A–D give a schematic diagram of a TIR-guide pump head with the Direct Cooling Approach for a zig-zag laser slab.

FIGS. 11A–B and FIGS. 12A–B illustrate another architecture of multipass pumping geometry which is characterized by using a spatial filter and the like.

Meanwhile, FIGS. 12A–B provide a combination between the case shown in FIGS. 11A–B and a corner reflector. Further, FIG. 12B shows a Noncircular-Profile Corner Reflector Pump Head. This is one of the important pump embodiments in accordance with the present invention.

FIGS. 14A–D and FIGS. 15A–U illustrate some further simplified configurations for slab laser pump heads. They are the key pump embodiments in accordance with the present invention and distinguished by a zig-zag pumping path.

FIGS. 14A–B and FIGS. 14C–D show two similar TIR-guide pump head for pumping laser slabs. The pump surface is the major surface of the laser slab. The pump trip direction is perpendicular to the pump surface—the interface between the laser slab and optical duct.

FIGS. 15A–15B show a laser slab TIR-guide pump head sandwiched between two heat sinks. The pump surface is the minor surface of a laser slab. The pump trip direction is perpendicular to the pump surface—the interface between the laser slab and optical duct.

FIGS. 15C–G show laser slab TIR-guide pump head sandwiched between two heat sinks, varied from that shown in FIGS. 15A–B. The pump surface is the minor surface of a laser slab. The pump trip direction is perpendicular to the pump surface—the interface between the laser slab and optical duct. Here an unique input coupler and pump arrangement is employed. The relevant input coupler and diode bar are shown in FIGS. 15F–G. Furthermore, FIG. 15H shows an input setup denoted as Double Input Coupler.

Several similar arrangements for the face-pumped laser slab sandwiched between two heat sinks are shown in FIGS. 15I–J, FIGS. 15K–M, FIGS. 15N–O, FIGS. 15P–Q and FIGS. 15R–S.

FIGS. 15I–J and FIGS. 15K–M show two laser slab TIR-guide pump head sandwiched between two heat sinks with face-pumping, varied from those shown in FIGS. 15A–B and 15C–E. The pump surface is the major surface of the laser slab. The pump trip direction is parallel to the pump surface—the interface between the laser slab and optical duct.

FIGS. 15N–O, FIGS. 15P–Q and FIGS. 15R–S outline some advanced face-pumping arrangements similar to that shown in FIGS. 15I–J and FIGS. 15K–M, in which a laser slab with a protective coating is sandwiched between two pieces of thin planar optical duct first, then two heat sinks symmetrically.

FIG. 15T and FIG. 15U show two similar square-cut designs for laser slabs with a zig-zag lasing path.

FIGS. 16A–P and FIGS. 17A–G illustrate two similar schematic diagrams of the engineering design for the prototype of the multipass planar TIR-guide pump head with coolant cooling, and particularly for high power operations. They are the important pump embodiments in accordance with the present invention.

FIG. 16A shows a pump head module. FIGS. 16B–D show a laser slab assembly. FIGS. 16E–F show a lower cover plate. FIGS. 16G–H and FIGS. N–O show upper cover plate and the design for a Samarium glass mirror. FIGS. 16I–K show a laser slab holder. FIGS. 16L–M show a plenum cover. FIG. 16P shows a perspective, exploded view of the pump head module.

FIG. 17A shows a pump head module. FIGS. 17B–C show a laser slab assembly. FIGS. 17D–E show a lower cover plate. FIGS. 17F–G show upper cover plate.

Figure 18:
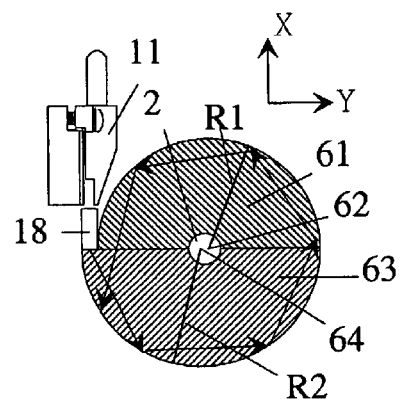
Figure 18:
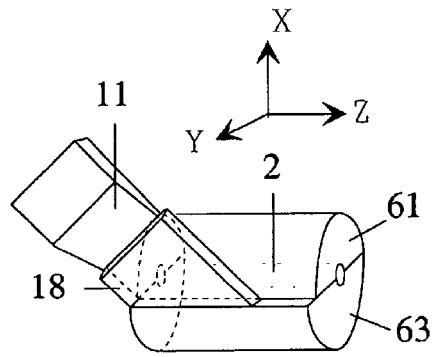
Figure 18:
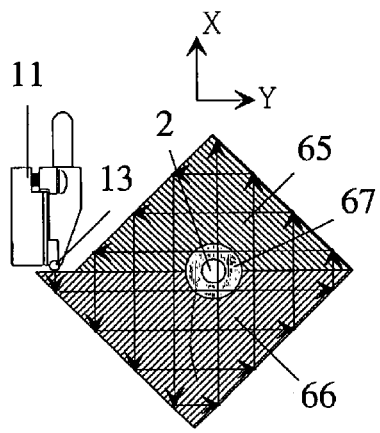
Figure 18:
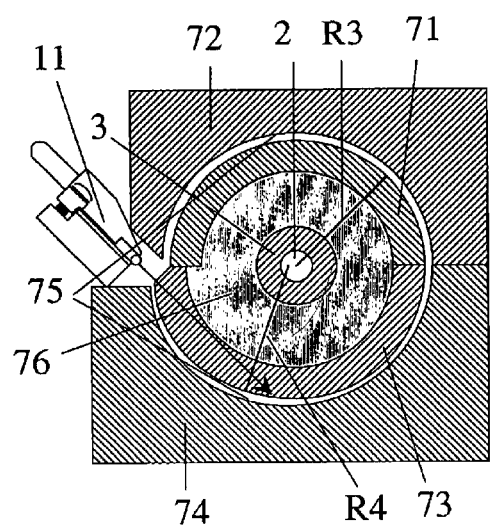

FIGS. 18A–B show the First Dube TIR-Guide Pump Head.

FIG. 18C shows the side sectional view of the Second Dube TIR-Guide Pump Head.

FIG. 18D shows the side sectional view of the Dube Step-Index Double-Layer Reflector Pump Head.

Figure 5:
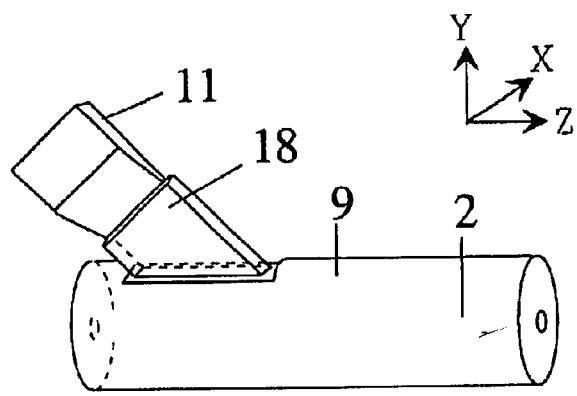
FIGS. 5A–B illustrate a TIR-Guide Planar Pump Head used for pumping a laser slab with two linear array laser diode bars, in which input coupler is such orientated so as to enable the pumping beams to comply with Total-Internal-Reflection (TIR) condition and, meanwhile, to keep the lowest escape loss. This is one of the basic pump embodiments in accordance with the present invention.
FIG. 5C is a TIR-Guide Cylinder Pump Head used for pumping a laser rod which is surrounded by the graded-or step-index pump cladding.
FIG. 5D illustrates a TIR-guide cylinder pump head used for pumping a regular laser rod. A laser rod is eccentrically located inside of a cylinder-shaped regular optical duct.
Figure 5:
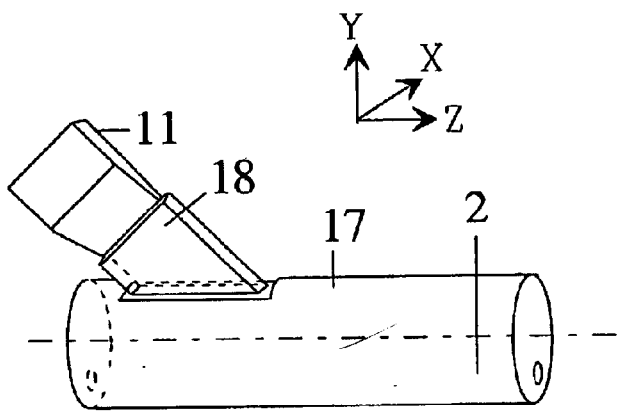
Figure 5:
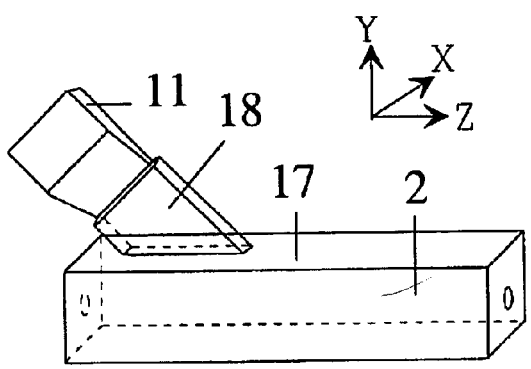
Figure 13:
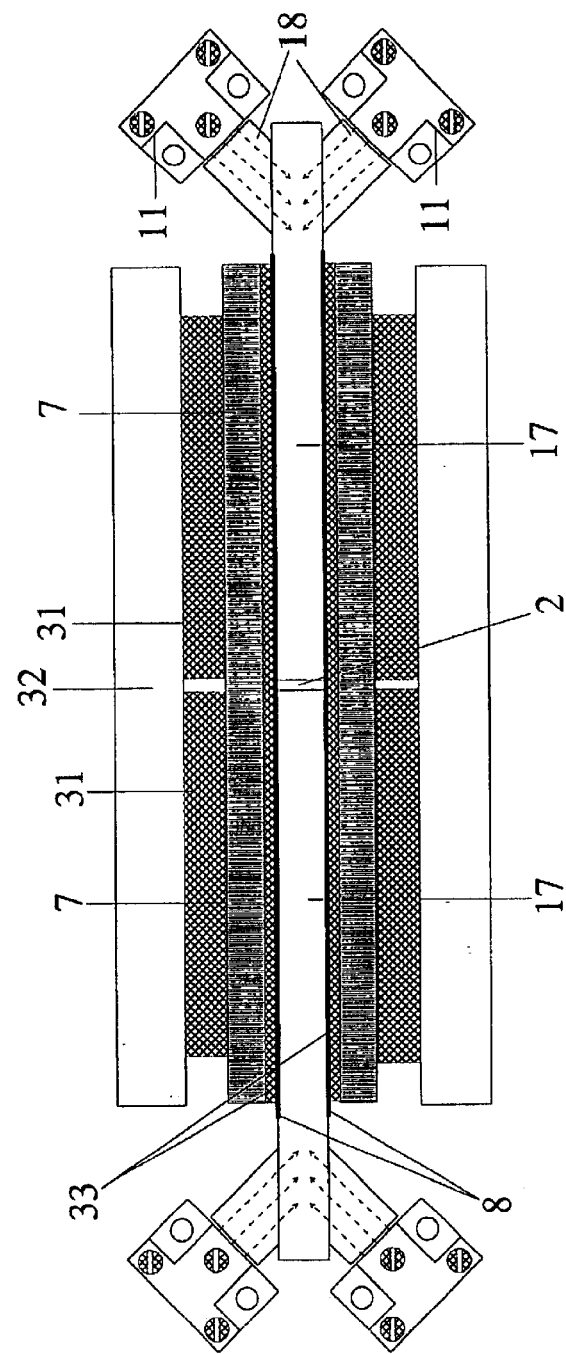
FIG. 13A illustrates a schematic diagram of an engineering design for the TIR-guide pump head with the Indirect Cooling Approach.
In FIGS. 13B–C, two MgF$_2$ windows are interposed between optical ducts and a laser slab to preserve the TIR.
Figure 13:
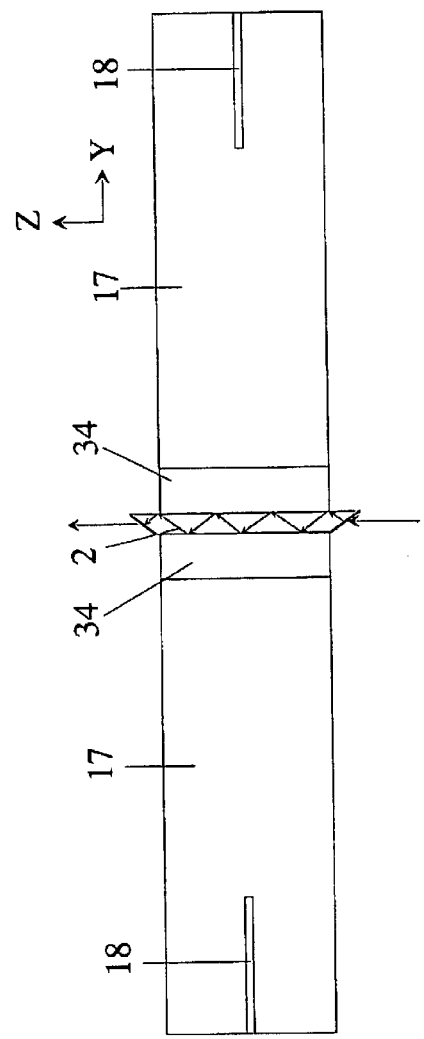
Figure 13:
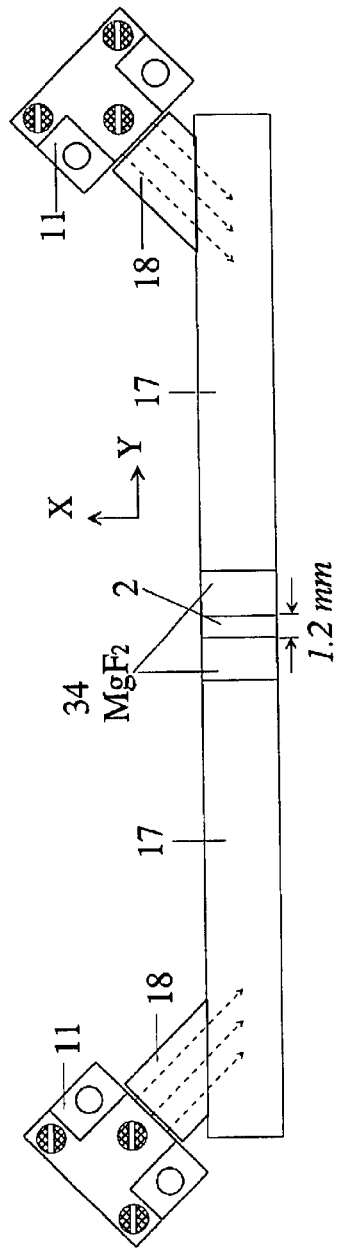

FIGS. 19A–C illustrate a pump arrangement that provides multipass side-pumping for pumping optical fibers with a rare-earth-doped core. It is used for fiber lasers and fiber amplifiers. FIGS. 19B or D, and 19C respectively are the side and perspective views of a fiber assembly. This pump arrangement is identical to that shown in FIGS. 5A–B, except that the laser slab is replaced by a fiber assembly. This is one of the pump embodiments for pumping optical fibers in accordance with the present invention.

FIGS. 20A–B show the Multipass Optical Amplifier configuration varied from the TIR-guide disk pump head.

FIG. 20A shows a multipass geometrical path of an input signal being amplified within a TIR-guide disk.

FIG. 20B is the perspective view of a multipass optical amplifier.

FIG. 21 shows a Multipass Laser Intensified Detector for optical or spectral detection, including particle detection.

FIGS. 22A, 22B and 22C show the TIR-guide pump heads similar to that shown in FIGS. 1A–F, except that the laser chip is extra-thin and being integrated to or embedded within a pump cladding. They are the important pump embodiments in accordance with the present invention.

FIGS. 23A and 23B show part of TIR-guide pump heads, almost same as that shown in FIGS. 9A–B and varied from FIGS. 22A–C, in which a laser slab is extra-thin and being integrated to or embedded within a heat sink and optical duct. They are the important pump embodiments in accordance with the present invention.

FIG. 24A shows a TIR-guide pump head that provides multipass pumping for pumping fiber lasers or fiber amplifiers. A rare-earth-doped fiber is being winded wrap by wrap in the same plane to form a ring-shaped fiber assembly. It is the important embodiment for pumping optical fibers in accordance with the present invention.

FIGS. 24B–D show a TIR-guide pump head for pumping fiber lasers or fiber amplifiers. A rare-earth-doped fiber is directly winded onto the outer surface of a disk-shaped optical duct.

Figure 25:
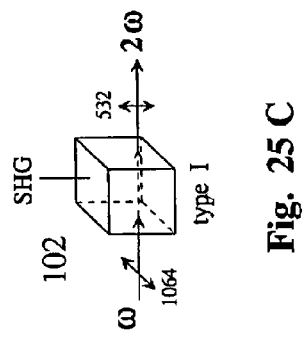
Figure 25:
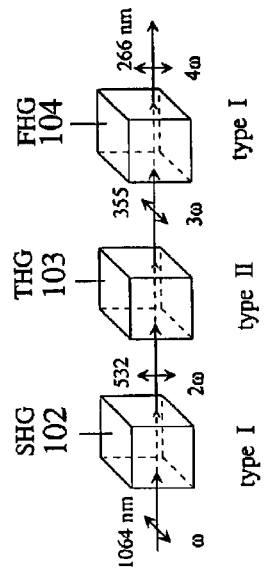
Figure 25:
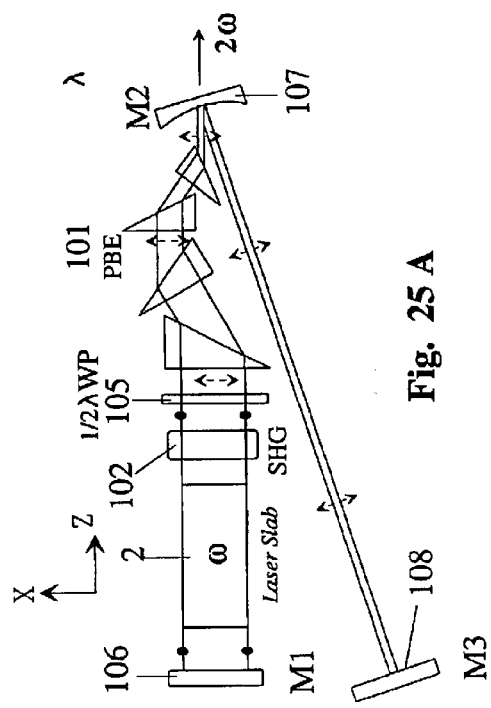
Figure 25:
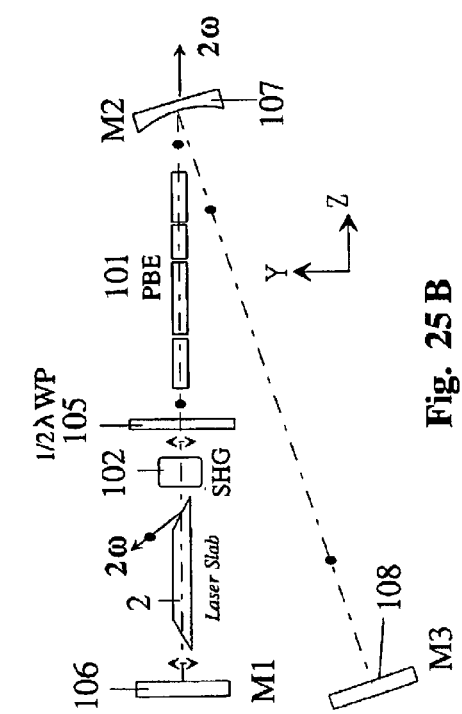

FIGS. 25A–B show a slab laser arrangement for extra-high-power harmonic generations and extra-high-energy Q-switch operations. FIG. 25C shows a nonlinear crystal for SHG. FIG. 25D shows three nonlinear crystals positioned serially for FHG.

| REFERENCE NUMERALS IN DRAWINGS | |
|---|---|
| 1 | solid-state laser chip |
| 2 | solid-state laser rod/bar/slab |
| 3 | pump cladding/optical duct |
| 4 | gold coating or HR coating on the surface at pump wavelength |
| 5 | slit/pumping beam entrance/stripe entrance/ spectral opening/injection port |
| 6 | fiber bundle |
| 7 | heat removal block/TE cooler/heat sink |
| 8 | metal foil/aluminum foil/indium foil |
| 9 | pump cladding/optical duct with graded- or step-index |
| 10 | cylinder reflector at pump wavelength |
| 11 | linear array laser diode bar |
| 12 | 2-D stacked diode bar |

-continued

REFERENCE NUMERALS IN DRAWINGS

| | |
|---|---|
| 13 | collimating lens/rod lens/cylindrical fiber lens |
| 14 | noncircular reflector |
| 15 | coolant channel block |
| 16 | coolant passage |
| 17 | optical duct/TIR-guide optical duct |
| 18 | input coupler |
| 19 | HR coating at pump wavelength |
| 20 | gap plate/mirror at pump wavelength |
| 21 | HR mirror/HR coating/mirrored surface/copper mirror with a gold coating/metalized mirror at laser wavelength |
| 22 | Lens duct cap |
| 23 | lens pair |
| 24 | aperture with HR coated beam block |
| 25 | HR mirror at pump wavelength |
| 26 | cylindrical collimating lens |
| 27 | corner reflector |
| 28 | cooling water |
| 29 | noncircular-profile corner reflector |
| 31 | TE coolers |
| 32 | heat exchanger |
| 33 | heat spreader |
| 34 | $MgF_2$ window |
| 41 | holder/slab retainer |
| 42 | 0-ring's groove |
| 43 | insulator |
| 44 | lower cover plate |
| 45 | upper cover plate |
| 46 | O-ring |
| 47 | plenum |
| 48 | inlet/outlet |
| 49 | coolant passage/slot |
| 50 | HR coating at pump wavelength |
| 51 | Samarium glass mirror |
| 52 | fixer |
| 53 | lower cover plate |
| 54 | upper cover plate |
| 55 | high-temperature optical cement |
| 61 | upper optical duct with radius R1 |
| 62 | center of 61 |
| 63 | lower optical duct with radius R2 |
| 64 | center of 63 |
| 65 | upper optical duct |
| 66 | lower optical duct |
| 67 | cooling fluid |
| 71 | upper inner sleeve with radius R3 |
| 72 | upper outer sleeve |
| 73 | lower inner sleeve with radius R4 |
| 74 | lower outer sleeve |
| 75 | HR coating at the pump wavelength |
| 76 | fluid |
| 81 | rare-earth-doped fiber |
| 82 | optical fiber assembly/wound rare-earth-doped fiber |
| 83 | inner frame |
| 84 | outer frame |
| 85 | optical clear adhesive/filler |
| 91 | input signal |
| 92 | output signal |
| 93 | pumping light |
| 94 | probe laser beam |
| 95 | detecting region |
| 96 | path compensating ring |
| 101 | PBEC |
| 102 | SHG crystal |
| 103 | THG crystal |
| 104 | FHG crystal |
| 105 | ½ λ waveplate |
| 106 | $M_1$ mirror |
| 107 | $M_2$ mirror |
| 108 | $M_3$ mirror |

DESCRIPTION

Part I
TIR-Guide Disk Laser Pump Head
FIGS. 1A–G

In order to produce a gain region, particular a thin gain region at the end of a solid-state laser medium, or within a small chip of a solid-state laser medium, several novel pump approaches have been developed with the use of multipass architecture in the present invention. They are projected as follows in the section of PART I and section of PART XI.

As discussed in the parent patent, for a pump head, when a thin gain zone is created to be adjacent to an end mirror of a standing-wave cavity in a solid-state laser medium, those sanding-wave patterns corresponding to the cavity modes overlap each other spatially within the thin gain zone. Therefore, they compete for the available gain leading to minimizing the spatial hole-burning effect. In the case of a pump head with a thin gain zone, the corresponding spectral oscillating mode interval under laser operation is largely dominated by the thickness denoted by $\Delta T$, of the thin gain zone along the optical axis direction of the laser cavity.

When the thickness $\Delta T$ is small enough, the oscillating mode interval will be larger than the FWHM of the lasing bandwidth of the gain medium, and as a result, single-mode operation occurs directly. When the thickness $\Delta T$ is not small enough, a multimode operation will take over with a much larger oscillating mode interval. In fact, this effect caused by a thin gain zone here is equivalent to that caused by short cavity configurations in which spectral modes are separated substantially.

The simplest method to produce a thin gain region is achieved by use of the end-pumping scheme, including the off-axis end-pumping geometry. But this allows few options. Essentially, almost only one approach can be adopted for such a pump arrangement. That is, a laser medium with a large absorption coefficient at the pump wavelength is end-pumped resulting in a very short absorption depth at the end of laser medium so as to produce a thin gain region. This method was used by G. J. Kintz and T. Baer in their paper of IEEE J. QE-26(1990)9, 1457. In addition, the thickness of the laser medium along the optical axis of the laser cavity may be 1 mm around or less to accomplish this goal.

Several approaches using different pump-light delivery optics can be applied to deliver high diode power to the pump region with the end-pumped type. One example is to combine the lens duct and cylindrical microlenses, as reported by R. Beach et al., CLEO'93, CFM6, p.644. Another example is to use the fiber-optic coupler or a bundle of fibers, as described by Graf and Balmer, Opt. Lett. 18(1993)1317 and by Kaneda et al., Opt. Lett. 17(1992) 1003. The end-pumping scheme is not only limited by the need of a laser medium with a small thickness and a very large absorption coefficient, but also jeopardized by the loss of pump power and thermal problems in scaling to higher pump levels.

The more advanced technique came from the so-called 'disk' lasers or thin-disk lasers, in which the lasing material is only some tenths of a millimeter thick. However, in light of that the pump configuration in the prior art for such lasers tends to be complex, its price would not be cheap. Hence, the prospect that disc lasers be a dominant technology remains unclear. To overcome these drawbacks, the following novel side-pumping approaches in FIGS. 1A–F are introduced. And a further development for pumping extra-thin laser chips will be presented in PART XI.

FIGS. 1A–D show a TIR-Guide Disk Pump Head with side-pumped type, in which a TIR-guide optical disk reflectors or TIR-guide disk assembly is pumped by fiber bundles from three directions to produce a thin gain region. This is one of the pump embodiments in accordance with the present invention, in which case regular laser materials can be used, such as Nd:YAG, Yb:YAG and Nd:YLF. A laser medium with a large absorption coefficient is no longer required due to multipass geometry for the pumping beams. Here TIR is the abbreviation for Total-Internal-Reflection.

FIGS. 1A, 1B and 1C are the front sectional, perspective and side sectional views, respectively, in the case of 3-side pumping. FIG. 1D shows the multipass geometrical path of pumping beams within a TIR-guide disk. Note that heat sink 7 has been only shown in FIG. 1A for simplicity.

A pump cladding 3, in the form of a circular plate, surrounds a small chip of a solid-state laser medium 1. Pump cladding 3 has two parallel main surfaces perpendicular to the Z direction and an outer surface parallel to the Z direction in the drawing. The outer surface has an HR coating 4 circlewise at the pump wavelength. An AR-coated or un-coated slit 5, i.e., spectral opening, serves as an entrance for the pumping beams. A fiber bundle 6, which is used for delivering the pumping beams from diode bars, is butt-coupled to slit 5.

Due to total-internal-reflection (TIR) and the convergent nature of an optical reflector of circle geometry, the pumping beams, after entering slit 5, are confined between the two surfaces of the circular plate, which acts as a planar TIR-guide. And thus they undergo multiple reflections and repeatedly passe through laser chip 1 until completely absorbed. In other words, the disk plate formed by laser chip 1 and pump cladding 3 becomes a multipass TIR-guide disk, or container-like disk, or disk-blackbody.

The thickness for both solid-state laser chip 1 and pump cladding 3 along the Z direction is not necessary to be the same. Apparently, in favor of the pumping and laser operation, the pump cladding is transparent at both the pump and fundamental wavelengths and its refractive index should be same as or close to that of the gain medium. A suitable, high-temperature bonding material, such as transparent bonding adhesive and optical-grade epoxy, is interposed between them for joint. A proper frit or fusing approaches and diffusion-bonding approach may also be applied for this purpose. The latter is disclosed in U.S. Pat. No. 5,441,803.

The multi-reflection and multipass geometrical path for the pumping beams is diagrammed in FIG. 1D. Once entering slit 5, tile pumping beams restricted within the planar TIR-guide disk are repetitively reflected by outside coating 4 of pump cladding 3 at points a, b, c, d and so on in turn, allowing pumping beams to multipass through laser chip 1 for maximum absorption.

In order for a TIR-guide disk pump head to operate optimally, the design parameters must be selected properly. The diameters of circular fiber bundle 6, laser chip 1 and pump cladding 3 are denoted by d, D, and $\Phi$, respectively. In the plate plane, the half-angle of the acceptance cone of the disk for the pumping beams outputted from fiber bundle 6 can be estimated as $$\alpha = \frac{1}{2}\Omega = \beta \tan^{-1}(D-d)/\Phi,$$

where the half-angle is denoted by $\alpha$, the acceptance cone is denoted by $\Omega$, and parameter $\beta$ in a selected range from 0.9 to 0.5 around is denoted as the acceptance index. Obviously, $\alpha$ or $\Omega$ here is directly proportional to D, and inversely proportional to $\Phi$.

Under the condition that the diameter d of circular fiber bundle 6 is chosen to be 500 um or less, or equal to ($\frac{1}{4}$–$\frac{1}{6}$) D around, the escape loss of the pumping beams from slit 5 is able to be less than 10%, typically less than 5%. The diameter D of solid-state laser chip 1 is selected from a range around 0.2–2 mm, depending on the consideration of the mode-matching and power level condition. The choice of the diameter $\Phi$ of pump cladding 3 is dependent on the diameter D of solid-state laser chip 1 and the numerical aperture of fiber bundle 6. When the diameter D is close to or less than 1 mm, the graded-or step-index configuration is preferably used which will be given shortly.

As an example, given that $\alpha = \frac{1}{2}\Phi = 6°$, the diameter $\Phi$ of pump cladding 3 will be more than seven times large than the D. In the plane perpendicular to the disk plane, the acceptance cone of the disk for the pumping beams has much larger tolerance and would not be a problem. The range of thickness of the disk plate is around 1 to 5-mm. The setup for a thickness of 0.2 to 1-mm will be discussed in PART XI.

Meanwhile, the fiber bundle plays an important role in the present pump arrangement. Fiber optics is a well-developed technology capable of low-loss transport of diode laser output. The pumping beams outputted from the end of fiber bundle 6 need to fit within the region of the acceptance cone $\Omega$ as shown in FIGS. 1B–D. In other words, the exit cone of fiber bundle 6 needs to match the acceptance cone $\Omega$. In order to obtain a better result, the numerical aperture, i.e., the N.A, of fiber bundle 6 must be selected as low as possible. Considering the practicability and commercial availability, a low N.A. of around 0.1 is demanded.

A low N.A. fiber bundle and a collimating lens constitute a fiber-optic coupler for coupling the output from a diode bar. The relevant technologies were reported by Baer et al. in U.S. Pat. No. 5,127,068 (1992) and others. The radiation of a diode bar is focused into an array of fibers via a collimating lens. The collimation is performed in the fast axis of the diode. The N.A. of the butt-coupled fiber is chosen to be roughly equal to the low N.A. direction of the diode. At the rear end of the coupler, the fibers are joined to a bundle.

Fiber bundle 6 may have a circular profile with circular cored fibers, or noncircular profile with circular or noncircular cored fibers, such as a rectangular profile with rectangular cored fibers. The latter is preferred because the noncircular cored fiber can more readily match the linear emitting area of the diode laser and a rectangular slit 5. As an alternative, a fiber bundle with a single fiber of a low N.A. can be used here as well.

As to the cooling issue, the TIR-guide disk pump head is directly mounted onto an actively cooled heat sink 7 with a pressed indium layer. On the cooling-finger side, the laser crystal and pump cladding are coated with highly reflective coating at the laser wavelength to serve as a laser end or fold cavity mirror. As an alternative, it also can be replaced by an additional mirror and will be discussed in FIGS. 9A–B in some detail later. As a further alternative, the surface of heat sink 7 can be mirrored with a gold coating to serve as the cavity mirror. The heat within the heat sink is dissipated via coolant or a TE cooler.

Further, in order to easily assemble and to replace coating 4, the TIR-guide disk can directly be put in and surrounded by a heat sink chamber, whose inwardly facing wall and bottom have a metalized mirror surface such as gold coating so as to multiply reflect pumping beams. In the heat sink chamber heat also is conducted one-dimensionally through the back disk face. This structure is shown in FIG. 1G.

While the additional mirror is used, in order to maintain TIR within the bonding area, a metal foil 8, such as an aluminum, indium or silver foil, is inserted between pump cladding 3 and cooler 7. A heat spreader, such as silicone heat paste, can be optionally interposed between cooler 7 and metal foil 7 to enhance their thermal contact and mechanical flexibility.

It is of interest to note that, when an optical boundary surface of an optical element is used under the condition of TIR (Total-Internal-Reflection) and is contacted with other substances, the approach aforespecified can significantly be employed to protect the gas-solid or liquid-solid interface from the so-called "Frustrated Total-Internal-Reflection". Based on the article "What in the world are surface plasmons?" published in Optics & Photonics News, May 1997, two ways can be found to maintain the TIR interface. One approach is to apply a thick metal coating over 20 nm to an optical boundary surface. The other is to employ a metal foil or film. The air gap between a metal film and optical surface usually is large than 1.5 micron due to the unflatness and unfitness.

In the present invention, such an approach is typically adapted to a pump cladding, or an optical duct, or a laser slab in thermal contact with a cooler/heat sink, particularly for the embodiments of the TIR-guide pump heads which will be given shortly.

Besides, some other methods also can be applied, including i) inserting a thermal film or material which has a refractive index lower than pump cladding 3 between pump cladding 3 and cooler 7 within the bond area; ii) protective coating, such as $SiO_2$ coating or Teflon AF 1600 coating; and iii) cooler 7 has a mirrored surface to protect the TIR interface and to reflect the pumping beams.

In FIGS. 1A–D, as an example, three fiber bundles are arranged circularly for 3-side pumping of the TIR-guide disk. Solid-state laser chip 1 and pump cladding 3 are of a circular shape. However, their precise geometric shapes can vary widely as discussed later. Also, the number of the fiber bundles and the relevant arrangement may be employed in any one of a number of different ways. Further, one will see that a laser chip eccentrically located inside of TIR-guide disk results in a favorable condition with a large pump acceptance cone.

As a significant alternative, in order to obtain a broad pump angular acceptance, the above-disclosed TIR-guide disk can be made of the graded-index cladding, similar to the way used for graded-index optics, such as a GRIN fiber or lens. That is, graded-index pump cladding 9 has a variable refractive index that is a continuous function n(r) of the radial distance r from the disk center, the refractive index getting progressively lower away from the center. This characteristic causes the pumping beams to be refocussed by refraction into the center area to pass through the gain medium periodically as shown in FIG. 1E. In order to facilitate this process, the rate of change of the amount of the refractive index, i.e., dn(r)/dr, should be designed properly.

Similarly, pump cladding 9 can be also constructed to have two sleeves with different refractive indexes in a like manner used for step-index fibers. The inner sleeve has the same or close refractive index as that of laser chip 1, such as made from undoped YAG. The outer sleeve has a lower refractive index and can be made from optical glass or optical plastic and resin materials. Therefore, the lens effect, which is caused by the difference of refractive indexes between inner and outer sleeves, results in converging the pumping beams to the center area repeatedly. In so doing, the related acceptance cone $\Omega$ becomes approximately $$\alpha = \tfrac{1}{2}\Omega \approx \beta\ \tan^{-1} D'/\Phi,$$

where now D' is the diameter of the inner sleeve of the pump cladding, rather than that of the laser chip.

By appropriate choice of parameters, a large acceptance cone can be obtained. Here, as a primary consideration, the thickness of the outer sleeve along the radial direction is expected to be equal to the focus length caused by the lens effect. On the other hand, some parameters can be directly determined from the relevant experiments. It is worth noting that, in the relevant pumping process, the pumping beams, once entering, will be converged to the central area and deviate from the original optical path. This feature would considerably decrease the escape loss caused by the pump entrance of slit 5. Therefore, this is one of the important pump embodiments in accordance with the present invention.

In the above two cases by use of a graded-index TIR-guide disk or step-index TIR-guide disk, thus, fiber bundles with a large N.A. or commonly-used pumping coupling optics can be employed for delivering pumping beams. Or, even a laser diode can be directly butt-coupled to slit 5, leading to a much simpler and cost-effective structure. FIGS. 1E and 1F show the side sectional views of a Graded-Index TIR-Guide Disk Pump Head and a Step-Index TIR-Guide Disk Pump Head, respectively.

As an option, a Selfoc lens serving as an interfacing optics may be applied between slit 5 and the end of fiber bundle 6 or pumping coupling optics. In addition, an interfacing optics may be used in setting fiber bundle 6 or pumping coupling optics perpendicular to the disk plate for a compact package.

In conclusion, with the use of a TIR-guide disk head, one can concentrate the pumping power from the diode bars within a regular solid-state laser material of a small volume around or less than 1 $mm^3$. A pump head in size of a dime or quarter which is capable of producing a stable high power green light or even UV light now is practicable.

As a further development for TIR-guide disk pump heads, in PART XI of "TIR-Guide Pump Head for Extra-Thin Laser Media" of this application, some embodiments for pumping extra-thin laser chips are given and discussed.

Part II
Circular-Profile Pump Head for Pumping Laser Rod
FIGS. 2A–E

As a important extension, the present pump approach with the above multipass pumping geometry can be employed for pumping a regular solid-state laser rod or bar, as shown in FIGS. 2A–F. In such a case, a number of TIR-guide disk can be stacked together to construct a multipass cylinder reflector or a cylinder-blackbody for pumping laser rod/bar 2.

In FIGS. 2A–B, correspondingly, every fiber bundle 6 in FIGS. 1A–C is replaced by a linear array laser diode bar 11 combined with a collimating rod lens 13. Laser diode bar 11 via rod lens 13 is butt-coupled to a stripe entrance/spectral opening 5. The stripe width is typically less than 500 um. Here, fiber rod lens 13 serves as a one-dimensional collimating lens to collimate the beam divergence in the plane perpendicular to the diode junction plane. Meanwhile, the beam divergence in the plane parallel to the diode junction plane is relatively small to be around 5°–10°.

At the present case, due to the refraction effect caused by the cooling water which is surrounding laser rod 2, the parameter $\beta$ in the formula $\alpha = \tfrac{1}{2}\Omega = \beta\ \tan^{-1} D/\Phi$ should be selected less than 0.5. Fortunately, the divergence of the pumping beams within the XY plane after collimating now is able to be less than one degree. Here, D is the diameter of laser rod 1, and $\Phi$ is the diameter of cylinder reflector 10. FIGS. 2A and 2B are the side sectional and perspective views, respectively.

Apparently, a graded-index pump cladding makes better to obtain a large acceptance cone. In this situation, the construction of a multipass cylinder reflector is about same as a section of a graded-index fiber. The pumping beams, once entering, hence are converged into the central area periodically for pumping solid-state laser rod or bar 2 as shown in FIG. 2C.

In the same vein, the pump cladding can be also constructed to have two sleeves with a step-index. The inner sleeve has a refractive index n. The outer sleeve has a lower refractive index n' appropriately. Therefore, a lens effect caused by the difference of refractive indexes between them strongly converges pumping beams resulting in a large acceptance cone. As mentioned before, as a primary consideration, the thickness of the outer sleeve along the radial direction is expected to be equal to the focus length caused by the lens effect.

Thus, in the above two cases, linear array laser diode bar 11 can directly be butt-coupled to stripe entrance 5 with or without collimating lens 13. Then, a multipass cylinder reflector becomes a multipass graded-index or step-index cylinder reflector. Their performances would be enhanced significantly. FIGS. 2C and 2D show the side sectional views of a Graded-Index Cylinder Reflector Pump Head and a Step-Index Cylinder Reflector Pump Head, respectively.

Moreover, in the case of the step-index pump head, the outer sleeve can also be made from air or a fluid optical clear to the pumping light as shown in FIG. 2E that is the side sectional view. This is one of the important pump embodiments in accordance with the present invention. The fluid inside of the cylindrical envelope can be water or other liquid with a proper refractive index. It may be used for enlarging the focus length caused by the lens effect. A cylinder reflector 10 is made as a hollow cylinder with a cylindrical envelope whose interior or exterior is HR coated at the pump wavelength with a few AR-coated or un-coated stripes, i.e., spectral opening, serving as pump entrances 5. A regular laser rod 2, surrounded by a cooling channel and then received in by the inner sleeve or pump cladding 3, is mounted at the center of the hollow cylinder.

In general speaking, diverse cooling and temperature control systems are well known in the art and are widely available. In an exemplary configuration of the preferred embodiment, passageways for coolant flow can be provided through a monolithic housing structure in direct contact with the laser rod, as described by H. Bruesselbach and D. S. Sumida in their paper "69-W-average-power Yb:YAG laser," Opt. Lett. 21 (1996)7, p.480. As a further development for thermal management, the cooling approach disclosed by Peter E. Phillips in their U.S. Pat. No. 5,471,491 is well suited for the present case shown in FIG. 2E—the multipass step-index structure.

At the present cases as shown in FIGS. 2D and 2E the inner sleeve has a hole to provide a tubular sleeve. The inner sleeve can be made from optical glass or optical plastic and resin materials. The sleeve surrounds the laser rod and forms a passageway through which the coolant flows in direct contact with the rod for efficient absorption of the heat generated within the rod. Note that such a structure is shown in FIGS. 2D and 2E but not in other drawings as well as thereafter for simplicity. On the other hand, there should be two end cap assemblies or end cap manifolds in order to hold laser rod and to furnish passages for the entry and exit of cooling fluid.

For the pump head to work in an optimum way, the diameters of cylinder reflector 10, the radial extent and refractive index of the tubular sleeves, and the cross-section and size of the coolant hole should be selected properly, in order to facilitate the pumping process and effective cooling. Holes may have a circular cross-sectional outline, or non-circular cross-section. The coolant may be either liquid or gas, depending on the requirements of the particular application for laser system. The optical path distortion caused by the coolant and laser rod may also be considered and compensated.

In fact, various design parameters can directly be determined with a relevant experimental setup. To construct a hollow cylinder step-index reflector pump head, a laser rod has a diameter/size of 1 to 3-mm around. The diameter of a cylinder pump cladding is 5–15 mm around. And the diameter of a cylinder reflector can be ranged from 10 mm to 40 mm.

The above-described cooling approach is termed as Direct or Impingement Cooling Approach in the present invention. The second cooling approach is denoted as Indirect Cooling Approach. For example, when the pump cladding has a high thermal conductivity and its size along the heat flow direction is limited, the heat can be dissipated via the pump cladding and then into coolant or TE cooler or heat sink. The third or rest cooling approach in the present invention is called Conductive Cooling Approach. For example, in FIG. 1A a laser medium is directly contacted a heat sink or TE cooler for cooling.

Part III
Noncircular-Profile Pump Head for Pumping Laser Slab or Rod
FIGS. 3A–B to FIGS. 4A–D In accordance with the principles of the present invention, the pumping arrangements shown in FIGS. 1A–F and 2A–F can be used for producing a gain region in the shape of either a line within a laser chip, or a thin layer within a laser slab. However, it is much more suitable for using the multipass reflector of a noncircular cross section for pumping laser slabs. In fact, the noncircular-profile reflector is a very important improvement for the multipass geometry and has some significant advantages over those regular circular reflectors. It is going to be furthered explained and described as follows.

For illustrative purpose in the present instance, noncircular-profile, multipass reflectors arc initially introduced for pumping laser rods or circular gain chips rather than laser slabs. By way of example, FIG. 3A shows the side sectional view of a reflector in the shape of a rounded rectangle, which may demonstrate the cross-section of either a TIR-guide disk pump head with fiber pumping similar to that shown in FIGS. 1A–D, or a regular pump head used for pumping laser rods similar to that shown in FIGS. 2A–B. This is one of the basic pump embodiments in accordance with the present invention. Such a noncircular-profile reflector 14 can also provide the multipass side pumping specialized by the present invention. Usually, the multipass reflector is also named as integrating pump cavity or reflective optical cavity in the art.

The most advantageous characteristic in the use of non-circular profile reflectors lies in their ability to provide a broad pump angular acceptance, i.e., a very large pump acceptance cone close to 180°, regardless a special cladding surrounds the gain media or not. Therefore, when a regular pump head is used for pumping laser rod, a linear array laser diode bar can directly be butt-coupled to the stripe entrance without using collimating lens. And in the case of a TIR-guide disk pump head, fiber bundles with a large N.A. can be employed for delivering pumping beams, or a laser diode can directly be butt-coupled to the slit entrance without using a collimating lens.

There are four pump entrances shown in FIG. 3A for a regular pump head with diode bars pumping. The pump entrance is 0.5 mm or less in width. FIG. 3B shows the perspective view of a regular pump head with a rounded-rectangle-profile reflector, aforespecified, wherein a laser rod is pumped by four linear array laser diode bars.

A noncircular-profile reflector may be hollow when it is made up of an envelope. Or, a noncircular-profile reflector may be solid when it is made up of an optical duct with outside coating. While the angles of incidence of the pumping beams, which impinge upon the two end optical facets of the optical duct, are large than the critical angle, they would not be coated due to TIR of the pumping beams. This principle is applicable to the relevant cases mentioned above and below. In regard to the thermal management, the Direct Cooling Approach aforespecified in the description for FIGS. 2A–E is mostly applied.

Pump arrangements using noncircular-profile reflectors are well Suited for pumping laser slabs. As some exemplary configurations of the preferred embodiment, FIGS. 4A–D show two pump arrangements for pumping laser slab 2 similar to that shown in FIGS. 3A–B. Obviously, now there would be 100% possibility for the pumping beams to pass through the gain medium in every complete trip.

FIGS. 4A–B are, respectively, the side sectional and perspective views of a Solid Noncircular-Profile Reflector Pump Head for pumping laser slab with a solid body made up of a optical duct 3. FIGS. 4C–D are, respectively, the side sectional and perspective views of a Hollow Noncircular-Profile Reflector Pump Head for pumping laser slab with a hollow envelope. In order to dissipate heat, laser slab 2 is water cooled in a conventional manner with a cooling channel block 15 which can be made from transparent, heat conducting materials. Block 15 contains two internal passages 16 for coolant circulating.

Before efforts are made to build a multipass reflector, attention is called to two facts. First, the angles of incidence of the pumping beams commonly spread a broad range at the reflective surfaces, which reflect unabsorbed light for multiple passes through the laser rod/slab. Second, the reflectance of conventional, multilayer dielectric coatings, which usually have the highest reflectivity, is severely dependent on the angle of incidence. Based on these considerations, several approaches can be selected to build an optical reflector, a wide-angle system.

1. An evaporated metal-coated reflector, such as the use of silver, gold, copper and so on.
2. A diffuse reflector that is usually fabricated from ceramics, such as glass ceramic and mica ceramic, or compressed powder, or Spectralon.
3. The pump cladding or optical duct is not coated. Due to TIR, those unabsorbed pumping beams whose angle of incidence larger than the critical angle internally impinge upon the air-to-solid interface, then are totally reflected by the boundary.
4. In addition, an extra reflector with a conventional HR coating is added which surrounds the pump cladding/duct, in order to repetitively reflect the remaining pumping beams, which have small angles of incidence and will not meet the need for TIR. It is named the double-layer reflector and illustrated in FIG. 18D below.

Part IV
TIR-Guide Pump Head for Pumping Laser Slab or Rod
FIGS. 5A–E to FIGS. 9A–C In further accordance with the principles of the present invention, in order to use a simple way to obtain an optimum reflection, a reflector also can be built as an optical total-internal-reflection structure, as exemplified in FIGS. 5–10, FIGS. 13–17, FIG. 19, and FIGS. 22–24 as well as FIGS. 18A–C. These related pump heads are named as the TIR-guide pump head. These embodiments, in fact, are the combination of the noncircular-profile reflector and the TIR-guide disk pump head.

For the TIR-guide pump heads, the major difference from regular noncircular-profile reflectors is, the all or major surfaces of a TIR-guide pump cladding, now termed as optical duct 17, is not coated while its end optical facet is at times coated. Note that when critical angle $i_c < 45°$, the two side perpendicular to each other are able to meet total-internal-reflection (TIR) condition concurrently.

An extra prism coupler or prism-like coupler, termed as beam guide input coupler 18, is usually used for coupling and guiding the pumping beams into the TIR-guide pump head with large angles of incidence. These angles of incidence must be larger than the critical angle $i_c$ so that the pumping beams, once entering, will be able to undergo TIR and be reflected repetitively, and confined within the TIR-guide pump head with zig-zag pumping paths. For example, the critical angle $i_c$ of pumping beams within the optical duct made of the undoped YAG crystal is around 33.5°. Such a critical angle is adapted to content the condition for TIR.

FIGS. 5A–B are, respectively, the side sectional and perspective views of a TIR-Guide Planar Pump Head pumped by two linear array laser diode bars. A laser slab 2 placed in the XZ plane is sandwiched between two planar optical ducts 17 via optically contacting. A beam guide input coupler 18, a thin prism-like optical element, preferably being made of the same material as that of duct 17, is applied for guiding the pumping beams into the TIR-guide pump head at a certain angle of incidence, preferably 45°, along the XY plane as shown. It is optically contacted with or bonded to duct 17 via diffusion-bonding or via an optical bonding adhesive. And the orientation of coupler 18 is such set in associate with the unique feature of the highly asymmetric divergent pumping beams so as to enable the pumping beams to meet the need for TIR.

Note that the beam divergence of diode bar 11 is small in the XY plane perpendicular to the laser slab plane. Diode bar 11 can be directly butt-coupled to coupler 18 without collimating, regardless of what kind of the vertical beam divergence they have in the XZ plane, i.e., the laser slab plane. The two far-end optical facets of the optical duct, if needed, have HR coating 4 at the pump wavelength. In this situation, the critical angle $i_c$ is larger than 45°, or the entered pumping beams are of large incident angles. This is one of the basic pump embodiments in accordance with the present invention.

As to thermal management, four heat sinks 7 are bonded to the two sides of the peripheral section of duct 17 for the heat dissipation. Heat sinks 7 are further in contact with a heat removal system, such as TE coolers, fans, and cold plates (not shown). To maintain TIR as well as a high thermal conductivity, a metal foil 8 such as aluminum, indium and silver foil, or a thermal film with a low refractive index should be inserted within the bond area between duct 17 and heat sink 7. As an alternative, the cooling approach described in FIGS. 4C–D may be applied, in which the laser slab is sandwiched between two cooling channel blocks. The refractive index of the coolant may need to be selected properly so as to allow the pumping beams to pass it without difficulty. Moreover, in physical contact with the entrance/exit of the cooling channel block, a ring-shaped aluminum foil (not shown) is inserted between a sealed O-ring (not shown) and the cooling channel block to preserve TIR. The sealed O-ring usually is used for purpose of connecting with a cooling system (not shown). This approach has been specified above in FIG. 1 in the section of PART I.

FIG. 5C is the perspective view of a TIR-Guide Cylinder Pump Head similar to and varied from that shown in FIGS. 5A–B, but used for pumping a regular laser rod. Laser rod 2 is surrounded by a graded- or step-index pump cladding 9.

When the Direct Cooling Approach is applied, the refractive index of the coolant needs to be selected properly to avoid TIR as the pumping beams pass through it. In case the Indirect Cooling Approach is applied, a clear, transparent, heat conducting bonding material should be used. It fills up the interstice between laser rod 2 and cladding 9 to avoid TIR when the pumping beams pass through the interstice. This principle is also applicable to the relevant cases mentioned above and below.

FIG. 5D is the perspective view of a TIR-guide cylinder pump head used for pumping a regular laser rod. Laser rod 2 is eccentrically located inside of a cylinder-shaped regular optical duct 17. Considering the fact that some pumping beams are concentrated in the annular region at a distance from the center and never run cross the center area, this configuration can facilitate the pumping process. This geometry is similar to that used for pumping fiber lasers, as disclosed in U.S. Pat. No. 4,815,079 issued to Snitzer et. al.

FIG. 5E is the perspective view of a planar TIR-guide pump head used for pumping a regular laser rod. The cross-sectional profile of this noncircular profile multipass reflector is now rectangular. But it also can be selected from those shapes indicated by M. Muendel in his U.S. Pat. No. 5,533,163. However, Muendel's invention is also only for pumping fiber lasers. In fact, the principle of his invention somehow is equivalent to the diffuse reflector in physics, i.e., to make pumping beam distribute evenly.

FIGS. 6A–B are, respectively, the side sectional and perspective views of a planar TIR-guide pump head pumped by four linear array laser diode bars. There are two major differences from that shown FIGS. 5A–B. First, the space position of a diode bar 11 has been rotated 90° so that the long dimension of linear array laser diode bar 11 becomes parallel to the laser slab plane or XZ plane. Second, the beam guide input coupler 18 is now a standard prism. The beam divergence of diode bar 11 is large in the XY plane perpendicular to the laser slab plane. Thus, the pumping beams, before entering, should be collimated by a one-dimensional collimating lens 13 in the XY plane perpendicular to the diode junction plane, so as to lowering the vertical beam divergence. In so doing, attempt to accommodate the TIR condition relies on controlling the distribution of the angles of incidence of the pumping beam within a certain range.

FIGS. 7A–C show some alternative approaches to input pumping beams and input those combined pumping beams that come from multiple diode bars. In the figures, $i_B$ is a Brewster angle. In FIG. 7A, optical duct 17 can be made of $MgF_2$ for a zig-zag slab laser.

In order to work in an optimum way, one needs to take into account the following points. A major concern should be focus on minimizing the escape losses from the pump entrance. Some simplified discussions, based on geometrical optics and the rectilinear propagation of light, are presented by following briefly and illustratively. The more precise results would have to be attained from a ray-tracing plot and more detailed analyses.

Generally speaking, the larger is the ratio of the width/ area of the pump entrance relative to the circumference/area of the reflector, the less is the escape possibility of the pumping beams. In fact, however, the location and orientation of a pump entrance as well as the propagation manner of the input pumping beams also are the major factors relative to the escape possibility. In the following cases, only the "width effect" of the pump entrance is considered rather than the "area effect" for some relevant physics models. On the other hand, the equilibrium distribution also would not be considered.

In the first case, the orientation of a pump entrance is perpendicular to the average propagation direction of the zig-zag pumping beams which is denoted as the pump trip direction here as indicated in FIG. 5A and FIG. 6A. Under the circumstances shown in 6A, the total escape possibility $\eta$ of the pump power or energy is proportional to $\tau/(t \cdot \tan\theta)$. For the nth round-trip, the escape possibility $\eta_n$ can be approximately expressed as $$\eta_n \propto (\tau/t \cdot \tan\theta)[1-(\tau/t \cdot \tan\theta)]^{n-1}(1-\gamma)^n,$$

where the width of the pump entrance is denoted by $\tau$, t is the height of an end wall or its dimension vertical to the pump entrance, $\theta$ is the angle of incidence of the pumping beams which internally impinges upon an air-to-solid interface from the inside of optical duct 17, and the absorption possibility or fraction absorbed by the laser material within one round-trip is denoted by $\gamma$. The pump round-trip refers to that onset from one end and then return to it again. The total escape loss possibility should be $\eta = \Sigma\eta_n$. That is $$\eta = \Sigma\eta_n \propto (\tau/t \cdot \tan\theta)(1-\gamma) \cdot [\gamma+(\tau/t \cdot \tan\theta)(1-\gamma)]^{-1},$$

It can be rewritten as $$\eta^{-1} \propto 1+(t \cdot \tan\theta/\tau)\gamma(1-\gamma)^{-1}.$$

In the second case, a pump entrance is located at one of the two end walls. In a complete trip, the possibility of the pumping beams impinging upon the end wall should be full. Therefore, the corresponding escape possibility is the ratio of the width/area of the pump entrance to the relevant side size/area of the end wall. Hence, it is suggested that pump entrances of a noncircular-profile reflector be located at the sidewall rather than its end wall.

In the third case, the orientation of a pump entrance is parallel to the zig-zag propagation direction of pumping beams, i.e., the pump trip direction, as is the case in FIGS. 5, 9, 10, 13, 14, 16, 17 and FIGS. 15I–M. Under this circumstances, the total escape possibility $\eta$ of the pump power or energy is proportional to $\tau/T$. For the nth round-trip, the escape possibility $\eta_n$ can be approximately expressed as $$\eta_n \propto (\tau/T)[1-(\tau/T)]^{n-1}(1-\gamma)^n,$$

where $\tau$ is the width of the pump entrance, and T is the sum of all sides of optical duct 17, and the absorption possibility or fraction absorbed in a round-trip by the laser material is denoted by $\gamma$. The total escape loss possibility should be $\eta = \Sigma\eta_n$. That is $$\eta = \Sigma\eta_n \propto (\tau/T)(1-\gamma) \cdot [\gamma+(\tau/T)(1-\gamma)]^{-1},$$

It can be rewritten as $$\eta^{-1} \propto 1+(T/\tau)\gamma(1-\gamma)^{-1}.$$

For example, when $\gamma=50\%$, thus the total escape loss ratio can be expressed $\eta=(\tau/T+\tau)$. For another example, in FIGS. 14A–B or FIGS. 14C–D, $\tau=1$ mm, T=12 mm+5 mm+12 mm+5 mm=34 mm. On the assumption that $\gamma=40\%$, then the total escape loss percentage η=4% around. Further, the results for the third case can also be obtained with the aid of Double Input Coupler Approach. This approach is shown in FIG. 15H and will be described shortly in FIGS. 15C–H.

In conclusion, the above-specified third arrangement for the input of pumping beams has a relatively low escape possibility. The parameter τ should be made as small as possible. In general speaking, a full consideration is complicated and related to the propagation manner of the input pumping beams. The above discussions for the escape loss only provide a general idea and figure for illustration purpose.

In FIGS. 8A and 8B, the size of the pumping region or the laser slab along the X dimension is smaller than that of duct 17. In FIG. 8A, the ends of both sides of laser slab 2 have HR coating 19 at the pump wavelength to protect the two end areas from being pumped. In FIG. 8B, there exist two small gaps due to the smaller laser slab along the X dimension. Therefore, the two small optical plates or mirrors 20 with an HR coating at the pump wavelength are added to serve as the gap plate/mirror. The Samarium glass may be used as the substrate for the mirror to absorb the laser wavelength and eliminate parasitic transverse lasing. However, for the most cases of the present invention, when the refractive index of optical duct 17 is large enough and the incident angles of pumping beams are close to 45°, all the sides of duct 17 will comply with the TIR condition. Therefore, it is not necessary to put the additional mirror or coating for practical purposes.

In FIG. 8C, a laser rod 2 is used instead of laser slab 2. The cooling parts are not shown in FIGS. 6A–B and FIGS. 8A–B for simplicity.

FIGS. 9A–C illustrate another important variant of the multipass planar TIR-guide pump head, in which a thin, tapered, planar optical duct 17 is to provide a restricted, line-shaped pumping region in the XY plane. The input approach same as that shown in FIG. 7B is employed, except to add a lens duct cap 22 as shown in FIG. 9A and FIG. 9C. Lens duct cap 22 is used for improving the divergence of the pumping beams along slow axis. This is one of the important pump embodiments in accordance with the present invention.

In order to maintain TIR and provide a zig-zag pump path and multipass pumping, first, laser slab 2 and an appropriate input approach should be selected. Second, the interface between optical duct 17 and laser slab 2 can be either juxtaposed or separated with an interstitial air. In the former case, the two pieces is bonded via diffusion-bonding or other optical bonding approach. Third, in the latter case, the two pieces are separated and an interstice occurs between them. One needs to select a proper incident angle to allow the pumping beams going through interface without TIR. Or to put an AR-coating or extra-thin metal coating on the end surface, which is interfaced with the interstice, of optical duct 17 to interfere TIR and attain the so-called attenuated total internal reflection. The opposite facet of laser slab 2, or the end facet of another piece of optical duct 17 is at times HR coated.

Figure 14:
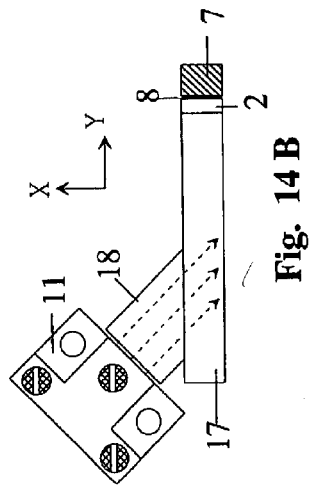
Figure 14:
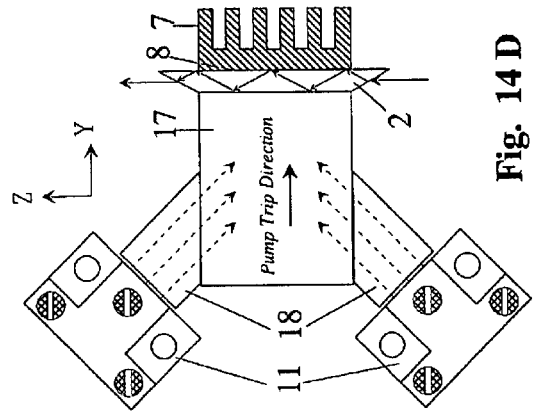
Figure 14:
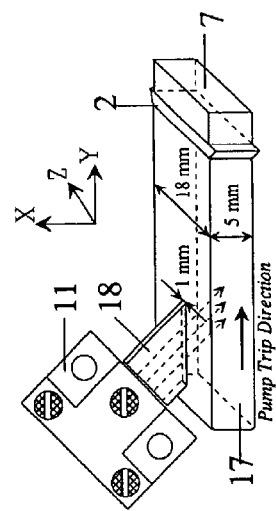
Figure 14:
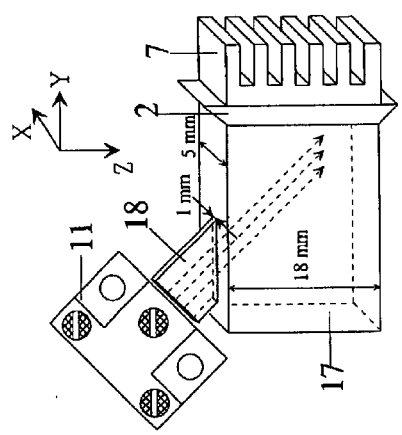
Figure 15:
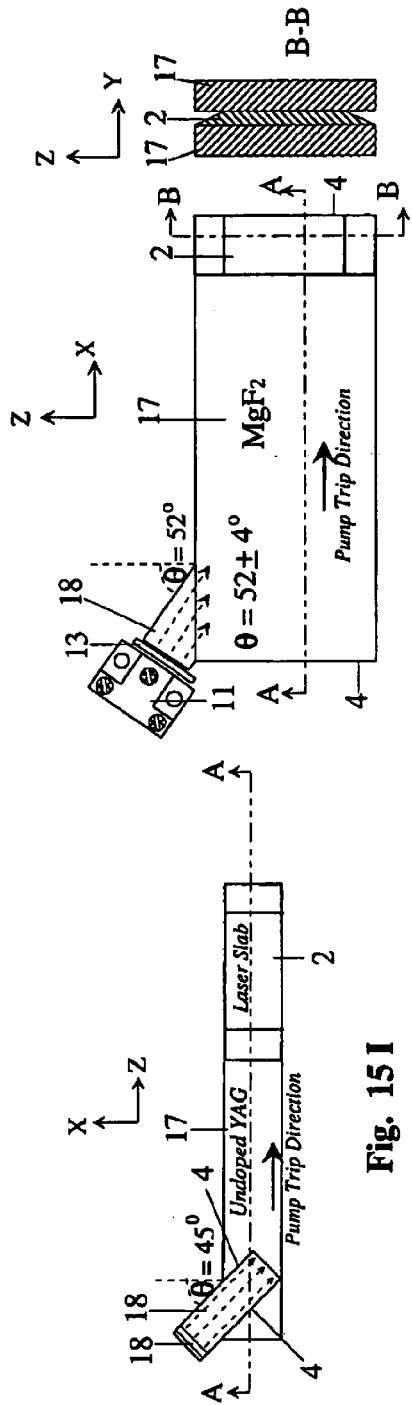
Figure 16:
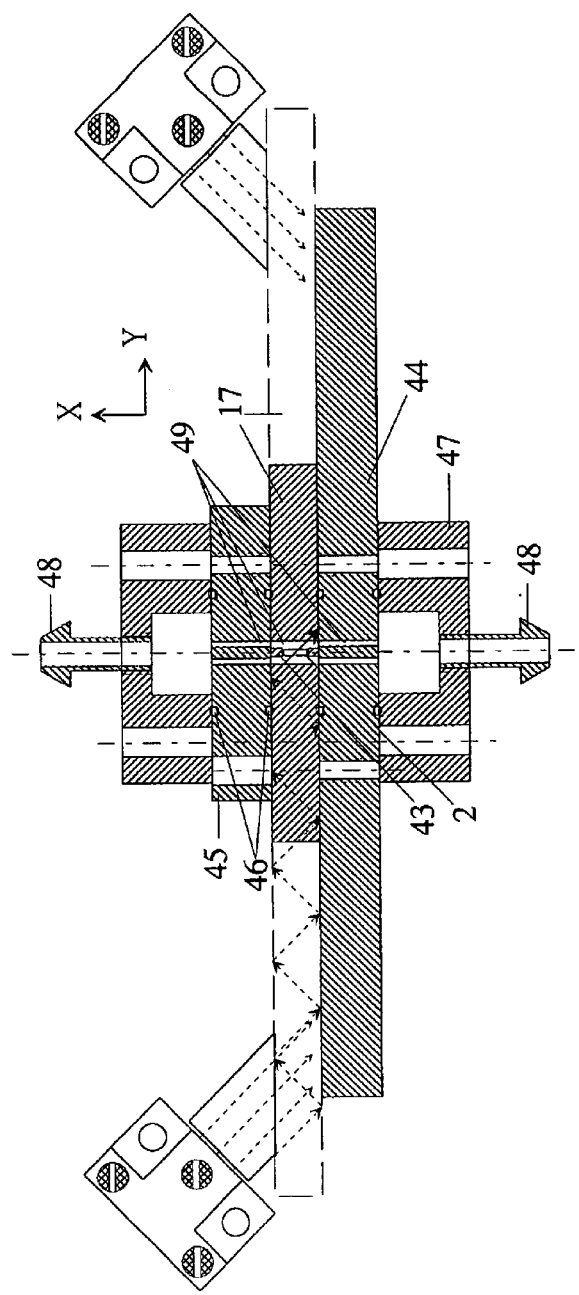
Figure 16:
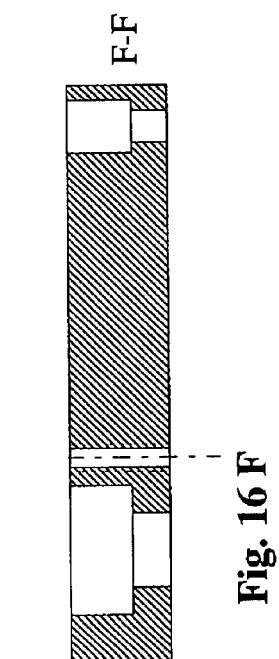
Figure 16:
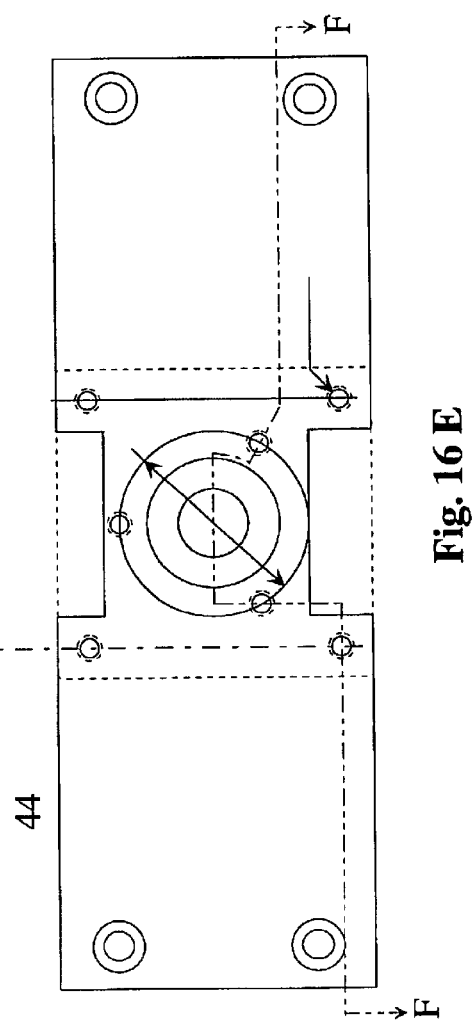
Figure 16:
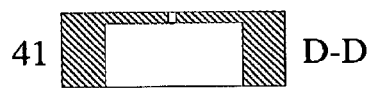
Figure 16:
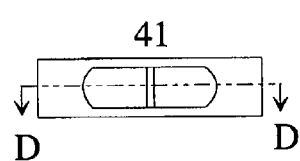
Figure 16:
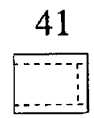
Figure 16:
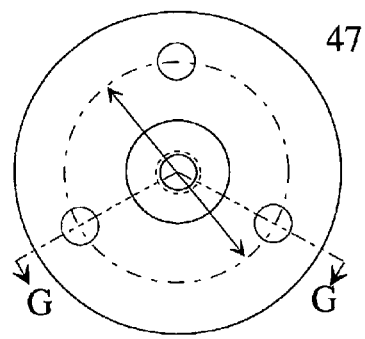
Figure 16:
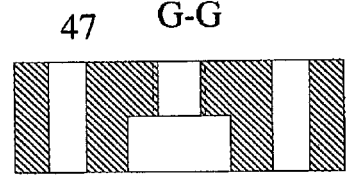
Figure 16:
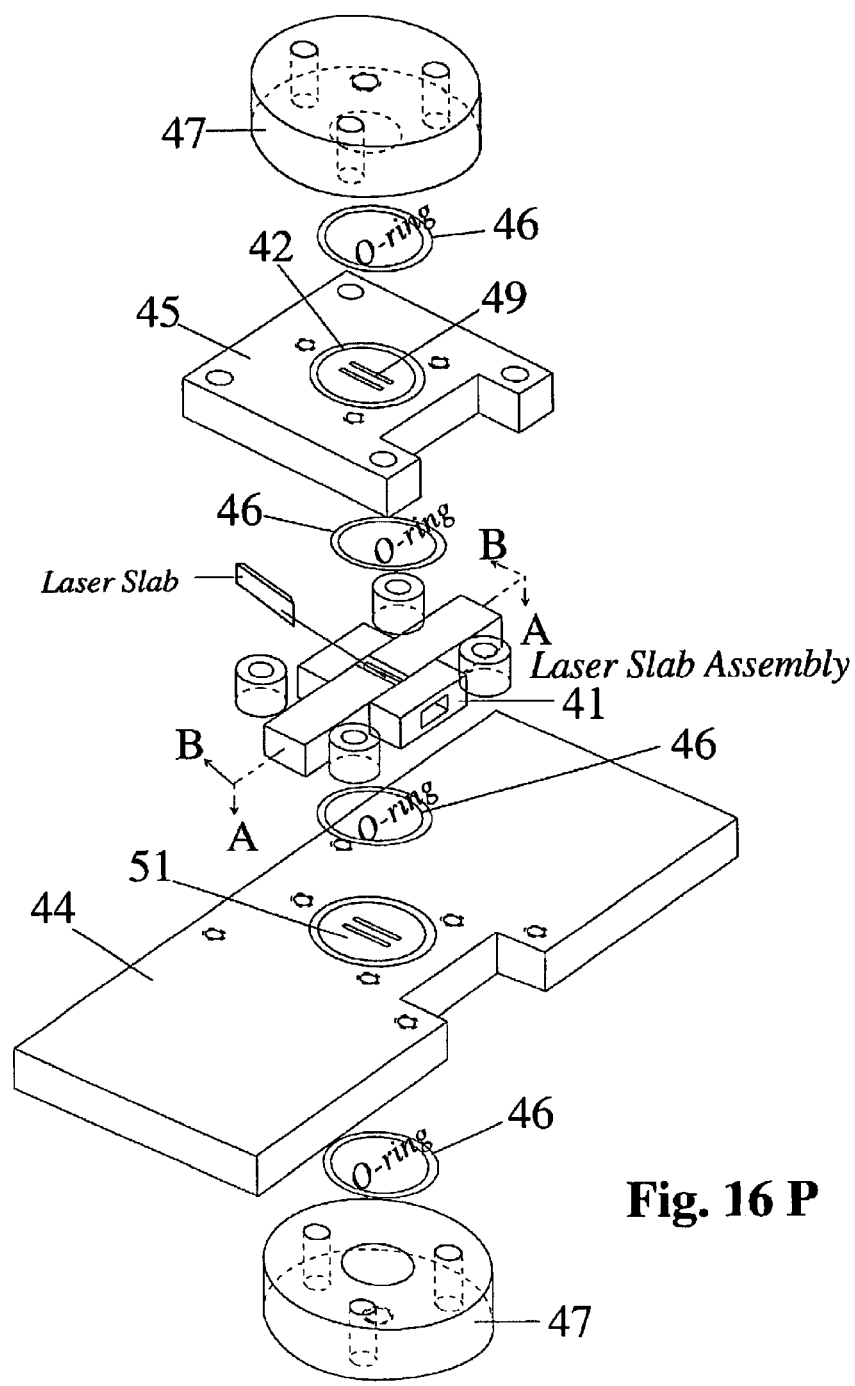
Figure 17:
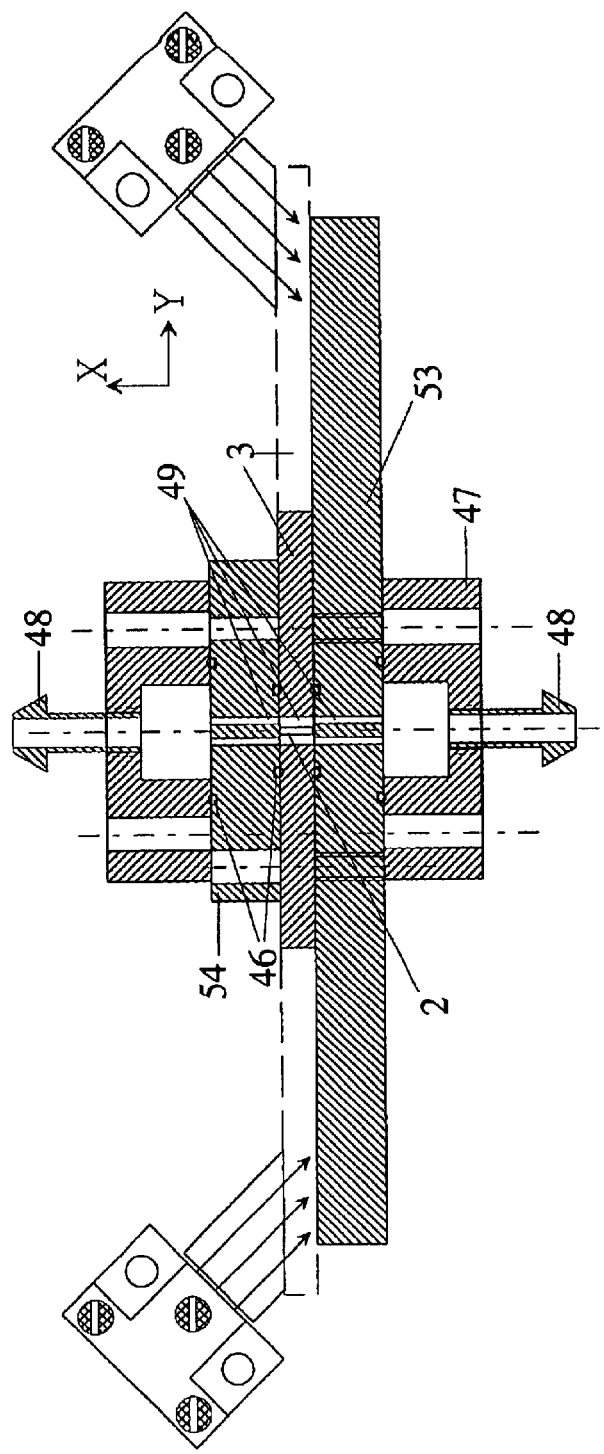
Figure 17:
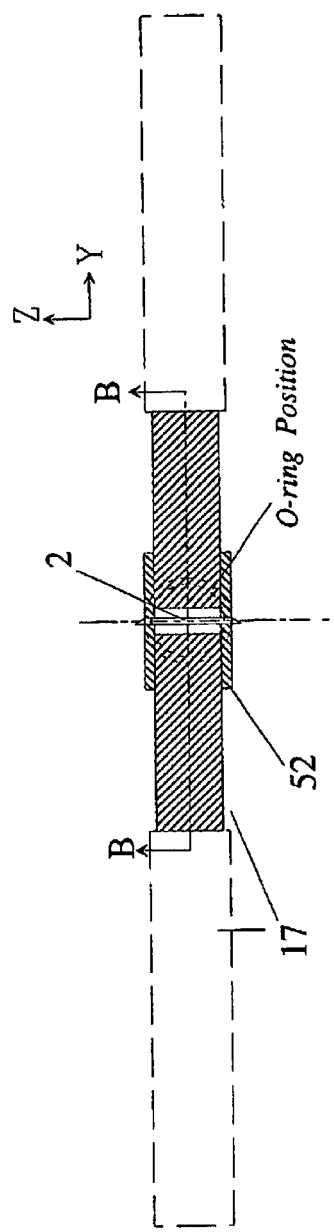
Figure 17:
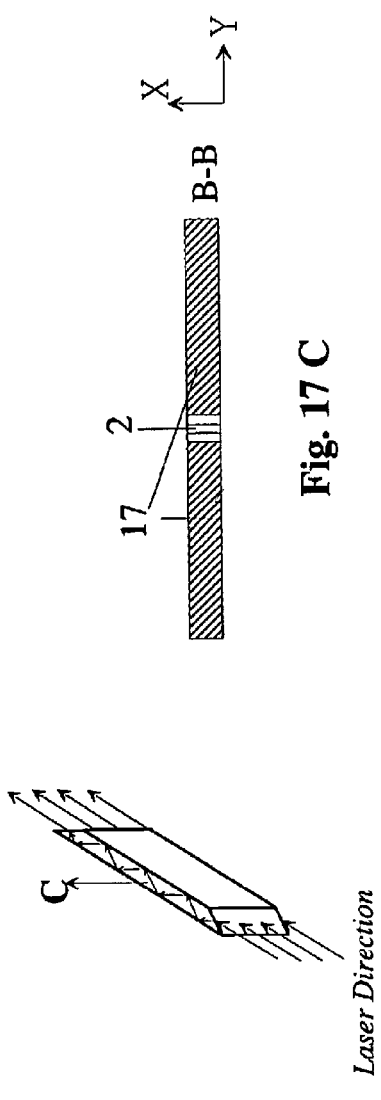
Figure 17:
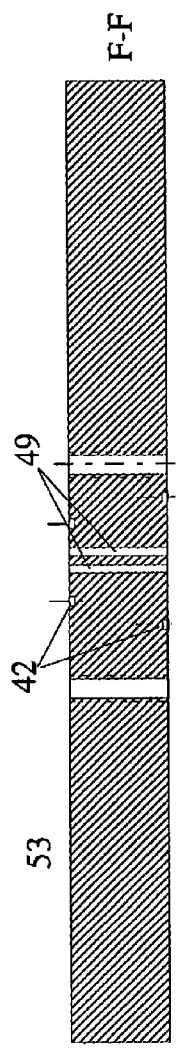
Figure 17:
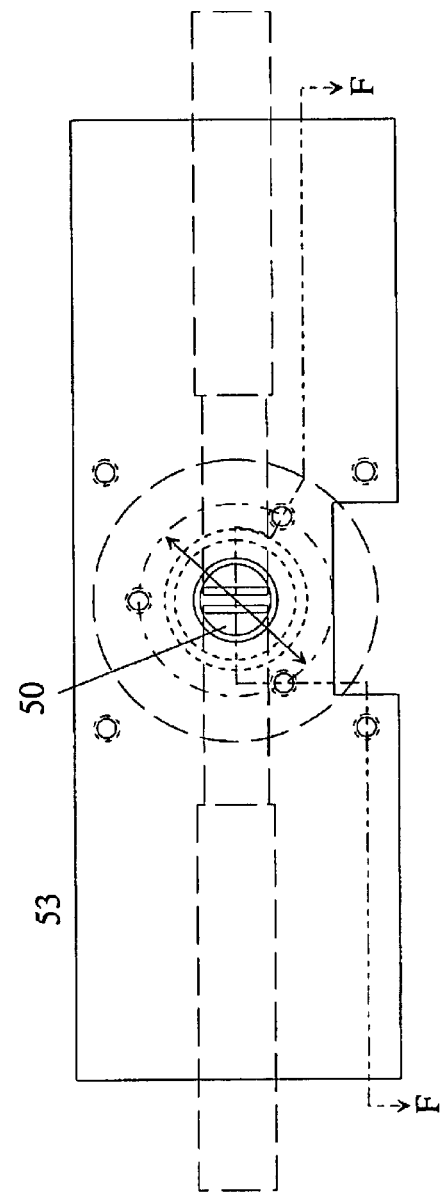
Figure 17:
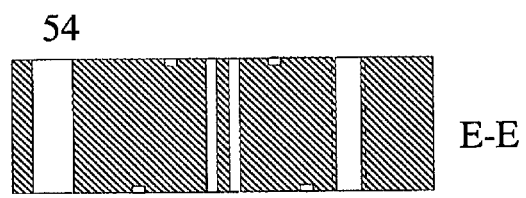
Figure 17:
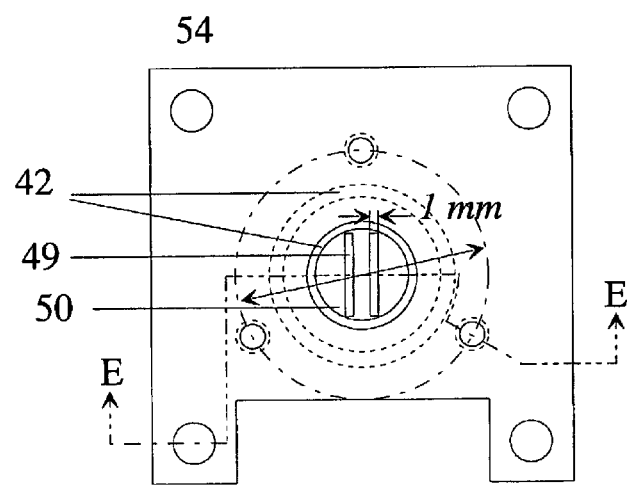

This structure and its principle also can be applied to thereafter other relevant cases, such as those shown in FIG. 14 and FIG. 15. Furthermore, in order to avoid larger escape loss in such case, the so-called Double Input Coupler Approach or Multiple Input Coupler Approach should be applied. It is shown in FIG. 15H and will be described shortly in FIGS. 15C–H.

Meanwhile, there are two laser configurations for the line-shaped pumping region. In the first laser configuration, the lasing direction is arranged along the line-shaped pumping region. In fact, a similar arrangement has been disclosed in the parent patent of U.S. Pat. No. 5,515,394 claim 18 except multipass pumping.

In the second laser configuration, the lasing direction is perpendicular to the line-shaped pumping region and the XY plane. Obviously, an one-dimensional beam-expanding cavity now needs to be applied and this setup is able to produce high-power SLM operations as described above in the disk laser pump head and in the parent patent of U.S. Pat. No. 5,515,394 claim 1. A line-shaped pumping region perpendicular to the lasing direction is capable of minimizing spatial hole burning effect and also can be used to realize high-power operation at a minor laser line for solid-state lasers.

In FIG. 9A, the front view, an HR mirror 21 acts as a rear or fold mirror for a laser cavity and is made of copper with a gold coating. The back face of the composite of laser slab 2 and optical duct 17 in the XY plane needs to be polished to optical quality. A copper mirror 21 may be built directly from or based on heat sink 7. As a further alternative, mirror 21 may have a thin substrate of a good thermal conductivity, made from such as sapphire, undoped YAG and $MgF_2$. The mirrored side can be either side of mirror 21, depending on the practical need. Optionally, in order to preserve TIR for the pump zig-zag path, a material with a low refractive index, such as $SiO_2$ and $MgF_2$, goes into the making of the first layer of HR mirror 21. Mirror 21 is going to contact heat sink 7 via metal foil 8. A heat spreader is interposed between heat sink 7 and metal foil 8 so as to enhance their thermal contact and mechanical flexibility.

FIG. 9B is the top view to mainly show a thin, tapered, planar optical duct 17, in which diode bar 11, heat sink 7 and HR mirror 21 are not shown. Please attention to that there is a gold coating 4 started at the end part of two tilted sides of optical duct 17. In view of the fact that, while the pumping beams are incident on the tilted sides, the incident angle would be increased twice amount of the original incident angle for each reflection, finally resulting in the failure of TIR on the two tilted sides. Therefore, in such cases, gold coating 4 or a mirror 20 is necessary to be used to confine the pumping beams.

The present pump approach shown in FIGS. 9A–C is similar to the lens duct as reported by R. Beach et al. in their U.S. Pat. No. 5,307,430, or in their paper Opt. Lett. 18 (1993)1326, and Gilles Feugnet et al., Opt. Lett. 20 (1995) 157. However, all of them did not try to use an optical duct to realize the zig-zag pump path so as to obtain multipass pumping.

At the present time, it is worth noting that:
1. The present invention will result in a much better pump solution with the highest possible efficiency, simplicity, flexibility, and arbitrarily scalable output power. It is almost suitable to any kind of laser material, regardless of its size, thickness or absorption coefficient.
2. Under the circumstances by use of a pump cladding or optical duct with a step index, the pumping beams, once entering, will be converged to the central area and deviate from the original optical path. This feature would considerably decrease the escape loss and enhances the pumping process.
3. The distance between the pump entrance and the laser slab should not be too short in order to make the pumping light distribution uniform while entering a laser material. In fact, with the use of optical duct and zig-zag pump path, the hot spot issue caused by directly diode bar pumping is eliminated for DPSS lasers.

4. By means of beam shaping, collimating, focussing and converging, fiber coupling and 2-D diode bars, one can increase the pump intensity and decrease the pump power leakage from the entrance.

5. Before entering the TIR-guide pump head, a half-wave plate can be applied for adjusting the polarization of the pumping beams if necessary.

6. In order to avoid the problem of parasitic oscillations and amplified spontaneous emissions, the laser slab should be properly designed, and the Samarium glass or HT coating or grounding may be applied.

7. The pump source can be derived from diode laser pump sources, or other laser pump sources, including multiple pump sources with a single or multiple pump wavelengths. The laser material can be co-doped with a second active lasing ionic species or sensitizer ions, or consisted of two different lasing components. The latter can be used for purpose of upconversion lasers and lasers with multiple output wavelengths.

8. As pointed out by the U.S. Pat. No. 5,307,365, the concentration of the minority species in the laser medium is set by the conditions for efficient lasing (extraction). This concentration may provide only limited absorption at the pump wavelength, i.e., the fraction absorbed in passing through the laser slab of around 1 mm thickness may be less than 20%. Therefore, there would be a high immunity for the polarization status of the pumping beams, the pumping wavelength, and for the temperature variations of the diode laser temperature.

9. The above depicted multipass pumping approaches provide slab-shaped gain regions. In order to facilitate all-out energy extraction, they need to apply some cavities with a noncircular spatial mode cross-section, i.e., the so-called slab-shaped cavity, such as one-dimensional beam-expanding cavities and the cavities employed for slab-discharge sealed-tube $CO_2$ lasers. One of them is used by Coherent for the model K500 $CO_2$ laser or in their U.S. Pat. No. 5,353,297.

10. Multipass pumping has four significant advantages. First, it is able to obtain a uniform pumping distribution in a laser material. Second, it largely enhances pump efficiency and pumping intensity. For example, the four double-passes of the pump beams will increase the local effective pump power density within the laser material by roughly a factor of three compared to the available power density. Third, there is a great tolerance for the temperature tuning/locking of the pump diodes. And fourth, it provides a large flexible for the dopant concentration of laser materials.

Part V
Zig-Zag Path within Laser Slab
FIGS. 10A–D

The multipass pumping for a regular laser slab has been presented above in principle. In this section, a zig-zag laser slab with multipass pumping is going to be initiated. In the zig-zag slab laser, total internal reflection confines the laser beam so it bounces back and forth along the length of the slab. A detailed information about slab laser head architectures in the known prior art has been presented in U.S. Pat. No. 5,351,251, No. 5,557,628 and in the famous book of "Solid-State Laser Engineering" by Walter Koechner. In the following sections, several designs will be given in order to realize the optical propagation along the zig-zag optical path within laser slabs. FIGS. 10A–D give a schematic diagram of a TIR-guide pump head with the Direct Cooling Approach for a zig-zag laser slab.

FIG. 10A is the side sectional view of a TIR-guide planar pump head pumped by four linear array laser diode bars. It is similar to that shown in FIGS. 5A–B, except the Direct Cooling Approach is applied. A cooling channel block 15 encompasses the laser slab and contains two internal passages 16 for coolant circulating. The coolant flows in direct contact with laser slab 2. Slab 2 end face is cut at a Brewster angle. That is, it has two Brewster tips. FIGS. 10B–C show laser slab 2. FIG. 10D shows part of block 15.

In this situation, both the pumping beams and laser beam are required to meet the need for TIR. One is within optical duct 17 and the other is within laser slab 2. By way of example, the critical angle $\theta_c$ of the pumping beams is 33.24° within the optical duct which is made of the undoped YAG crystal and surrounded by air. And the critical angle $\phi_c$ of the laser beam is 47° within the laser slab which is made of the YAG crystal and surrounded by the cooling water. One can find a proper incident angle for the pumping beams that are guided into optical duct 17. This angle keeps the TIR condition for the pumping beams within optical duct 17, meanwhile protects them from TIR when they cross over the cooling water. Otherwise, the interface of optical duct 17 with cooling water should have an index-transtage coating to avoid TIR.

Furthermore, when the pumping light has an incident angle close to 45°, and blocks 15 is transparent at the pump wavelength and its refractive index is large enough, therefore, all sides of blocks 15 would be able to maintain TIR for the internal pumping light. Such will prevent the pump power leakage from blocks 15 even its all faces are uncoated.

On the other hand, for the situation associated to the Indirect Cooling Approach such as that presented in FIGS. 5A–B above and FIGS. 13A–C below, optical duct 17 needs to be fabricated by the material with a high thermal conductivity, such as crystalline sapphire, undoped YAG, and $MgF_2$. In order to maintain TIR for a laser beam in slab 2, slab-surfaces should be coated with a low refractive index thin film, except for the optical duct made from a low refractive index material, such as $MgF_2$. The low refractive index thin film, i.e., protective coating, can be selected from i) optical-grade epoxy, ii) $SiO_2$ coating as disclosed in U.S. Pat. No. 4,881,233, iii) Teflon AF 1600 coating as taught in U.S. Pat. No. 5,479,430, iv) optical cement J91, manufactured by Summers Lab, and v) melting glue.

Part VI
Multipass Pump Head by Use of a Spatial Filter
FIGS. 11A–B to FIGS. 12A–B As a further alternative, in accordance with the principles of the present invention, FIGS. 11A–B and FIGS. 12A–B show another architecture of multipass pumping geometry which is characterized by using a spatial filter and the like.

FIG. 11A shows a multipass, side pumped geometry for pumping laser slab 2. A 2-D stacked diode bar(s) 12, Such as SDL 2×1 cm package with 240 W CW output, is collimated in one dimension by a collimating lens such as a rod lens array 13, or in two dimensions such as a microlenses array. An one-or two-dimensional spatial filter, is formed by an AR coated lens pair 23, and an aperture with an HR coated beam block 24 at the pump wavelength.

The pumping beams are reflected back by HR mirror 25 after passing through laser slab 2. Mirror 25 is properly tilted, so that the backward-going pumping beams have a small deviation from the original path and then are effectively blocked off and re-reflected by beam block 24. These pumping beams can make at least two roundtrips, traveling back and forth between beam block 24 and mirror 25.

When an one-dimensional spatial filter arrangement is employed, aperture 24 would have a line-shaped opening, instead of be a pinhole. Lenses 23 are a cylindrical lens pair. When the pumping beams are collimated in one dimension, lens pair 23 may be made to slightly correct the pumping beams in the slow-axis plane of diode bar 12. Further, lens pair 23 can be configured likewise as a beam expander or reducer to compromise the sizes between the laser slab and the pump source. As a further alternative, the two positions between A and B in the drawing can be exchanged.

In addition, as shown in FIG. 11B, the one side of slab 2 is directly in contact with a heat sink 7. Heat sink 7 has a metalized mirror surface in order to replace mirror 25. A similar thermal management will be treated in some detail in FIGS. 14 and 15.

FIG. 12A shows a multipass, side pumped geometry for pumping laser rod 2. This pump arrangement is varied from that shown in FIGS. 11A–B, in which a corner reflector 27 is used instead of mirror 25. Meanwhile, a linear array laser diode bar(s) 11 and cylindrical collimating lens 26 are employed. The pumping approach by use of a corner reflector for pumping laser rod has been disclosed in the parent patent of U.S. Pat. No. 5,548,608 in detail. The redundant description will be avoided for simplicity.

Further, the refraction effect, resulting from laser rod 2 surrounded by cooling water 28, will cause a detour of the pumping beams. In order to confine the detoured pumping beams and enhance multipass pumping, with the aid of the conception based on the noncircular-profile reflector pump head as shown in FIGS. 3A–B and 4A–B, one can build the structure shown in FIG. 12A as a multipass noncircular-profile reflector. Accordingly, such a reflector is made up of an HR coated envelope, including beam block 24 and corner reflector 27. In other words, the noncircular-profile has own two ends. One end is beam block 24. The other one is corner reflector 27. All inner of them have a mirrored surface. Aperture 24 now becomes slit 5 as described before in PART III. This noncircular-profile corner reflector 29 is shown in FIG. 12B. On the other hand, there are two end cap assemblies or end cap manifolds (not shown) in order to hold laser rod and to furnish passages for the entry and exit of a cooling fluid. They also have mirrored inner surfaces.

In FIG. 12B, the pumping light travels back and forth between beam block 24 and corner reflector 27, which reflect multiple passes of the pumping light through laser rod 2. Clearly, this architecture is a combination between the multipass geometry and corner reflector, resulting in some super advantages in the pumping process. First, the pumping beams almost have a full chance to pass through laser rod 2 in every round trip between beam block 24 and corner reflector 27. Second, considering the multipass pumping process, the rod location within the corner reflector could be relaxed to some extent. Third, cylindrical collimating lens 26 may be omitted.

Finally, a TIR-guide optical duct can be inserted into aperture 24 for input pumping beams. To input combined pumping beams coming from multiple diode bars also can be applied. Therefor, this setup is a key pump embodiment in accordance with the present invention, and named as the Noncircular-Profile Corner Reflector Pump Head. In fact, with the use this pump head, it would be not difficult to obtain pump absorption efficiency over 50% even with a 2-mm diameter laser rod.

Part VII
Engineering Design for Multipass Planar TIR-Guide Pump Head
FIGS. 13A–C to FIGS. 17A–G

In this section, with the principles of the present invention, several engineering designs are presented in FIGS. 13A–C to 17A–H. These designs, as some exemplary and the proof-of-principle embodiments, are aimed to the highly compact pump heads with multiply pumping, and particularly for solving cooling problems and realizing the optical propagation along a zig-zag optical path within laser slabs.

FIGS. 13A–C illustrate one of the schematic diagrams of the engineering designs for the multipass planar TIR-guide pump head. It is essentially relevant to the embodiment shown in FIGS. 5A–B; in which slab 2 is conductively cooled and sandwiched by two optical ducts 17. Optical duct 17 should be transparent for pumping beams and fabricated of the material with a high thermal conductivity, such as crystalline sapphire, undoped YAG, and $MgF_2$. Its side faces need to be polished up to optical quality, and to be brought into contact with the slab-surfaces, or through a thermally conductive, transparent bonding medium. FIG. 13A shows the experimental setup.

As for cooling, four heat sinks 7 are bonded to the two sides of the peripheral section of duct 17 for heat dissipation. Heat sinks 7 are further in contact with TE coolers 31 and cold plates, i.e., liquid heat exchanger 32. As an alternative, the coolers, i.e., chilled, temperature-controlled liquid-cooled cold plates may also directly be bonded to duct 17 for cooling. The surfaces of duct 17 within the bond area are directly covered by metal foil 8, such as aluminum or indium foil for maintaining TIR. A heat spreader 33, including silicone heat paste and thermal grease, is applied to the bond area between foil 8 and heat sinks or coolers 7 to enhance their thermal contact and mechanical flexibility. As an alternative, the duct 17 may has a thick metal coating to protect TIR.

The design shown in FIG. 13A should be further improved in accommodating the optical propagation along the zig-zag optical path within laser slabs, except for optical duct 17 made from a low refractive index material, such as $MgF_2$. The realization of these improvements can be made via two approaches as that discussed in the section of FIGS. 10A–D. In the first approach, slab-surfaces are coated with a protective coating, such as optical-grade epoxy, cement J91, $SiO_2$ coating, Teflon AF 1600 or an appropriate optical clear bonding material. In the second approach, as shown in FIGS. 13B–C, two $MgF_2$ windows 34 are inserted between optical duct 17 and laser slab 2 to preserve TIR. An optical clear film such as silicon gel may be used as well. This approach, using $MgF_2$ windows to protect TIR, has been reported by Prof. Byer in their article entitled "A CW, $TEM_{00}$ Mode, Diode-Laser-Pumped, Nd: YAG mini-Slab Laser", which appeared in Advanced Solid-State Lasers, pp. 60, 1994.

FIGS. 14A–D and FIGS. 15A–U illustrate some further simplified pump head configurations for conduction cooled zig-zag slab lasers. They are the key pump embodiments in accordance with the present invention.

In FIGS. 14A–B, one major side of a laser slab 2 is contacted or bonded to optical duct 17. The optical bonding material is able to withstand a high temperature and has a low refractive index to protect TIR for the laser zig-zag path. Or laser slab 2 has a protective coating or $MgF_2$ window to protect TIR for the laser zig-zag path as discussed above. Or optical duct 17 is made from a low refractive index material.

The other major side of laser slab 2 is in contact with a heat sink or cooler 7 via a metal foil 8. A heat spreader, such as silicone heat paste, is interposed between cooler 7 and metal foil 8 to enhance their thermal contact and mechanical flexibility.

In the cases when the cooling side of slab 2 do not meet the TIR condition for the pumping light, one of the following procedures can be selected in order to reflect pumping light and to preserve TIR for the laser zig-zag path within laser slab 2. First, the relevant surface of cooler 7 is a metalized mirror. Second, metal foil 8 has a high reflectivity. Third, the cooling side of slab 2 is HR coated at the pump wavelength. And the $SiO_2$ or $MgF_2$ material should be used as the first layer of the HR coating. On the other hand, the issue of suppression of lateral parasitic lasing modes also need be considered.

As a further alternative, laser slab 2 may not be bonded to optical duct 17 directly so that an interstice is present between them. In such case, same as mentioned in FIGS. 9A–B, one need to select a propel incident angle to allow the pumping beams going through interface without TIR. Or to put an AR-coating or extra-thin metal coating on the end surface of optical duct 17, where is interfaced with the interstice, in order to interfere TIR and attain the so-called attenuated total internal reflection. For convenient, this join approach for laser slab 2 and optical duct 17 can be named as Indirect Interface. In contrast, the former one is termed as Direct Interface.

FIGS. 14C–D give a setup similar to that shown in FIGS. 14A–B. The redundant description will be avoided for simplicity.

In all of the above slab laser TIR-guide pump heads, the pump surface of laser slab 2 is its major faces, or called zig-zag faces. Now, in FIGS. 15A–B, the pump surface of slab 2 is the minor face, i.e., the top and bottom faces. The pump trip direction is perpendicular to the minor surfaces and parallel to the major surfaces. A laser slab 2 is sandwiched between two heat sinks or coolers 7 with its zig-zag faces, such as the liquid-cooled cold plate. Metal foil 8 and heat spreader are interposed between laser slab 2 and cooler 7. The entered pumping beams are confined by laser slab 2 via TIR along a zig-zag optical path. This structure actualizes multiply pumping but eliminates the need of the protective coating on the surface of laser slab 2, offers efficient cooling and simplifies the maintenance for TIR on the zig-zag faces.

Note that FIG. 15B only shows two heat sink 7 and laser slab 2. And two heat sinks 7 are not shown in FIG. 15A. Further, there is a thin optical duct 17 to be interfaced with one of minor surfaces of laser slab 2. And the zig-zag pump path usually is long enough within laser slab 2. Meanwhile, the above-specified Direct Interface and Indirect Interface in FIGS. 14A–D, both of them can be applied to the present cases.

In addition, as an alternative, some shaped pumping beams may also be used to directly impinge on the top and bottom faces of laser slab 2 for pumping. In fact, this pumping approach has been disclosed in the parent patent of U.S. Pat. No. 5,515,394, claim 16.

The zig-zag slab laser pump head shown in FIGS. 15C–E is varied from that shown in FIGS. 15A–B. The pump surface is the minor surface of laser slab 2. Optical duct 17 and input coupler 18 are preferably made from undoped YAG. Laser slab 2 is sandwiched between two heat sinks 7 symmetrically. Metal foil 8 and heat spreader are interposed between laser slab 2 and heat sink 7. The pump trip direction is perpendicular to the pump surface—the interface between laser slab 2 and optical duct 17. Note that two heat sinks 7 in FIG. 15C and diode bar 11 in FIGS. 15D and 15E are not shown for simplicity. The redundant description will be avoided for simplicity.

Meanwhile, however, in FIGS. 15C–E a unique input coupler and pump arrangement are employed. The relevant input coupler 18 and diode bar 11 are shown in FIGS. 15F–G, the front view and side view, respectively. Input coupler 18 and optical duct 17 are bonded together side by side by diffusion-bonding, or via an index-matching transparent bonding material, or via optically contacting. They have a 45°-angle respect to each other as shown in FIG. 15C. Besides, the two side surfaces of input coupler 18 are coated with gold, so as to protect the returned pumping light from escape.

The end facet of input coupler 18 has a tapered shape and is inclined at an angle of $\phi=22.5°$ respect to the side facet as shown in FIG. G. In such an arrangement, part of pumping beams from diode bar 11 directly enter into optical duct 17 thru the interface between input coupler 18 and optical duct 17. Part of pumping light is reflected by the tapered end facet of input coupler 18 and then enters into optical duct 17 with a 45° incident angle.

As an alternative, one can made this unique input coupler with a regular end facet. Meanwhile, the butt coupling between the diode bar and the input coupler now should be replaced by adding an additional input coupler, i.e., second input coupler. The diode bar is butt-coupled to the second input coupler, same as a regular one. The pumping light enters the second input coupler firstly, then be inputted into the first input coupler with zig-zag paths.

This arrangement with two input couplers is shown in FIG. 15H and has the same structure as that shown in FIG. 15A, except the optical duct in FIG. 15A now becomes a input coupler. Hence, before entering into optical duct 17 the pumping light goes through two input couplers, the first one and the second one. Consequently, the pumping light tends to experience two perpendicular zig-zag paths along two perpendicular planes within optical duct 17. This coupling approach can be named as Double Input Coupler Approach or Multiple Input Coupler Approach.

In the following TIR-guide slab laser pump heads shown in FIGS. 15I–J, FIGS. 15K–M, FIGS. 15N–O, FIGS. 15P–Q and FIGS. 15R–S, several similar arrangements for the face-pumped laser slab sandwiched between two heat sinks have been developed. In these cases, the two major surfaces of laser slab 2 still serves as a pump surface distinguishably even it is sandwiched between two heat sinks.

In all those cases shown in FIGS. 5A–B, 6A–B, 10A, 13A–C, 14A–D, FIGS. 15A–B and FIGS. 15C–E, the pump trip direction is perpendicular to the pump surface, i.e., the interface between laser slab 2 and optical duct 17. In contrast with them, in these cases shown in from FIGS. 15I–J to FIGS. 15R–S, the pump trip direction is parallel to the interface between laser slab 2 and optical duct 17, i.e., the pump surface or major surfaces of laser slab 2. Note that the pumping beams now branch off and run into the pump surface via zigzag pump paths. In addition, all pump approaches mentioned here shown in FIGS. 14A–D to FIGS. 15A–U almost enable entire slab pumping from tip to tip, so as to eliminate the thermo-optical "potato chip" distortion associated with the long unpumped Brewster tips. This situation will also benefit the laser operation for a quasi three-level laser system.

In FIGS. 15I–J one major surface of laser slab 2 is bonded to optical duct 17. When the refractive index of optical duct 17 is not low enough to protect TIR for the laser zig-zag path, laser slab 2 would have a protective coating. The other major side of laser slab 2 is in contact with a heat sink or cooler 7 via a metal foil 8. A heat spreader, such as silicone heat paste, is interposed between cooler 7 and metal foil 8 to enhance their thermal contact and mechanical flexibility.

Meanwhile, in FIG. 15I, the double input coupler shown in FIG. H above is employed. It would cause a relative large incident angle such as 45° on the interface for the pumping beams so as to avoid TIR while pumping beams enter laser slab 2 via the protective coating. In FIG. 15J, laser slab 2 and optical duct 17 are sandwiched between two heat sinks 7 that provide both conduction cooling and solid mechanical contact. Further, the issue of suppression of lateral parasitic lasing modes and ASE need be paid attention. Note that diode bar 11 in FIGS. 15I–J and two heat sinks 7 in FIG. 15I are not shown for simplicity.

FIGS. 15K–M outline a zig-zag slab laser pump head which is almost same as that shown in FIGS. 15I–J. The optical duct is made of the optical clear material of a low refractive index, preferably with good thermal conductivity, such as $MgF_2$. Note that the critical angle $i_c$ of the material $MgF_2$ is 46.88°.

Accordingly, if the incident angle is selected to be 52°, and the divergence angle in the X-Z plane of the inputted pumping beams is ±4° or less, all the major surfaces of optical duct 17 are able to meet the TIR condition except its minor end surfaces. Thus, its minor end surfaces have a HR coating 4 at pump wavelength on purpose.

Furthermore, the end of thin planar optical duct 17 adjacent to laser slab 2 is tilted and gold coated in order to change the incident angles of the pumping beams for effective zig-zag pumping.

Laser slab 2 is sandwiched between two $MgF_2$ optical ducts 17 and two heat sinks 7 symmetrically. Each heat sink 7 has a mirrored surface 21 which is interfaced with the broad surface of thin planar optical duct 17 in order to reflect the pumping beams and realize multipass pumping. The redundant description will be avoided for simplicity. Note that two heat sinks 7 in FIGS. 15K and 15M and diode bar 11 in FIG. 15M are not shown for simplicity.

As a further step in the evolution of the present invention and similar to FIGS. 15I–J and FIGS. 15K–M, some advanced face-pumping arrangements have been further developed as shown in FIGS. 15N–O, FIGS. 15P–Q and FIGS. 15R–S.

In FIGS. 15N–O, laser slab 2 with a protective coating is sandwiched between two pieces of thin planar optical duct 17 firstly, then two heat sinks 7 symmetrically. With the use of four double input couplers 18, four diode bars 11 are employed for pumping. Optical duct 17 and double input coupler 18 are preferably made from undoped YAG. Same as that described in FIGS. I–J, the double input couplers would cause a relative large incident angle such as 45° on the interface for the pumping beams so as to avoid TIR while pumping beams enter laser slab 2 via the protective coating. Note that four diode bars 11 and two heat sinks 7 in FIG. 15N are not shown for simplicity.

In FIGS. 15P–Q, laser slab 2 with a protective coating is sandwiched between two pieces of thin planar optical duct 17 firstly, then two heat sinks 7 symmetrically. Another two pieces of tapered planar optical duct 17 are arranged symmetrically as shown. They are further in contact with the other two pieces tapered input couplers for input pumping beams from two 350-W 2-D stacked diode bars 12. The redundant description will be avoided for simplicity.

Finally, in FIGS. 15R–S, the pump arrangement almost is same as that shown in FIGS. 15N–O. There is a sandwich construction with three layers. The middle layer is laser slab 2. For the upper layer or lower layer, four pieces of thin planar optical duct 17 are combined together in the XZ plane. The center portion of this combination is empty. Therefore, the pumping beams are inputted into laser slab 2 from its two end sections rather than the center section so as to prolong the pump paths. Note that four diode bars 11 and four double input couplers 18 are not shown in the drawings. The redundant description will be avoided for simplicity.

In FIG. 15T, the laser slab is characterized by having square-cut ends rather than the more conventional Brewster tips and by its folding of the zig-zag path by means of an BR coating on one end at laser wavelength. This square-cut design trades off some parasitic standoff to eliminate the thermo-optical "potato chip" distortion associated with the long unpumped Brewster tips. The pump arrangement applied here would be identical to that shown in FIGS. 15A–B, FIGS. 15C–E, FIGS. 15I–J, FIGS. 15K–M and so on. Meanwhile, the input of pumping beams may be directed and coupled into the front facet of a square-cut end of the laser slab. This pump approach is also distinguished by a zig-zag pumping path. The pumping beams will be confined within two major surfaces of laser slab 2 via TIR. In FIG. 15U, the situation similar to that shown in FIG. 15T. The redundant description will be avoided for simplicity.

Those above-specified TIR-guide pump approaches are characterized by the follows. First, an optical duct and an appropriate input approach are selected, in order to obtain zig-zag pump path within the optical duct and laser medium. Second, the pumping beams, once entering, are extensively confined within the optical duct and laser medium with a zig-zag pumping path mainly via total-internal-reflection until they are absorbed by the laser medium.

FIGS. 16A–P and FIGS. 17A–G show two similar schematic diagrams of the engineering design for the prototype of the multipass planar TIR-guide pump head with coolant cooling, i.e., the Direct Cooling Approach. They are the important pump embodiments in accordance with the present invention and principally for high power operations. In FIG. 16A, a pump head module, i.e., a slab housing, includes a laser slab 2, insulator 43, laser slab assembly, lower cover plate 44, upper cover plate 45, O-rings 46, a pair of plenum 47, inlet/outlet 48 and coolant passages 49. Insulator 43 can be made by a special glass, such as Samarium glass to absorb the radiation at lasing wavelength and to suppress transverse parasitic lasing as implied by U.S. Pat. No. 4,969,155. The rear of insulator 43 is HR coated at pump wavelength. Its cross-sectional shape is exemplified as rectangular.

The pump head has a pair of input and output plenums 47 mounted on the opposing sides which allows coolant, via two slots, to pass over the side faces of slab 2 uniformly. The geometrical construction of coolant channel, whose size preferably greater than the thermal boundary layers, may physically set up by the conditions for promoting laminar coolant flow or efficient cooling. An anti-freeze coolant such as methanol also can be applied. In addition, as an alternative, the slots may be replaced by a series of holes, evenly spaced, along the length of laser slab 2. Another variant may include a flow modifying vanes, or a porous material placed over the coolant channels to promote laminar or uniform flow as indicated by U.S. Pat. No. 5,394,427.

On each side of laser slab 2, lengthy optical duct 17 consists of two ducts, i.e., the minor part and the major part. The major part of optical duct 17 drawn with a phantom line may be made from an economical, optical clear glass or plastic, preferably with a high refractive index.

FIGS. 16B–D show the related laser slab assembly. The two minor parts of optical duct 17 are bounded together by two slab holders 41 with waterproof sealant. There are two slots at both of either slab holder 41. The two ends of laser slab 2 are each embedded into either slot on the two holders 41. The two holders 41 are standing parallel to each other. In order to elastically support the slab and prevent leakage of the coolant, each end of slab 2 is bonded to the inside of the slot via a bonding material, such as a silicone RTV, which remains pliant after it has fully cured. The flexibility of the bonding material provides mechanical isolation of laser slab 2 and prevents it from the strain due to thermal induced mechanical changes by the housing.

Besides, the minor part of optical duct 17 is preferably made by the same undoped laser material to further minimize the thermal induced mounting stress contributed to laser slab 2. Meanwhile, laser slab 2, particularly for its end part, may be coated with $SiO_2$ or Teflon to save TIR in case. TIR occurs even when these faces are in contact with water or a $SiO_2$ buffer layer. As an alternative, the above-mentioned sealant of silicone RTV may be replaced by a O-ring structure for holding laser slab 2 and for coolant sealing.

FIGS. 16E–F show lower cover plate 44. There are two slots 49 served as a coolant channel, two O-ring's grooves 42, and an HR coating 50 at the pump wavelength on the central area of it. Further, a Samarium glass mirror 51 may replace the HR coating 50. FIGS. 16G–H and FIGS. N–O show upper cover plate 45 and the design for a Samarium glass mirror 51. FIGS. 16I–K show laser slab holder 41. FIGS. 16L–M show plenum cover 47. FIG. 16P shows a perspective, exploded view of the pump head module. With the laser slab bonded in place, the pump head module simultaneously provides mechanical isolation of the slab and thermal insulation of the slab side surfaces.

In addition, transparent silicon rubber O-rings are usually used for the present design. Otherwise, in order to shield O-rings 46 from the pumping light, a metal ring (not shown) with an HR coating at the pump wavelength may be added to the inner of O-rings 46. It has a smaller diameter and may be attached to a spring that is fixed to the inside of a groove (not shown). Further, for keeping up TIR in case, O-rings 46 should be made from the material of a low refractive index. Or a film of a low refractive index is inserted between O-rings 46 and duct 17.

In FIG. 17A, a pump head module, i.e., a slab housing, includes a laser slab 2, laser slab assembly, lower cover plate 53, upper cover plate 54, O-rings 46, plenum cover 47, inlet/outlet 48 and coolant passage 49.

FIGS. 17B–C show the related laser slab assembly, in which laser slab 2 and the two minor parts of optical duct 17 are bounded together via four fixers 52 with waterproof, optical clear sealant. The two minor parts of optical duct 17 and fixer 52 are preferably made from the same undoped laser material or sapphire. As discussed in FIGS. 4A–B and FIGS. 10A–D, when the refractive index of optical duct 17 and fixers 52 are large enough and the incident angles of pumping beams are close to 45°, all sides of them will keep TIR. Therefore, the pumping beams will transmit among them without power leakage even though their faces are not HR coated and the face-to-face contact among them are partial. A small area at each end of slab 2 is bonded to four fixers 52 with a material that remains pliant after it has fully cured. This structure allows pumping and cooling up to the very end of laser slab 2.

FIGS. 17D–E show lower cover plate 53. There are two slots 49 served as a coolant channel, two O-ring's grooves 42, and a HR coating 50 on the central area of it. Same as described above, a Samarium glass mirror may be used to replace the HR coating 50. FIGS. 17F–G show upper cover plate 54. The redundant description identical to that presented in FIGS. 16A–P will be avoided for simplicity.

The laser slab in FIGS. 16A–N or FIGS. 17A–G is formed or shaped as an elongate body and generally can have any rectangular cross-sectional dimension and length practical for operation of such lasers, as the present invention is readily scaled over a wide range of dimensions and a particularly wide range of lengths.

Those arrangements shown in FIGS. 11B, 13A–C, 14A–D, 15A–U, 16A–P and 17A–G are able to provide stress-free or O-ring-free slab mounting and sealing, and enable an entire slab cooling from tip to tip for both impingement and conductive cooling systems with a zig-zag laser path.

In conclusion, in combination with a beam-expanding cavity and the aforedescribed multipass pump heads, a zig-zag slab laser enable one to effectively solve thermal distortion problems, obtain $TEM_{00}$-mode operation and maximize the energy extraction from laser slab in high power DPSS lasers. It also leads to achieving high-performances of intracavity frequency conversions.

Part VIII
Improvements for Dube's Pump Cavity
FIGS. 18A–C

In the U.S. Pat. No. 5,619,522, G. Dube devises a novel multipass pumping configuration. His pump cavity is primarily made up of two semi-cylindrical, or two arcuate, or two one-half of a regular polygon optical reflective surfaces. There is no or little deference between the two radii of the pair. They are arranged co-linearly but not co-axially with each other. Thus, the longitudinal axes of the two reflective surfaces are parallel and off-set from each other. This pumping geometry converges the pumping beams to the center area once entering at the edge of the pump cavity. Afterwards, it diverges from the center area along the original spiral paths, via multiple reflecting by the two reflective surfaces.

Nevertheless, Dube fails to discover a key factor in his invention. That is, it is vital to obtain a high reflectivity in practice so as to be successful in the multi-reflecting pump process. The angles of incidence of the pumping beams on the main/end surfaces within the pump cavity vary and spread widely, particularly for pumping a laser rod with a small diameter, which is mostly desired in the DPSS lasers. In such a case, the pumping beams usually need more than a few tens of reflections to reach the center area and stay long enough within Dube's pump cavities. As mentioned before, the reflectance of conventional, multilayer dielectric coatings, which usually have the highest reflectivity, is most sensitive to the angle of incidence. And the reflectivity of the metallic coatings, such as gold or silver, will drop markedly at a large angle of incidence.

In order to solve the key issue that remains unsolved in Dube's invention, the principles of the present invention will enable one to build the Dube's pump cavity as an optical TIR-guide structure aforespecified.

FIGS. 18A–B are, respectively, the side sectional and perspective views of the first Dube TIR-Guide Pump Head pumped by one linear array laser diode bar. A laser rod 2 is surrounded by a pair of semi-cylinder optical duct, i.e., upper optical duct 61 with radius R1 and lower optical duct 63 with radius R2. There is little difference between the two radii R1 and R2 of the pair. They are arranged colinearly but not coaxially with each other. The center of upper optical duct 61 is at 62, whereas the center of lower optical duct 63 is at 64. The centers of the two surfaces are thus off-set from each other. In the same way as previously described, a beam guide input coupler 18 is placed and contacted with the surface in the shape of a strip, i.e., the physical opening at the outermost portion of lower optical duct 63. Input coupler 18 guides the pumping beams into the TIR-guide pump head at a certain angle of incidence, preferably 45°, along the XZ plane as shown. After properly selecting the optical duct of a large refractive index, typically larger than 1.6 approximately, TIR will occur on all the optical surfaces, including the end optical facets of the optical duct.

Similarly, FIG. 18C shows the side sectional view of the Second Dube TIR-Guide Pump Head. A laser rod 2 surrounded by a cooling fluid 67 is received in two one-half of a regular polygon, i.e., a pair of corner optical duct, i.e., upper optical duct 65 and lower optical duct 66. There is little difference between the two sizes of them. They are arranged colinearly but not coaxially with each other. In the same way as aforespecified in FIGS. 6A–B, a one-dimensional collimating lens 13 is applied to collimate the pumping beams before entering, in order to meet the need for TIR. And upper optical duct 65 and lower optical duct 66 should have large enough refractive index. As previously emphasized, the two end optical facets of the optical duct would not need to be coated in light of TIR, considering the large angles of incidence of the pumping beams.

In regard to the thermal management, the Direct Cooling Approach aforespecified can be applied. The direct cooling approach is illustrated in the drawing. A hole within the optical duct provides a tubular sleeve and forms a passageway through which coolant flows in direct contact with laser rod 2. On the other hand, there are two end cap assemblies or end cap manifolds (not shown) in order to hold laser rod 2 and to furnish passages for the entry and exit of cooling fluid 67. They may be clamped together from both sides of the two end optical facets of upper and lower optical duct 65 and 66 via O-rings. An aluminum foil should be inserted into the bond area between the optical facets and the O-rings to maintain TIR.

Next, in order to obtain the high reflectivity, one can build Dube's pump cavity as a double-layer reflector pump head. FIG. 18D shows the side sectional view of the Dube Step-Index Double-Layer Reflector Pump Head. A laser rod 2, surrounded by a optical duct 17 in the shape of a cylinder or the like, and encompassed by a fluid 76, is received and located in the center area of a pair of semi-cylinder inner sleeves 71 and 73, preferably made of a regular glass material. There is little difference between the two radii R3 and R4 of the pair. They are arranged colinearly but not coaxially with each other. A pair of outer sleeves 72 and 74 surrounds inner sleeves 71 and 73 with an air interstice. And their inner surfaces are HR coated at the pump wavelength, i.e. coating 75, and matched to the outer surfaces of inner sleeves 71 and 73 geometrically in the cross-section.

The unabsorbed pumping beams internally impinge upon an air-to-solid interface from the inside of inner sleeves 71 and 73. Those pumping beams with an angle of incidence larger than the critical angle are fully reflected by the outer surfaces of the inner sleeves due to TIR. And the remaining pumping beams, which have small angles of incidence, will not comply with the TIR condition and be repetitively reflected by the inner surfaces of outer sleeves 72 and 74.

As for the end management, it should be similar to that described in the above FIG. 18C. As an alternative, particularly in cased when the radial extent of the coolant channel is large, two extra optical plates with a center hole would be inserted between the optical facet of the inner sleeves and the caps, so as to prevent the pump power leakage from the coolant channel. The redundant description will be avoided for simplicity. Once again, in FIG. 18D, the outer surfaces of inner sleeves 71 and 73 are not coated. Those pumping beams with their angles of incidence larger than the critical angle would be fully reflected via TIR. The HR coated reflector reflects the remaining pumping beams with relatively small angles of incidence.

The two refractive indexes of inner sleeve 71/73 and fluid 76 are preferably the same or close. They should be properly selected to form a step-index structure associated with optical duct 3. Also, the related parameters, such as the diameter of optical duct 3, the radial extent of the coolant channel should be designed appropriately. But the criteria for the design are somewhat different from those for the regular one aforespecified in FIG. 2D or FIG. 2E. A person skilled in the art would be able to carry out an applicable design. Such a step-index structure is capable of preventing the pumping beams from deviating from the center area, returning to the original spiral paths and exiting.

Apparently, the pumping configurations shown in FIGS. 18A–C can be applied to the TIR-guide disk pump head to produce a thin gain zone within a gain medium, or also to an optical amplifier as discussed below in FIGS. 20A–B.

Part IX
TIR-Guide Pump Head for Pumping Fiber Laser
FIGS. 19A–D

In the rapidly growing field of optical signal communication systems, fiber lasers of the type that comprise optically transmissive cores doped with rare earth ions are being increasingly recognized as important components of such systems. Thus, rare-earth optical fiber lasers can be utilized in these systems as optical signal generators, or optical signal amplifiers, or pump lasers for other optical fiber amplifiers.

Many efforts have been made to devise a more effective way of increasing the pumping power that can be delivered to the core of a single-mode fiber amplifier. Several advanced technologies on cladding-pumped optical fiber lasers, commonly referred to as cladding pumping, have been developed. They are described in U.S. Pat. No. 5,530,709 and No. 5,530,710, and in the paper "High power neodymium-doped single transverse mode fiber laser," Elec. Lett. 29(1923)17, p.1500.

The cladding-pumped fiber being presently used relies on a relatively large, separately light-guiding pump cladding that surrounds a much smaller rare-earth-doped fiber core. Pump light from a diode array is focused into the pump cladding with the end-pumping or quasi-end-pumping schemes, and then confined and guided within the cladding. As the pumping light propagates along the cladding, the light crosses over and is absorbed by the single-mode core, thereby supplying pumping power. The approach enables the absorbed multimode power to be converted into a single-mode laser emission within the fiber core.

In order to further expand the utilization of the present invention to pump optical fiber lasers or fiber amplifiers, the novel side-pumping approaches characterized by the multipass pumping geometry can significantly be applied. In some preferred practice, a fiber assembly in a certain shape can be used to replace the laser slab 2 in FIGS. 4, 5, 6, 13, 14 and 15 above, under the condition that an optical fiber with a rare-earth-doped core is arranged repetitively through the multipass pump area.

As an exemplary configuration of the preferred embodiment, FIG. 19A shows a pump arrangement capable of providing multipass side-pumping for fiber lasers and fiber amplifiers. It is one of pump embodiments for pumping optical fibers in accordance with the present invention. This pump arrangement is identical to that shown in FIGS. 5A–B, except that laser slab 2 is replaced by a fiber assembly 82. Fiber assembly 82, as shown in FIG. 19B, is built up of an optical fiber 81 with a rare-earth-doped core. Fiber 81, whose outside coating should be peeled off or be transparent to the pumping beams, is being winded onto an inner frame 83 and placed between inner frame 83 and an outer frame 84. The critical radius, usually around 10-cm, for the fiber bend loss should be considered.

Both the inner and outer frames 83, 84 are optically clear to pumping beams and have a refractive index same as or close to that of fiber 81. In order to facilitate effective and efficient pumping, fiber 81 is preferably being winded layer upon layer, piled up, and then laminated with optical filler 85, such as optical cement, optical-grade epoxy and melting glue. The optical filler has a proper refractive index so as to protect optical paths from distortion. FIG. 19C shows the perspective view of fiber assembly 82.

As all alternative shown in FIG. 19D, fiber assembly 82 can be pumped sectionally by one or more pump heads, where several phantom rectangular areas are indicated for pumping, and every pump area is pumped by a pump head shown in FIG. 19A. Considering that fiber assembly 82 is not entirely pumped, the absorption loss within all unpumped volume of fiber 81 should be small. Under the pump arrangement of FIGS. 19A–D, there is no special requirement for the configuration and sectional profile of fiber 81, except that its protective material or coating is transparent for the pumping beams.

As a further alternative, the slab laser pump heads shown in FIGS. 15A–B, 15C–E and 15I–M also can be used for pumping fiber assembly 82. In such an arrangement, fiber assembly 82 and optical duct 17 can be directly interfaced or indirectly interfaced, as indicated in FIGS. 14A–B. Meanwhile, an optical clear, index-matching filler is used to fill up fiber assembly 82.

Part X
Multipass Optical Amplifier and Detector
FIGS. 20A–B to FIG. 21

As a further extension in accordance with the principles of optical multipass geometry of the present invention, the TIR-guide disk pump head shown in FIGS. 1A–F can easily be modified to become a multipass optical-amplifier shown in FIGS. 20A–B, or a multipass laser intensified detector shown in FIG. 21.

FIG. 20A shows the multipass geometrical paths in a Multipass Optical-Amplifier which are initiated from an input signal 91. The physical structure of the multipass optical-amplifier is identical to that shown in FIG. 1D. Input signal 91, once entering from an entrance 5, is confined within the planar TIR-guide disk and multi-reflected by outside coating 8 of cladding 3 at points a, b, c,—up to the exit point j successively. Thus, input signal 91 passes through the gain medium of laser chip 1 to be amplified as many times as needed until outputting from the exit at the j point as an output signal 92. The exit is an AR-coated or un-coated window at the signal wavelength.

As for the pumping scheme, the gain medium can directly be pumped by a pumping light 93 as shown in FIG. 20B, or by the pumping light that has the same or similar optical track as that of the amplified signal. The pumping scheme shown in FIGS. 1A–D also can be used for the purpose. Besides, Dube's multipass geometry shown in FIG. 18C can be constructed as a TIR-guide disk and become a multipass laser amplifier. The repetitious description will be avoided for simplicity.

Further, under the circumstance that the signal beam is supplanted by a probe laser beam, and that the gain medium in the TIR-guide disk pump head is replaced by a detecting region, or sample cell, or a molecular beam, such a multipass apparatus can widely be applied for many detection and spectroscopy purposes.

FIG. 21 shows a Multipass Laser Intensified Detector for optical or spectral detection, including particle detection. A probe laser beam 94 is input to a TIR-guide disk and repeatedly passes through the center area—a detecting region 95. Detecting region 95 is used for receiving a sample, such as a particle sample, i.e., particles or particle-containing fluid. Particles in the fluid may pass through the detecting region at high flow rates. Particles are exposed to probe laser beam 94 so as to produce a scattered light (not shown). When collected, the scattered light can be used to provide an output indicative of the information about the particles at the detecting region. The multipass process can largely intensify the output.

Detecting region 95 has a smaller refractive index $n_0$ than $n_1$ of pump cladding 3 so as to distort the optical path of laser beam 94. Therefore, in order to correct this distortion, a path-compensating ring 96 with a proper refractive index $n_2$ has been added. Moreover, the pump cladding also can be constructed as graded- or step-index pump cladding 9 to centralize probe laser beam 94 identical to the situation discussed in FIGS. 1E–F. In the situation for the multipass absorption detection, laser chip 1 in FIGS. 20A–B should be replaced by an absorption sample. And the rest will be kept same.

Part XI
TIR-Guide Pump Head for Pumping Extra-Thin Laser Media or Fiber Laser
FIGS. 22A–C to FIGS. 24A–D In this section, in order to use extra-thin laser media, some new-fashioned designs are presented as further developments for TIR-guide disk pump heads as shown in FIGS. 1A–G and for TIR-guide pump heads such as shown in FIGS. 9A–B and FIGS. 19A–D. In these designs, the embedded constructions have been employed.

FIGS. 22A, 22B and 22C show the TIR-guide disk pump heads in a like manner used for FIGS. 1A–G. An extra-thin laser chip 1 is face to face, directly contacted and bonded to a pump cladding via diffusion-bonding or other optical bonding approach. The pump cladding is either a regular one or with step-index or graded-index. While the regular pump cladding is used, it makes better if laser chip 1 is eccentrically positioned to the TIR-guide disk as discussed before. Further, an input coupler can be applied to adjust the incident angles of the pumping beams in order to increase pumping possibility. They are the important pump embodiments in accordance with the present invention.

In FIG. 22A, laser chip 1 of a thickness 0.2 mm around is integrated and embedded to pump cladding 3 or 9. At first, the front face of laser chip 1 is bonded to the back face of the pump cladding via diffusion bonding or other bonding approach, where the pump cladding is indented. Then, the back face of laser chip 1 together with the back face of the pump cladding is polished to optical quality, then contacted or bonded to an HR mirror 21. As described in FIGS. 9A–B above, there are two choices for Mirror 21 and for thermal management. In addition, a mirrored surface on laser chip 1 encircled by pump cladding 3 also can be applied to replace HR mirror 21. Mirror 21 serves as a rear or fold mirror for laser operations. Furthermore, an extra cooler 7 with a central hole can be added to the front face of pump cladding 3 in order to make better thermal management (Shown in FIG. 22B).

In FIG. 22B, laser chip 1 is surrounded by an additional piece of pump cladding 3, made from sapphire or undoped YAG. A proper bonding approach, such as frit or fusing and diffusion bonding, should be chosen for their joint. The back face of Laser chip 1 encircled by pump cladding 3 is contacted or bonded to HR mirror 21. The situation for mirror 21 is same as that discussed in FIGS. 9A–B and 22A above. On the other hand, As an alternative, a metal foil 8 can be used to replace the additional piece of pump cladding 3 as shown.

In FIG. 22C, laser chip 1 is simply stuck to one side of pump cladding 3 via diffusion-bonding or a high-temperature optical cement 55. The edge structure of optical cement 55 abound laser chip 1 should be smooth to keep up TIR condition. Meanwhile, the interface between pump cladding 3 and cooler 7 has a mirrored surface or an HR coating 21 at laser wavelength serving as an rear or fold cavity mirror.

Those above pumping arrangements also can be applied for pumping an extra-thin laser slab. FIGS. 23A and 23B show part of TIR-guide pump heads almost same as that shown in FIGS. 9A–B and FIGS. 22A–C. In FIG. 23A, an extra-thin laser slab 2 is being integrated and embedded to optical duct 17. Same as that in FIG. 22A, the front face of laser slab 2 is bonded to the back face of optical duct 17 via diffusion bonding or other bonding approach. The back face of laser slab 2 together with the back face of optical duct 17 is polished to optical quality and in contact with a copper mirror 21. Copper mirror 21 has been embedded to heat sink 7 via metal foil 8, where the heat sink is indented. A heat spreader is interposed between heat sink 7 and metal foil 8 so as to enhance their thermal contact and mechanical flexibility.

The situation of laser slab 2 in FIG. 23B is same as that for laser chip 1 described in FIG. 22B. The redundant description will be avoided for simplicity. Note that in FIGS. 23A and 23B, laser slab 2 is not the zig-zag laser slab and its two end faces are not cut at a Brewster angle. The thickness of laser slab 2 is along the Z direction in the drawing.

Meanwhile, obviously these structures can be swapped among that shown in FIGS. 22A–B, FIGS. 23A–B and FIGS. 9A–B. The pump approaches shown in FIGS. 23A–B are also suitable to those cases in pumping laser chip 1, instead of the TIR-guide disk pump head and fiber-optic coupler which are presented in FIGS. 1A–F and FIGS. 22A–C.

FIG. 24A and FIGS. 24B–D show a TIR-guide pump head for pumping fiber lasers or fiber amplifiers, such as EDFAs, Raman amplifiers and hybrid amplifiers which combine Raman and EDFA technologies. It is the important embodiment for pumping optical fibers in accordance with the present invention.

In the present arrangement a rare-earth-doped fiber is being wrapped up and embedded in to an optical duct, similar to that shown in FIGS. 19A–D. As an exemplary configuration of the preferred embodiment, in FIG. 24A a rare-earth-doped fiber 81 is being winded wrap by wrap in the same plane to form a ring-shaped fiber assembly 82 with optical filler 85. Same as described before, it can be further piled up layer by layer, and then laminated with optical filler. One can directly embed this ring-shaped optical fiber assembly to the bottom of optical duct 17, or sandwich it with two pieces of optical duct 17. The filler material has a proper refractive index so as to protect optical paths from distortion.

In FIG. 24B a rare-earth-doped fiber 81 is directly winded onto the outer surface of a disk-shaped optical duct 17 to assemble an optical fiber assembly 82. Same as described before, in order to facilitate effective and efficient pumping, fiber 81 is preferably being winded layer upon layer and then laminated with optical filler 85, such as optical cement, optical-grade epoxy or melting glue. The optical filler has a proper refractive index in order to protect optical paths from distortion. Two different edge structures are shown in FIG. 24C and FIG. 24D.

Part XIV
Extra-High-Power Frequency Conversions & Extra-High-Energy Q-Switch Operation
FIGS. 25A–C After successfully developing high-power DPSS slab lasers above, as a significant extension for the present invention, the following design will be given to overcome the difficulty in the prior art to produce extra-high-power harmonic generations and extra-high-energy Q-switch operations. The basic block is the slab laser same as that described above. The key approach is to reduce power density within the nonlinear crystal, the relevant coatings and within the Q-switch in order to avoid optical damage. Current DPSS laser designs cannot directly scale much further in output power, whatever with harmonic generations or with Q-switch operations at least due to optical damage caused by high power density.

In order to convert the fundamental coherent light to other wavelengths or mid-infrared wavelength, a nonlinear optical process need to be used, including intracavity harmonic generations or frequency conversions. It is well known that for an efficient nonlinear process, a high beam quality or $TEM_{00}$-mode operation is a must.

In the following cavity design, a prism beam-expanding cavity and a laser slab are used together. This combination is capable of employing a laser slab with a large ratio of its height to its thickness, and effectively solving thermal problems, obtaining $TEM_{00}$-mode operation and all-out energy extraction from a laser slab. Furthermore, the larger beam waist within an one-dimensional beam-expanding cavity is essential to reduce power density within intracavity optical elements, such as nonlinear crystals and Q-switch, typically.

FIGS. 25A–B show a slab laser arrangement for extra-high-power harmonic generations and extra-high-energy Q-switch operations. The cavity is an one-dimensional beam-expanding cavity, i.e., a V-type prism beam-expanding cavity (PBEC). This laser setup includes a zig-zag laser slab 2, a slab-shaped SHG nonlinear crystal 101, a ½ λ waveplate 105, a prism beam expander 101 consisting of four prisms, and three cavity mirrors 106, 107 and 108. Here the beam waists, i.e., $W_0$ and $W_1$, are the beam waist before and after being expanded, respectively.

SHG crystal 101 is slab-shaped and placed between $M_1$ and PBE rather than between $M_3$ and $M_2$. As an alternative, slab-shaped SHG crystal 101 also may be made of two or three individual SHG crystals in parallel. The wave plate 105 for the fundamental wavelength should be a ½ λ waveplate and for SHG wavelength should be a full waveplate simultaneously. Their polarization situation just fit into Type I status in the SHG process which is shown in FIG. 25C.

With the existing techniques, each single line-shaped gain region with a diameter 0.5 to 1-mm is able to provide 60 to 80-W around output power at the fundamental wavelength. Meanwhile, each single line-shaped action region within a single SHG nonlinear crystal can provide 25 to 50-W green light approximately.

In the present innovative SHG arrangement, a thin layer or flat sheet action region has been used to replace the regular line-shaped region. That is, the action region within SHG nonlinear crystal 101 is enlarged form a line to a thin layer or flat sheet. Therefore, a thin layer action region within the SHG crystal, which would consist of several said line-shaped action regions, should be capable of supporting and producing several times higher output power than that produced by one line-shaped action region, such as 100-W or over.

When pulsed-mode operations are required, obviously it can be done as following the same way. A Q-switch is inserted between $M_1$ and PBE in order to realize extra-high-energy Q-switch operations. In the present innovative arrangement, the cross-section of the laser beam which passes through the SHG crystal and Q-switch, is a line rather than a point as is the case in a regular cavity. Therefore, the power density impinged on the nonlinear crystal and Q-switch will be largely decreased.

On the basis of the above SHG technology, third and fourth harmonic generations (THG and FHG) by use of two or three nonlinear crystals positioned serially can be applied to directly produce high-power/energy UV output so as to replace excimer lasers. Intracavity higher order harmonic generations are projected as follows. First, SHG crystal 102 in FIGS. 25A–B is replaced by two or three serial nonlinear crystals, such as shown in FIG. 25D. Second, all surfaces of nonlinear crystals should be coated properly. Third, an extra cavity mirror may be added between laser slab 2 and the nonlinear crystals in order to protect the laser slab from UV.

In the THG process the THG crystal sums the two radiation of the fundamental and second harmonic. The high intensity of the fundamental allows for efficient THG. The same situation appears to the FHG. There are two processes to produce FHG in a FHG crystal. One is the summing interaction between the fundamental and the third harmonic. Another is the doubling interaction for the second harmonic radiation itself. In the absence of resonant harmonic generation, the summing interaction in the FHG crystal with a high intensity fundamental radiation is much more efficient than the doubling.

In addition, the above-mentioned SHG, or THG, or FHG crystal usually is a single piece of nonlinear crystal. At present circumstance, they also could consist of several individual nonlinear crystals parallel positioned. Meanwhile, this configuration can also be used to control and adjust the amount of fundamental radiation which is cooperated into the process of harmonic generations. Besides, some newly developed crystals, the periodically poled crystal with quasi-phase-matching; such as periodically poled lithium niobate (PPLN) crystal and periodically poled stoichiometric lithium tantalate crystal (PPSLT) also can be considered.

Part XIII
Blue & Red Laser, Minor Lasing Line Operation

As a further step in the evolution of the present invention, the following designs will be given to overcome the difficulty in the prior art to produce modest or high-power laser operation at minor lasing lines, such as that at 1313 or 914 nm. In this section, based on achieving intense pumping and high-power $TEM_{00}$-mode operations in the present invention, with the aid of an additional approach for minimizing or eliminating spatial hole burning, we are going to achieve this goal.

Nobody has been successful by far to realize high-power CW operation for solid-state lasers at minor lasing lines so as to produce red and blue visible lasers with modest CW output power levels, such as over 2-W red or blue. In U.S. Pat. No. 4,809,291 to Byer, U.S. Pat. No. 5,574,740 to Hargis and some relevant articles, they only reported and taught a method to build a blue laser with small power levels. With a laser operation without spatial hole burning effect, even for weak laser lines, one usually is still able to obtain an effective laser action. In such a case, as long as the cavity Q factor for the undesired laser lines is reduced sufficiently, a stable laser operation at a desired laser wavelength would not be difficult even in scaling to higher pump power levels.

However, when a laser operation under spatial hole burning, one or several oscillating longitudinal mode(s) or wavelength usually can not occupy an entire gain region spatially. In the other words, the entire gain region typically is not fully accessible to the oscillating longitudinal modes or wavelength. Therefore, the unoccupied gain region is readily available to other laser wavelengths. Moreover, when increasing pump power and the length of a gain region, the contribution to the overall gain will be sufficient to allow other modes to oscillate and then take over, particularly to those strong laser lines.

Therefore, in order to obtain a stable and strong laser operation at a minor laser line, one must not only reduce the cavity Q factor sufficiently for those strong laser lines, but also need to minimize spatial hole burning effect and restrain the gain available to them. Or at least, one needs to control the gain's increase available to strong laser lines while scaling to higher pump power levels.

As an attempt to eliminate and minimize spatial hole burning effect, several known methods can be employed for the present purpose. One of important methods is discovered in U.S. Pat. No. 5,627,849 to Baer, in which a sable intracavity SHG has been obtained by way of minimizing mode coupling interactions between the longitudinal modes. Much of other known methods are used to attain stable single frequency operation for solid state lasers, such as the gain sweeping technique as disclosed in U.S. Pat. No. 6,320,889 to MacKinnon and the thin gain region approach with high pump powers as described above and in the parent patent of U.S. Pat. No. 5,515,394.

In the gain sweeping technique, an oscillation means is used for producing a continuous oscillatory change in the optical length of the laser cavity. It causes the standing wave pattern of the desired output wavelength to oscillate as a traveling wave along the cavity optical path. By varying a sufficient amount of the optical length of the laser cavity, the standing wave pattern moves through at least the entire gain region of a laser material for extracting substantially all of the gain from the gain region, so that only the desired output wavelength is lasing. In addition, in order to obtain more stable laser operations, one may use a phase compensater, such as a pair of optical wedge, and then shift their position correlatively so as to produce a continuous oscillatory change in the optical length of the laser cavity. The principle of the gain sweeping technique has been discussed in some books and publishes already.

Accordingly, first, similar to the method used by Baer and introduced and mentioned by Siegman in his famous book "LASERS", one must find an optimum position for the gain region so as to minimize spatial hole burning under the condition of multiple longitudinal modes laser operations. While the gain region is narrow enough and located at the optimum position, a pair of longitudinal modes with a spatially anti-correlated relationship within the gain region always occurs and is going to occupy most of the gain region spatially. The optimum position can be located at ½ L, ¼ L, ¾ L, ⅙ L, and ⅝ L et al, a distance away from one of two end mirrors. Here L is denoted as the total optical length of a standing-wave laser cavity.

In the other word, when a gain region at this optimum position, there is the highest possibility for a pair of anti-correlated longitudinal modes to take place and to occupy most of the gain region spatially, so as to discourage other modes to occur. In this regard, most of the gain region now is fully accessible to the desired output wavelength at the minor line and not available to other laser wavelengths. The spatially anti-correlated relationship means that two corresponding standing wave patterns are spatially anti-correlated, i.e., their peaks and nodes are shifted and altered.

Second, there naturally exists a region around the optimum position. Within this so-called out of phase region, two peaks in the standing wave patterns corresponding to a pair of anti-correlated longitudinal modes are out of phase. Correspondingly, one needs to prolong the optical length L of a laser cavity to best match the gain region.

Third, a narrow gain region or limited gain length should be applied in order to best match the out of phase region. Meanwhile, for an efficient operation of a quasi-3-level system the dopant concentration has to be kept as low as possible while keeping the absorption efficiency high (>80%). However, these two requirements are difficult to meet, particularly at the same time, more particularly in high-power operation for most of pump schemes except those pump approaches used in the present invention.

As an attempt to realize intense pumping, high power operation and at same time restrain the gain region, two aforespecified pump-laser configurations in the present invention are capable of working out those issues above discussed.

The first pump-laser configuration is that, an one-dimensional beam-expanding cavity in cooperation with a disk pump head or the like which can produce a line-shaped thin gain region as shown in FIGS. 9A–C and FIGS. 23A–B. A line-shaped pumping region perpendicular to the lasing direction can not only be located at the optimum position such as at ½ L, ¼ L and ¾ L, but also at the end of the laser cavity adjacent to a mirror provided single longitudinal mode operation occurs.

The second pump-laser configuration is that, an one-dimensional beam-expanding cavity in cooperation with a slab laser pump head as described above. Same as before, a zig-zag slab laser enable one to effectively solve thermal distortion problems, obtain $TEM_{00}$-mode operation and maximize the energy extraction from laser slab in high power DPSS lasers. On the other hand, in high power operations this arrangement results in a much shorter gain path length along the lasing direction as compared with the use of a regular laser rod. Therefore, the slab laser, preferably less than 3-cm long, can be placed at the optimum position to match the out of phase region, resulting in restraining the gain region available to undesired laser lines so as to attain high power operation at a minor laser line. Optionally, as a safeguard, the gain sweeping technique could be applied concurrently in the current case, particularly for a long laser slab.

Besides, based on these principles discussed above, one also can use a laser rod less than 3-cm long to obtain a sable laser operation at minor lasing lines. The redundant description will be avoided for simplicity.

Furthermore, a laser system that produces an output beam with a rectangular cross-sectional profile is well suited for the laser projection display system. Accordingly and as a direct extension from above mentioned principle, an one-dimensional beam-expanding cavity including intracavity SHG can be used in conjunction with a laser slab pump head to directly output a coherent blue light with a rectangular profile on purpose.

This display system, developed by Sunnyvale, Calif.-based Silicon Light Machines, is characterized by use of a tiny one-line display device based on its promising Grating Light Valve technology. See U.S. Pat. No. 5,841,579 and D. T. Amm and R. W. Corrigan, "Optical Performance of the Grating Light Valve Technology," SPIE Proceedings Vol. EI 3634-10, San Jose Calif., February 1999.

Accordingly and as a direct extension from above mentioned principle, an one-dimensional beam-expanding cavity including intracavity SHG can be used in conjunction with a laser slab pump head to directly output a coherent blue light with a rectangular profile on purpose.

Part XIV

White Laser and Multiple Wavelengths Operation

In this section, based on the conception of the aforespecified slab laser configuration and minor lasing line operation, a specific design is presented for actualizing multiple wavelengths operation and white laser operation. Accordingly, first, a laser slab is formed from several individual laser slabs parallel positioned. Each individual laser slab is made from a different laser material with a different doping level and corresponding to a different, selected laser operation wavelength. Further, while a superbroadband laser crystal is available to build a laser slab, which simultaneously emits at multiple wavelengths, it can be used to replace several individual laser slabs.

Second, the different portion on the end cavity mirror has a different HR coating corresponding to a different laser operation wavelength. Or same as that of the laser slab, the end mirror can be formed from several individual HR mirrors at different wavelengths. This end cavity mirror is at the expanded mode portion within the one-dimensional beam expander cavity.

Third, a slab-shaped SHG crystal is inserted into the expanded mode portion within one-dimensional beam expander cavity to realize intracavity SHG. The slab-shaped SHG crystal consists of several individual SHG crystals parallel positioned, each individual SHG crystal is collaborated with the individual laser slab and corresponding to producing one certain laser operation wavelength selected. The individual SHG crystal can be selected from a regular SHG crystal, or a periodically poled ferroelectric crystal, or a periodically poled stoichiometric lithium tantalate crystal.

A discrete-wavelength zero-dispersion prism beam expander would have to be used to serve as one-dimensional beam expander. Same as discussed before, a waveplate may be inserted into the expanded mode portion of laser cavity to adjust the polarization situation. And this waveplate also consists of several individual waveplate parallel positioned, each individual waveplate is collaborated with the individual SHG crystal and corresponding to a certain laser operation wavelength.

Part XV

Power Scaling & Pump Power Density Scaling

The above slab laser and disk laser designs will readily allow pump power, pump density and output power scaling to much higher levels. There are several ways to do so when it is needed.

First, with the use of double input coupler approach as described in FIG. 15H, to input combined pumping beams that come from multiple diode bars as shown in FIGS. 7B–C.

Second, to increase laser slab size. The typical size of the laser slab in the proposed design is around 1.2×5×18 mm (thickness×height×length). In order to increase the power level, the size of the laser slab can be enlarged.

Third, to use 2-D stacked diode bars increase pump power and pump power density. The pumping beams emitted from a 2-D stacked diode bar are collimated by a fiber rod lens array. The compilation of collimated pumping beams is directed toward a cylinder lens and then tightly focused to a line by a cylinder lens. This line shaped pumping beams, therefore, can be input into the beam guide input coupler and optical duct for pumping.

The fiber rod lens array serves as a one-dimenisional collimating lens to collimate the beam divergence in the plane perpendicular to the diode junction plane. Meanwhile, the beam divergence in the plane parallel to the diode junction plane is relatively small around 5°–10°. As an alternative, a microlense array serving as a two-dimensional collimating lens can be used instead of fiber rod lens array.

Fourth, to use a fiber bundle and the beam-shaping optics, including collimating, focussing and converging, to increase the pump density and decrease the pump power leakage from the entrance. A laser diode pump source can be fiber coupled to the pump heads of the proposed design, or optically coupled to the pump heads via beam shaping.

What is claimed is:

1. In a method in constructing a zig-zag slab laser with an one-dimensional beam-expanding laser cavity, capable of i) realizing intense multipass pumping, ii) effectively solving thermal distortion and cooling problems, iii) providing stress-free and O-ring-free slab mounting, iv) obtaining high-power $TEM_{00}$-mode operation, v) achieving extra-high-power intracavity SHG, vi) operating in either CW mode or pulsed mode, and vii) minimizing spatial hole burning whereby realizing high power operation at minor laser lines, comprising the steps of A. selecting a pump source means, from the group consisting of a diode bar means and a multiple-pump-source means having a single pump wavelength or multiple pump wavelengths, to provide a relevant pumping light for pumping;
  B. making a laser slab means, wherein said laser slab means has a substantially rectangular cross section with two major surfaces, two minor surfaces, and two opposing end faces which are cut at a Brewster angle or square-cut;
  C. constructing a slab laser pump head for pumping, housing and cooling said laser slab means;
  D. constructing said one-dimensional beam-expanding laser cavity by mean of an one-dimensional prism beam expander means, wherein
    (1) said laser cavity includes at least two cavity mirrors,
    (2) said pump head is placed within said laser cavity for lasing at a fundamental wavelength,
    (3) said one-dimensional beam-expanding laser cavity causes laser light to resonate along a zig-zag optical path between said two major surfaces of said laser slab means via total-internal-reflection,
    (4) said laser cavity has a noncircular or line-shaped spatial mode cross-section at least within part of said laser cavity which is substantially compatible with the cross-section of said laser slab means, and
    (5) whereby i) obtaining mode-matched pumping, $TEM_{00}$-mode operation and all-out energy extraction from said laser slab means, ii) employing said laser slab means with a large aspect ratio of its height to its thickness, so as to effectively solve thermal distortion problems, and iii) achieving high-performances of intracavity harmonic generations and true CW operation over wide spectra ranges, from red, blue to ultraviolet; and
  E. optionally inserting a Q-switch into the expanded mode portion of said cavity for a pulsed mode operation, wherein the cross-section of the laser beam which passes through said Q-switch is a line rather than a point, so that the power density impinged on said Q-switch is decreased significantly, whereby avoiding optical damages and acquiring extra-high energy operations.

2. In the method of claim 1, further comprising the steps of
  A. by mean of an optical duct means, constructing said pump head in a manner of optical total-internal-reflection configuration at least for its major portion, leading to confining said pumping light within said pump head via total-internal-reflection considerably during the entire pumping process;
    wherein said pumping light, once entering said pump head and said optical duct means, undergoes zig-zag optical paths, multiple reflections and multiple travels through or within said laser slab means until it is absorbed; whereby
    (1) significantly reducing multiple reflection losses caused by the zig-zag optical paths,
    (2) confining said pumping light within said pump head to achieving effective and efficient uniform pumping and minimizing thermal aberration, and
    (3) with the use of said optical duct means, acquiring zig-zag pump paths and eliminating hot spot issue caused by directly diode bar pumping;
  B. setting a coupling manner to couple said pumping light to a pump entrance means including at least one pump entrance for the input of said pumping light into said optical duct means, wherein said pump source means is external to said optical duct means;
  C. predetermining the location and orientation for said laser slab means, said optical duct means and pump entrance means in effective operative relationship, whereby facilitating the multipass pump process, minimizing the escape loss and obtaining efficient and uniform pumping;
  D. optimizing the optical and physics properties and performance parameters of said pump head in effective operative way, including the profile, size, geometric shape, refractive index and dopant concentration, whereby facilitating efficient and uniform pumping, laser operation and effective cooling; and
  E. in order to protect the TIR interface for said two major surfaces of said laser slab means and for said optical duct means, selecting an approach from the group including:
    (1) by use of a mental foil or pressed metal layer, including aluminum, indium and silver foil,
    (2) by use of a thick metal coating,
    (3) by use of a metalized mirror surface,
    (4) by use of a coating or film with a low refractive index, including cement J91, silicon gel, optical-grade epoxy, $SiO_2$ coating and Teflon AF 1600 coating, and
    (5) by use of a clear optical window with a low refractive index, including $MgF_2$.

3. In the method of claim 2, further comprising the steps of:
  A. designating pump trip direction as the average propagation direction of the zig-zag pumping light within said optical duct means; and B. selecting a construction for said slab laser pump head from the group including:
(1) a first construction, wherein
a) said pump light enters and multiply passes through said laser slab means via at least one said major surface,
b) said laser slab means is sandwiched between two coolant passages through its two major surfaces, said coolant passage is formed between said optical duct means and said laser slab means, and
c) said pump trip direction is perpendicular to said major surfaces and parallel to said minor surfaces;
(2) a second construction, wherein
a) said pump light enters and multiply passes through said laser slab means via at least one said major surface until said pumping light is absorbed,
b) said laser slab means is sandwiched by and in contact with said optical duct means via its two major surfaces, said optical duct is of high thermal conductivity for heat transfer and effective cooling, and
c) said pump trip direction is perpendicular to said major surfaces and parallel to said minor surfaces;
(3) a third construction in which said laser slab means is conductively cooled, wherein
a) said pumping light enters said laser slab means via said major surface of said laser slab means,
b) one said major surface of said laser slab means is interfaced with said optical duct means, the other one of said major surfaces is conductively cooled,
c) in order to reflect pumping light and to preserve the TIR interface for the laser zig-zag path within said laser slab means, one of the following procedures is selected for the cooling side of said slab means: i) it is covered by a metal foil which may have a high reflectivity, ii) it is interfaced with a metalized mirror surface of a heat sink, and iii) it is HR coated at the pump wavelength, and the $SiO_2$ or $MgF_2$ material is used as the first layer of the HR coating,
d) in order to preserve the TIR interface for the laser zig-zag path within said laser slab means, one of the following procedures is selected for the non-cooling side of said slab means: i) it has a protective coating or bonding material, ii) it has a $MgF_2$ window, and iii) it is distanced from said optical duct means with an interstitial air, and
e) said pump trip direction is perpendicular to said major surfaces and parallel to said minor surfaces;
(4) a fourth construction in which said laser slab is conductively cooled, wherein
a) said optical duct means consists of one or two members of thin slab-shaped optical duct which has a substantially rectangular cross section and two broad surfaces,
b) said optical duct means is interfaced with at least one major surface of said laser slab means via its said broad surface where said pumping light enters into said laser slab means along zig-zag optical paths,
c) said optical duct means is of high thermal conductivity,
d) in order to preserve the TIR interface for the laser zig-zag path within said laser slab means, one of the following procedures is selected: i) said laser slab means has a protective coating, and ii) said optical duct means has a lower refractive index than that of said laser slab means,
e) at least one said major surface of said laser slab means is conductively cooled via said optical duct means, and
f) said pump trip direction is parallel to said major surfaces;
(5) a fifth construction in which said laser slab is conductively cooled, wherein
a) said optical duct means consists of at least two members of thin planar optical duct, each one has two broad surfaces,
b) said laser slab means is sandwiched between said two members of thin planar optical duct via said major surfaces firstly, and then sandwiched between two heat sinks via said two members of thin planar optical duct symmetrically,
c) said optical duct means is interfaced with two said major surfaces of said laser slab means via its said broad surfaces where said pumping light enters into said laser slab means along zig-zag optical paths,
d) said optical duct means is of high thermal conductivity and thermally in contact with said two heat sink via its said broad surfaces, said laser slab means is conductively cooled via said optical duct means,
e) in order to preserve the TIR interface for the laser zig-zag path within said laser slab means, one of the following procedures is selected: i) said laser slab means has a protective coating, and ii) said optical duct means has a lower refractive index than that of said laser slab means,
f) optionally said heat sink has a mirrored surface which is interfaced with said broad surfaces of said optical duct means whereby to reflect pumping light and realize multipass pumping, and
g) said pump trip direction is parallel to said major surfaces; and
(6) a sixth construction with the so-called edge pumping in which said laser slab is conductively cooled, wherein
a) said pumping light enters said laser slab means via at least one said minor surface,
b) said laser slab means is conductively cooled via a metal foil and heat spreader and via its two major surfaces, said metal foil is used for preserving total-internal-reflection for zig-zag laser paths and zig-zag pump paths, and
c) said pump trip direction is perpendicular to said minor surfaces and parallel to said major surfaces.

4. In constructing said first construction as recited in claim 3, further comprising the steps of
A. building a laser slab assembly which is selected from the group comprising
(1) first laser slab assembly, which additionally comprises the steps of
a) selecting two members of planar optical duct serving as said optical duct means,
b) selecting two slab holders and setting them parallel to each other,
c) making two slots at both of said either slab holder,
d) setting the two ends of said laser slab into said either slot with a bonding material whereby elastically supporting said laser slab and providing stress-free and O-ring-free slab mounting and sealing,
e) coating at the end part of said laser slab to save the TIR interface in case,
f) symmetrically bounding said optical duct means to two said slab holders with a sealant, whereby forming said two coolant passages between said major surfaces of said laser slab and said two planar optical ducts, and forming two windows for said pumping light entering and pumping said major surfaces of said laser slab means, and g) building said first laser slab assembly with the use of said laser slab means, said optical duct means and said two slab holders; and (2) second laser slab assembly, which additionally comprises the steps of
a) selecting two members of planar optical duct serving as said optical duct means,
b) selecting a slab fixer means optical clear to said pumping light,
c) setting the two ends of said laser slab into said slab fixer means with a bonding material whereby elastically supporting said laser slab and providing stress-free and O-ring-free slab mounting and sealing,
d) coating at the end part of said laser slab to save the TIR interface in case,
e) symmetrically bounding said optical ducts means to said slab fixer means with a sealant, whereby forming said two coolant passages between said major surfaces of said laser slab means and said two planar optical ducts, and forming two windows for said pumping light entering and pumping said major surfaces of said laser slab means, and
f) building said second laser slab assembly with the use of said laser slab means, said optical duct means and said slab fixer means;

B. selecting engineering parts, including a lower cover plate with two coolant passages, a upper cover plate with two coolant passages, a pair of plenum, a inlet, an outlet, two insulators for said laser slab means, and four transparent silicon rubber O-rings; and C. assembling said engineering parts together with said laser slab assembly in effective operative way, wherein i) said laser slab assembly is sandwiched between said lower cover plate and said upper cover plate via said O-rings, and ii) O-ring's plane is perpendicular to said major surface of said laser slab.

5. In the method of claim 1, in order to realize high power operation at a minor laser line desired, particularly for the generation of high-power red and blue coherent light for laser projection display, further comprising the steps of A. selecting a desired output wavelength for said minor laser line;
B. producing a gain region with intense pumping within said laser slab means;
C. maximizing the cavity Q factor of said laser cavity for said desired output wavelength;
D. minimizing the cavity Q factor of said laser cavity for undesired laser lines;
E. locating said gain region at one of an optimum position, preferably at ½ L, ¼ L, ¾L, ⅙ L and ⅝ L, wherein i) L is designated as the optical length of said laser cavity, ii) within said optimum position there would be the highest possibility for a pair of longitudinal modes with a spatially anti-correlated relationship to take place and to occupy most of said gain region spatially, whereby minimizing spatial hole burning and restraining said gain region available to undesired major laser lines;
F. making said laser cavity have a large enough optical length L to prolong an out of phase region to best match said gain region, wherein within the out of phase region two peaks in the standing wave patterns corresponding to the pair of anti-correlated longitudinal modes are out of phase;
G. setting said gain region or said laser slab means have a limited length less than 3-cm to best match the out of phase region, whereby restraining said gain region available to undesired major laser lines; and
H. keeping the dopant concentration of said laser slab as low as possible while keeping the absorption efficiency high for said pumping light.

6. In the method of claim 5, in order to generate high-power red and blue coherent light via intracavity SHG, further comprising the steps of A. inserting a SHG crystal means into said laser cavity;
B. selecting said SHG crystal means from the group including
(1) a regular SHG crystal means,
(2) a periodically poled crystal means with quasi-phase-matching,
(3) a slab-shaped SHG crystal means, made from a single piece of SHG crystal, in cooperation with said noncircular or line-shaped spatial mode cross-section of said laser cavity, and
(4) a slab-shaped SHG crystal means consisting of several individual SHG crystals parallel positioned, in cooperation with said noncircular or line-shaped spatial mode cross-section of said laser cavity;
C. selecting a beam profile for laser output from the group including
(1) a regular beam profile, and
(2) a line-shaped beam profile, whereby directly applying to the Grating Light Valve technology; and
D. optionally inserting a waveplate into the expanded mode portion of said cavity to adjust the polarization situation for the laser operation and SHG process.

7. In the method of claim 1, in order to realize extra-high power or energy operation with intracavity frequency conversions, further comprising the steps of A. inserting a slab-shaped nonlinear crystal means into the expanded mode portion of said cavity to realize intracavity frequency conversion, wherein the cross-section of the laser beam which passes through said nonlinear crystal means is a line rather than a point, so that the power density impinged on said nonlinear crystal means is decreased significantly, whereby avoiding optical damages and obtaining extra-high power or energy intracavity frequency conversions;
B. selecting said nonlinear crystal means from the group including
(1) a slab-shaped SHG crystal means made from a single piece of SHG crystal,
(2) a slab-shaped SHG crystal means consisting of several individual SHG crystals parallel positioned,
(3) a slab-shaped SHG crystal means and a slab-shaped THG crystal means positioned serially, and
(4) a slab-shaped SHG crystal means, a slab-shaped THG crystal means and a slab-shaped FHG crystal means positioned serially;
C. selecting a beam profile for laser output from the group including
(1) a regular beam profile, and
(2) a line-shaped beam profile, whereby directly applying to the Grating Light Valve technology; and
D. optionally inserting a waveplate into the expanded mode portion of said cavity to adjust the polarization situation for the laser operation and SHG process.

8. In the method of claim 1, in order to realize multiple wavelengths operation concurrently, including white light output, further comprising the steps of A. selecting two or more certain output wavelengths for laser operation;

B. selecting said laser slab means from the group including
  (1) several individual laser slabs parallel positioned, wherein each said laser slab is made from a different laser material with a different doping level and corresponding to said one certain output wavelength, and
  (2) single laser slab with a broad spectral band;
C. producing a gain regions for each said individual laser slab or for said single laser slab;
D. maximizing the cavity Q factor of said laser cavity for said output wavelengths;
E. minimizing the cavity Q factor of said laser cavity for other potential laser wavelengths;
F. locating said laser slab means at one of an optimum position, at ½ L, ¼ L, ¾ L, ⅙ L and ⅚ L, wherein i) L is designated as the optical length of said laser cavity, ii) within said optimum position there would be the highest possibility for a pair of longitudinal modes with a spatially anti-correlated relationship to take place and to occupy most of said gain region spatially, whereby minimizing spatial hole burning and restraining said gain region available to other potential laser wavelengths;
G. selecting said laser cavity have a large enough optical length L to prolong an out of phase region to best match said laser slab means, wherein within the out of phase region two peaks in the standing wave patterns corresponding to the pair of anti-correlated longitudinal modes are out of phase;
H. setting said laser slab means have a limited length to best match the out of phase region, whereby restraining said gain region available to other potential laser wavelengths;
I. inserting a slab-shaped SHG crystal means into the expanded mode portion of said cavity to realize intracavity SHG, wherein said slab-shaped SHG crystal means consists of several individual SHG crystals parallel positioned, each said SHG crystal is collaborated with said individual laser slab or the different portion of said single laser slab and corresponding to producing said one certain output wavelength;
J. selecting said individual SHG crystal from the group including
  (1) a regular SHG crystal, and
  (2) a periodically poled crystal means with quasi-phase-matching;
K. selecting a discrete-wavelength zero-dispersion prism beam expander to be served as said one-dimensional beam expander means; and
L. optionally inserting a waveplate means into the expanded mode portion of said cavity to adjust the polarization situation for the laser operation and SHG process; wherein said waveplate means consists of several individual waveplate parallel positioned, each said waveplate is collaborated with said individual SHG crystal and corresponding to said one certain output wavelength.

9. In a method in constructing a multipass pump head for DPSS lasers, fiber lasers and fiber amplifiers, capable of realizing intense uniform pumping and producing and amplifying coherent light, comprising the steps of
A. selecting a pump source means, from the group consisting of a diode bar means and a multiple-pump-source means having a single pump wavelength or multiple pump wavelengths, to provide a relevant pumping light for pumping;
B. selecting a laser medium means from the group including
  (1) laser chips, laser rods and laser slabs, made from regular laser materials or tunable laser materials, and
  (2) optical fibers with a rare-earth-doped core;
C. setting a coupling manner to couple said pumping light to a pump entrance means including at least one pump entrance for the input of said pumping light into said multipass pump head; and
D. constructing said multipass pump head by use of a multipass formation to confine said pumping light, wherein said pumping light, once entering, undergoes multiple reflections and multiple travels through or within said laser medium means, said multipass formation is selected from the group consisting of
  (1) a first multipass formation with the use of optical total-internal-reflection configuration, which additionally comprises the steps of making said multipass pump head as a TIR-guide pump head by mean of an optical duct means, leading to confining said pumping light within said TIR-guide pump head mainly via total-internal-reflection during the entire pumping process; wherein i) said pumping light, once entering said pump head and said optical duct means, will undergo zig-zag optical paths, multiple reflections and multiple travels through or within said laser medium means until it is absorbed, and ii) the escape loss possibility of unabsorbed said pumping light is at least less than 40% within one round trip pumping path, or at least less than 40% during the entire pumping process; whereby i) significantly reducing multiple reflection losses caused by the zig-zag optical paths, ii) confining said pumping light within said pump head to achieve effective and efficient uniform pumping; and iii) with the use of said optical duct means, eliminating hot spot issue caused by directly diode bar pumping for DPSS lasers;
  (2) a second multipass formation with the use of optical graded-index or step-index configuration,
  (3) a third multipass formation with the use of a noncircular-profile reflector means which has a noncircular cross-section with a convex and closed boundary, wherein i) said laser medium means is a laser rod means which has a lasing axis and a transverse plane perpendicular to said lasing axis, said noncircular cross-section is in said transverse plane, ii) said laser rod is surrounded by a cooling channel, and iii) the maximum dimension inside said noncircular cross-section is at least four-times larger than the diameter of said laser rod means,
  (4) a fourth multipass formation with the use of a double-layer reflector means,
  (5) a fifth multipass formation with the use of optical spatial filter configuration,
  (6) a sixth multipass formation with the use of a reflector means, wherein i) said laser medium means is a laser slab means which has a sunbstantially rectangular cross section with two major surfaces, two minor surfaces, and two opposing end faces which are cut at a Brewster angle or square-cut, ii) said laser slab means is cooled via said two major surfaces only, iii) said diode bar means comprises at least one linear array laser diode bar or 2-D stacked diode bar, iv) each said pump entrance receives said pumping light from one or several said diode bars without fiber coupling, and v) said pump light enters said reflector means and multiply passes through said laser slab means via said two major surfaces, (7) a seventh multipass formation with the use of a noncircular-profile reflector means which has a noncircular cross-section, wherein i) said laser medium means is a laser slab means which has a substantially rectangular cross section with two major surfaces, two minor surfaces, and two opposing end faces which are cut at a Brewster angle or square-cut, ii) said laser slab means is mounted into a laser slab assembly means without O-rings, preferably via a silicone RTV, in which said laser slab means is sandwiched between two coolant passages via said two major surfaces, iii) the flow direction along said coolant passages is perpendicular to said minor surfaces of said laser slab, and iv) said pump light enters said noncircular-profile reflector means and multiply passes through said laser slab means via said two major surfaces, (8) an eighth multipass formation with the use of an optical duct means, wherein
  a) said laser medium means is a laser slab means which has a substantially rectangular cross section with two major surfaces, two minor surfaces, and two opposing end faces which are cut at a Brewster angle or square-cut,
  b) said optical duct means consists of two members of thin planar optical duct at least, each one has two broad surfaces,
  c) said laser slab means is sandwiched between said two members of thin planar optical duct via said major surfaces firstly, and then sandwiched between two heat sinks via said two members of thin planar optical duct symmetrically,
  d) said optical duct means is optically coupled to two said major surfaces of said laser slab means via its said broad surfaces where said pumping light runs into said laser slab means along zig-zag optical paths,
  e) said optical duct means is of high thermal conductivity and thermally in contact with said two heat sink via its said broad surfaces, said laser slab means is conductively cooled via said optical duct means,
  f) in order to preserve the TIR interface for the laser zig-zag path within said laser slab means, an approach is selected from the group including: i) said laser slab means has a protective coating, and ii) said optical duct means has a lower refractive index than that of said laser slab means,
  g) optically the end of said thin planar optical duct adjacent to said laser slab means is gold coated but not square-cut in order to change the incident angle of said pumping light for effective pumping,
  h) optionally said heat sink has a mirrored surface which is interfaced with said broad surfaces of said thin planar optical duct whereby to reflect said pumping light and realize multipass pumping,
  i) optionally part of the additional members of optical duct have a tapered shape, and
  j) optionally lateral sides of said optical duct have a gold coating in order to reflect said pumping light while said optical duct means has a low refractive index, (9) a ninth multipass formation with the use of an optical duct means, wherein
  a) said laser medium means is a laser slab means which has a substantially rectangular cross section with two major surfaces, two minor surfaces, and two opposing end faces which are cut at a Brewster angle or square-cut,
  b) one said major surface of said laser slab means is interfaces with said optical duct means, the other one of said major surfaces is conductively cooled,
  c) said pumping light, once entering said optical duct means, will undergo zig-zag optical paths, multiple reflections and multiple travels through said laser slab means until it is absorbed;
  d) said pumping light enters said laser slab means via its major surface,
  e) for the cooling side of said slab means, in order to reflect pumping light and to preserve the TIR interface for the laser zig-zag path within said laser slab means, an approach is selected from the group including: i) it is covered by a metal foil which may have a high reflectivity, ii) it is interfaced with a metalized mirror surface of a heat sink, and iii) it is HR coated at the pump wavelength, and the $SiO_2$ or $MgF_2$ material is used as the first layer of the HR coating,
  f) for the non-cooling side of said slab means, in order to preserve the TIR interface for the laser zig-zag path within said laser slab means, an approach is selected from the group including: i) it has a protective coating or bonding material, ii) it has a $MgF_2$ window, iii) said optical duct has a lower refractive index than said slab means, and iv) it is distanced from said optical duct means with an interstitial air,
  g) optionally one side of said optical duct has a gold coating in order to reflect said pumping light, and
  h) optionally part of said optical duct means have a tapered shape, and

(10) a tenth multipass formation with the use of a reflector means, wherein i) said laser medium means is an optical fiber means with a rare-earth-doped core, ii) said diode bar means comprises at least one linear array laser diode bar or 2-D stacked diode bar, iii) said pumping light from one or several said diode bars are optically coupled to one said pump entrance, and iv) said pump light enters said reflector means and multiply passes through said optical fiber means; and E. housing and cooling said laser medium means.

10. In constructing said TIR-guide pump head by use of said first multipass formation as recited in claim 9, in order to make a slab laser pump head of said TIR-guide pump head for slab lasers, further comprising the steps of
  A. making a laser slab means of said laser medium means, wherein said laser slab means has a substantially rectangular cross section with two major surfaces, two minor surfaces, and two opposing end faces which are cut at a Brewster angle or square-cut;
  B. predetermining the location and orientation for said laser medium means, said optical duct means and pump entrance means in effective operative relationship, whereby facilitating the multipass pump process, minimizing the escape loss and obtaining efficient and uniform pumping;
  C. optimizing the optical and physics properties and performance parameters of said pump head in effective operative way, including the profile, size, geometric shape, refractive index and dopant concentration, whereby facilitating efficient and uniform pumping, laser operation and effective cooling;

D. in order to protect the TIR interfaces for said TIR-guide pump head, selecting an approach from the group including:
   (1) by use of a mental foil or pressed mental layer, including aluminum, indium and silver foil,
   (2) by use of a thick metal coating,
   (3) by use of a metalized mirror surface,
   (4) by use of a coating or film with a low refractive index, including cement J91, silicon gel, optical-grade epoxy, $SiO_2$ coating and Teflon AF 1600 coating, and
   (5) by use of a clear optical window with a low refractive index, including $MgF_2$; and E. selecting said slab laser pump head from the group including:
   (1) a first slab laser pump head, wherein
      a) said pump light enters and multiply passes through said laser slab means via said two major surfaces, and
      b) said laser slab means is sandwiched between two coolant passages via said two major surfaces, said coolant passage is formed between said optical duct means and said laser slab means;
   (2) a second slab laser pump head, wherein
      a) said pump light enters and multiply passes through said laser slab means via at least one said major surface until said pumping light is absorbed, and
      b) said laser slab means is sandwiched by and in contact with said optical duct means via its two major surfaces, said optical duct is of high thermal conductivity for heat transfer and effective cooling;
   (3) a third slab laser pump head in which said laser slab means is conductively cooled, wherein
      a) said pumping light enters said laser slab means via said major surface of said laser slab means,
      b) one said major surface of said laser slab means is interfaced with said optical duct means, the other one of said major surfaces is conductively cooled,
      c) in order to reflect pumping light and to preserve the TIR interface for the laser zig-zag path within said laser slab means, one of the following procedures is selected for the cooling side of said slab means: i) it is covered by a metal foil which may have a high reflectivity, ii) it is interfaced with a metalized mirror surface of a heat sink, and iii) it is HR coated at the pump wavelength, and the $SiO_2$ or $MgF_2$ material is used as the first layer of the HR coating, and
      d) in order to preserve the TIR interface for the laser zig-zag path within said laser slab means, one of the following procedures is selected for the non-cooling side of said slab means: i) it has a protective coating or bonding material, ii) it has a $MgF_2$ window, and iii) it is distanced from said optical duct means with an interstitial air;
   (4) a fourth slab laser pump head in which said laser slab means is conductively cooled, wherein
      a) said optical duct means consists of one or two members of thin slab-shaped optical duct which has a substantially rectangular cross section and two broad surfaces,
      b) said optical duct means is interfaced with at least one major surface of said laser slab means via its said broad surface where said pumping light enters into said laser slab means along zig-zag optical paths,
      c) said optical duct means is of high thermal conductivity,
      d) in order to preserve the TIR interface for the laser zig-zag path within said laser slab means, one of the following procedures is selected: i) said laser slab means has a protective coating, and ii) said optical duct means has a lower refractive index than that of said laser slab means, and
      e) at least one said major surface of said laser slab means is conductively cooled via said optical duct means;
   (5) a fifth slab laser pump head in which said laser slab means is conductively cooled, wherein
      a) said optical duct means consists of at least two members of thin planar optical duct, each one has two broad surfaces,
      b) said laser slab means is sandwiched between said two members of thin planar optical duct via said major surfaces firstly, and then sandwiched between two heat sinks via said two members of thin planar optical duct symmetrically,
      c) said optical duct means is interfaced with two said major surfaces of said laser slab means via its said broad surfaces where said pumping light enters into said laser slab means along zig-zag optical paths,
      d) said optical duct means is of high thermal conductivity and thermally in contact with said two heat sink via its said broad surfaces, said laser slab means is conductively cooled via said optical duct means,
      e) in order to preserve the TIR interface for the laser zig-zag path within said laser slab means, one of the following procedures is selected: i) said laser slab means has a protective coating, and ii) said optical duct means has a lower refractive index than that of said laser slab means,
      f) optionally said heat sink has a mirrored surface which is interfaced with said broad surfaces of said optical duct means whereby to reflect pumping light and realize multipass pumping;
      g) optionally the end of said thin planar optical duct adjacent to said laser slab means is gold coated but not square-cut in order to change the incident angle of said pumping light for effective pumping,
      h) optionally part of the additional members of optical duct have a tapered shape, and
      i) optionally lateral sides of said optical duct have a gold coating in order to reflect said pumping light while said optical duct means has a low refractive index;
   (6) a sixth slab laser pump head with the so-called edge pumping in which said laser slab means is conductively cooled, wherein
      a) said pumping light enters said laser slab means via at least one said minor surface along zig-zag optical paths,
      b) said optical duct means is interfaced with at least one said minor surface of said laser slab means via a transparent bonding material or interstitial air, and
      c) said laser slab means is conductively cooled via its two major surfaces;
   (7) a seventh slab laser pump head in which said laser slab means is conductively cooled, wherein
      a) said laser slab means is extra-thin with a thickness of less than 1 mm, and less than 0.5 mm,
      b) said laser slab means is integrated with or embedded into said optical duct means,
      c) said laser slab means has a line-shaped gain region, d) said optical duct means is transparent at both the pump and laser wavelengths and its refractive index is the same as or close to that of said laser slab means,
e) a joint approach is used, including, i) a high temperature, optical-grade epoxy or glue interposed between said laser slab means and said optical duct means, ii) diffusion-bonding, and iii) frit,
f) the lasing direction is perpendicular to said line-shaped gain region, and
g) said slab laser means together with said optical duct means is conductively cooled via an HR mirror or mirrored surface, said mirror has thin substrate with high thermal conductivity, said HR mirror serves as a rear or fold mirror for laser operations, its other side is going to contact a heat sink via a metal foil and heat spreader sometimes optionally; and
(8) a eighth slab laser pump head in which said laser slab means is conductively cooled, wherein
a) said laser slab means has a line-shaped gain region,
b) said optical duct means is transparent at pump wavelengths,
c) the lasing direction is along said line-shaped gain region,
d) said optical duct means is interfaced with said laser slab means via a transparent bonding material or interstitial air, and
e) said slab laser means is conductively cooled via its two major surfaces covered by a metal foil and heat spreader which is preserved for total-internal-reflection.

11. In constructing a high-power laser operated at a desired minor laser line by use of said seventh slab laser pump head as recited in claim 10, further comprising the steps of
A. setting a desired output wavelength for said minor laser line;
B. constructing a one-dimensional beam-expanding laser cavity having a line-shaped spatial mode cross-section within part of said laser cavity which is substantially compatible with said line-shaped gain region, wherein
(1) said laser cavity includes at least two cavity mirrors,
(2) said seventh slab laser pump head is placed within said laser cavity for lasing at said desired output wavelength; and
(3) said line-shaped gain region is perpendicular to the lasing direction;
C. producing intense pumping for said line-shaped gain region;
D. maximizing the cavity Q factor of said laser cavity for said desired output wavelength;
E. minimizing the cavity Q factor of said laser cavity for undesired laser lines;
F. locating said line-shaped gain region together with said HR mirror at an optimum position, at one of ½ L, ¼ L, ¾ L, ⅙ L and ⅚ L, or the end of said laser cavity, wherein i) L is designated as the optical length of said laser cavity, ii) said HR mirror is served as fold cavity mirror or rear cavity mirror, iii) within said optimum position there would be the highest possibility for a pair of longitudinal modes with a spatially anti-correlated relationship to take place and to occupy most of said gain region spatially, whereby minimizing spatial hole burning and restraining said gain region available to undesired major laser lines;
G. keeping the dopant concentration of said laser slab as low as possible while keeping the absorption efficiency high for said pumping light; and
H. Optionally inserting a nonlinear crystal means into said laser cavity for intracavity frequency conversion.

12. In constructing said TIR-guide pump head by use of said first multipass formation as recited in claim 9, in order to make a thin-disk laser pump head of said TIR-guide pump head for thin-disk lasers, further comprising the steps of
A. making a laser chip means of said laser medium means;
B. constructing said optical duct means made from an optical disk, wherein
(1) said optical disk consists of parallel two main surfaces perpendicular to an axis and an outer surface parallel to said axis,
(2) said two main surfaces have a same shape, and
(3) the size of said two main surfaces is larger than the distance between them, i.e., the thickness of said optical disk;
C. constructing said laser chip means to be optically integrated with or embedded into said optical duct means, wherein
(1) said optical disk is transparent at both the pump and laser wavelengths and its refractive index is the same as or close to that of said laser chip means, and
(2) an optical joint approach is used for the joint of said laser chip means and said optical disk, which is selected from the group including, i) interposing a high temperature optical-grade epoxy or cement, ii) diffusion-bonding, and iii) frit;
D. in order to reflect pumping light from said outer surface while said pumping light is not reflected by said outer surface via total-internal-reflection, selecting an approach from the group including:
(1) first approach, which additionally comprises the steps of making an HR coating selectively covering predetermined portions of said outer surface, wherein there is at least one AR coated narrow spectral opening or uncoated narrow opening on said outer surface serving as said pump entrance for inputting said pumping light, and
(2) second approach, which additionally comprises the steps of fitting said optical disk into a heat sink chamber means, whose inwardly facing wall matches to said outer surface geometrically and has a gold coating; wherein there is at least one opening on said chamber means serving as said pump entrance for inputting said pumping light;
E. entering said pumping light into said optical disk, wherein i) said pumping light is directed parallel to and confined between said two main surfaces via total-internal-reflection and undergoes multiple reflections via said outer surface so as to multiply and repeatedly passes through said laser chip, and ii) said coupling manner includes optical fiber coupling;
F. selecting the shape of said optical disk and said two main surfaces from the group including
(1) a circular shape, wherein said optical disk is made from the group including
a) regular optical duct, said pump head is named the TIR-Guide Disk Pump Head, wherein said laser chip is eccentrically located within said optical disk,
b) graded-index optical duct, wherein said optical duct means has a variable refractive index in the radial direction whereby said pumping light, once entering, to be refocussed by refraction into the center area of said pump head periodically and leading to a large acceptance cone, said pump head is named the Graded-Index TIR-Guide Disk Pump Head, and c) step-index optical duct, wherein said optical duct means has two sleeves with a predetermined radial extent in which the inner sleeve has a higher refractive index than that of the outer sleeve appropriately, whereby said pumping light, once entering, to be continually converged to the center area of said pump head and leading to a large acceptance cone, said pump head is named the Step-Index TIR-Guide Disk Pump Head, (2) a non-circular shape, said pump head is named the Noncircular-Profile TIR-Guide Disk Pump Head, and (3) a non-circular shape, said pump head is named the Dube TIR-Guide Disk Pump Head, wherein said optical disk consists of a pair of corner reflectors with a little difference in the size and being arranged colinearly but not coaxially with each other, ii) said pumping light is collimated before entering said optical duct means, and iii) said pumping light is reflected by said outer surface via total-internal-reflection; and G. conductively cooling said laser chip means surrounded by said optical disk; wherein i) one side of said optical disk is in thermal connect with an HR mirror or mirrored surface, ii) said mirror has thin substrate with high thermal conductivity, made from the group including copper, sapphire, undoped YAG and $MgF_2$, and iii) said HR mirror or said mirrored surface serves as an end or fold mirror for laser operations.

13. In constructing said TIR-guide pump head by use of said first multipass formation as recited in claim 9, in order to make a laser rod pump head of said TIR-guide pump head, further comprising the steps of A. making a laser rod means of said laser medium means;

B. constructing said laser rod means to be received in by said optical duct means and surrounded by a cooling channel means;

C. constructing two end cap assemblies for housing and cooling said laser rod;

D. selecting said optical duct means from the group including
  (1) regular optical duct; wherein said laser rod is eccentrically located about said optical duct means;
  (2) graded-index optical duct, wherein said optical duct means has a variable refractive index in the radial direction, whereby said pumping light, once entering, to be refocussed by refraction into the center area of said pump head periodically and leading to a large acceptance cone, said pump head is named the Graded-Index TIR-Guide Pump Head; and
  (3) step-index optical duct, wherein said optical duct means has two sleeves with a predetermined radial extent in which the inner sleeve has a lower refractive index than that of the outer sleeve appropriately, whereby said pumping light, once entering, to be continually converged to the center area of said pump head and leading to a large acceptance cone, said pump head is named the Step-Index TIR-Guide Pump Head; and E. optimizing the optical and physics properties and performance parameters of said pump head in effective operative way, including the profile, size, geometric shape, location and orientation, refractive index and dopant concentration, whereby facilitating efficient and uniform multipass pumping, laser operation and effective cooling.

14. In the method of claim 13, wherein said optical duct means is made from said regular optical duct means and includes at least a first section having a longitudinal axis and a second section having a longitudinal axis, said first section longitudinal axis is parallel to and off-set from said second section longitudinal axis, said pump head is named the Dube TIR-Guide Pump Head.

15. In constructing said TIR-guide pump head by use of said first multipass formation as recited in claim 9, in order to make a fiber laser pump head of said TIR-guide pump head for fiber lasers and fiber amplifiers, further comprising the steps of A. making an optical fiber means of said laser medium means, which is made up of an optical fiber with a rare-earth-doped core;

B. constructing said optical fiber means which is selected from the group consisting of
  (1) a first optical fiber means, wherein
    a) said optical fiber is being winded wrap by wrap, and then layer by layer, to form said first optical fiber means,
    b) said first optical fiber means is filled with an optical clear filler which has a refractive index same as or close to the outside cladding of said optical fiber to protect pump optical paths from distortion,
    c) said first optical fiber means is in the shape of a thin plate, or thin disk plate, or thin ring plate and has two major surfaces and at least one lateral surface,
    d) said first optical fiber means is interfaced to said optical duct means via one or two said major surfaces in effective operative way, and
    e) said pump light enters said pump head and said optical duct means, multiply and repeatedly passes through said first optical fiber means via one or two said major surfaces until said pumping light is absorbed by said rare-earth-doped core;
  (2) a second optical fiber means, wherein
    a) said optical fiber is being winded wrap by wrap, and then layer by layer, to form said second optical fiber means,
    b) said second optical fiber means is filled with an optical clear filler which has a refractive index same as or close to the outside cladding of said optical fiber to protect pump optical paths from distortion,
    c) said second optical fiber means is in the shape of a thin plate, or thin disk plate, or thin ring plate and has two major surfaces and at least one minor surface,
    d) said optical duct means is interfaced to said minor surface of said second optical fiber means in effective operative way, and
    e) said pump light enters said pump head and said optical duct means, multiply and repeatedly passes through said second optical fiber means via said minor surface until said pumping light is absorbed by said rare-earth-doped core; and
  (3) a third optical fiber means, wherein
    a) said optical fiber is winded onto the outer surface of said optical duct means with an optical clear filler which has a refractive index same as or close to the outside cladding of said optical fiber to protect pump optical paths from distortion,
    b) said the shape of said optical duct means is predetermined in favor of pumping process, and is cylinder-shaped, and
    c) said pump light enters said pump head and said optical duct means, multiply and repeatedly passes through said optical fiber until said pumping light is absorbed by said rare-earth-doped core.

16. In constructing said pump head as a laser rod pump head by use of said second multipass formation as recited in claim 9, further comprising the steps of
   A. making a laser rod means of said laser medium means;
   B. constructing said laser rod means to be received in by an optical duct means and surrounded by a cooling channel means, wherein said optical duct means is in the shape of a cylinder, its exterior has a high optical reflectivity for said pumping light, whereby confining and reflecting said pumping light within said pump head during the entire pumping process;
   C. constructing two end cap assemblies for housing and cooling said laser rod and for confining and reflecting said pumping light within said pump head during the entire pumping process;
   D. selecting said optical duct means from the group consisting of
      (1) graded-index optical duct having a variable refractive index in the radial direction, whereby said pumping light, once entering, to be refocussed by refraction into the center area of said pump head periodically and leading to a large acceptance cone, said pump head is named the Graded-Index Reflector Pump Head; and
      (2) step-index optical duct having two sleeves with a predetermined radial extent in which the inner sleeve has a lower refractive index than that of the outer sleeve appropriately, whereby said pumping light, once entering, to be continually converged to the center area of said pump head and leading to a large acceptance cone, said pump head is named the Step-Index Reflector Pump Head; and
   E. optimizing the optical and physics properties and performance parameters of said pump head in effective operative way, including the profile, size, geometric shape, location and orientation, refractive index and dopant concentration, whereby facilitating efficient and uniform multipass pumping, laser operation and effective cooling.

17. In constructing said pump head as a laser rod pump head by use of said second multipass formation as recited in claim 9, further comprising the steps of
   A. making a laser rod means of said laser medium means;
   B. constructing said laser rod means to be surrounded by a cooling channel means and then received in by an optical duct means in the shape of a cylinder;
   C. constructing a hollow means in the shape of a cylinder with two end cap assemblies, and filling a fluid into said hollow means; wherein said hollow means has a high optical reflectivity for said pumping light whereby confining and reflecting said pumping light within said pump head during the entire pumping process;
   D. making optical duct means to be received in by said hollow means and surrounded by said fluid, whereby to form a step-index structure, said pump head is named the Hollow Step-Index Reflector Pump Head; and
   E. optimizing the optical and physics properties and performance parameters of said pump head in effective operative way, including the profile, size, geometric shape, location and orientation, refractive index and dopant concentration, whereby facilitating efficient and uniform multipass pumping, laser operation and effective cooling.

18. In the method of claim 17, wherein said hollow means includes at least a first section having a longitudinal axis and a second section having a longitudinal axis; said first section longitudinal axis is parallel to and off-set from said second section longitudinal axis, said pump head is named the Dube Step-Index Reflector Pump Head.

19. In constructing said pump head by use of said third multipass formation as recited in claim 9, further comprising the steps of
   A. constructing said laser rod means to be surrounded by said cooling channel and then received in by an optical duct means; wherein i) the exterior of said optical duct means has a high optical reflectivity for said pumping light, whereby confining and reflecting said pumping light within said pump head during the entire pumping process, and ii) the exterior of said optical duct means is container-like and, in said transverse plane, has a noncircular cross-section with convex and closed boundary, said pump head is named the Solid Noncircular-Profile Reflector Pump Head;
   B. constructing two end cap assemblies for housing and cooling said laser rod and for confining and reflecting said pumping light within said pump head during the entire pumping process; and
   C. optimizing the optical and physics properties and performance parameters of said pump head in effective operative way, including the profile, size, geometric shape, location and orientation, refractive index and dopant concentration, whereby facilitating efficient and uniform multipass pumping, laser operation and effective cooling.

20. In constructing said pump head by use of said third multipass formation as recited in claim 9, further comprising the steps of
   A. constructing a hollow means, wherein i) the enclosure of said hollow means has a high optical reflectivity for said pumping light, whereby confining and reflecting said pumping light within said pump head during the entire pumping process, and ii) the enclosure of said hollow means is container-like and, in said transverse plane, has said noncircular cross-section with said convex and closed boundary, said pump head is named the Hollow Noncircular-Profile Reflector Pump Head;
   B. selecting said convex and closed boundary from the group including part of that is a contour of a corner reflector;
   C. constructing two end cap assemblies for housing and cooling said laser rod and for confining and reflecting said pumping light within said pump head during the entire pumping process; and
   D. optimizing the optical and physics properties and performance parameters of said pump head in effective operative way, including the profile, size, geometric shape, location and orientation, refractive index and dopant concentration, whereby facilitating efficient and uniform multipass pumping, laser operation and effective cooling.

21. In constructing said pump head as a laser rod pump head by use of said fourth multipass formation as recited in claim 9, further comprising the steps of
   A. making a laser rod means of said laser medium means which has a lasing axis and a transverse plane perpendicular to said lasing axis;
   B. constructing an optical duct means and a hollow means with two end cap assemblies to form said double-layer reflector means, wherein the cross-sectional outline of said optical duct means matches to said hollow means geometrically in said transverse plane with an interstice, said hollow means has a high optical reflectivity for said pumping light, whereby the unabsorbed said pumping light internally impinges upon an air-to-solid interface from inside of said optical duct means, said pumping light which has angles of incidence larger than the critical angle is going to be totally reflected by the outer surfaces of said optical duct means due to total-internal-reflection, and the remaining pumping light which has small angles of incidence and does not meet TIR condition, is repetitively reflected by said hollow means, whereby confining and reflecting said pumping light within said pump head during the entire pumping process;

C. constructing said laser rod means to be surrounded by a cooling channel means and then received in by said optical duct means, said pump head is named the Solid Double-Layer Reflector Pump Head; and D. optimizing the optical and physics properties and performance parameters of said pump head in effective operative way, including the profile, size, geometric shape, location and orientation, refractive index and dopant concentration, whereby facilitating efficient and uniform multipass multi-pass pumping, laser operation and effective cooling.

22. In constructing said pump head by use of said forth multipass formation as recited in claim 9, further comprising the steps of A. making a laser rod means of said laser medium means which has a lasing axis and a transverse plane perpendicular to said lasing axis;

B. constructing said laser rod means to be surrounded by an optical duct means which is in the shape of a cylinder;

C. constructing a hollow means and an optical inner sleeve means with two end cap assemblies; and D. filling a fluid into said pump head between said optical duct means and said optical inner sleeve means; wherein (1) said hollow means includes at least a first section having a longitudinal axis and a second section having a longitudinal axis; said first section longitudinal axis is parallel to and off-set from said second section longitudinal axis, (2) said hollow means has a high optical reflectivity for said pumping light, (3) said inner sleeve means is received in said hollow means, and its cross-sectional outline matches to said hollow means geometrically in said transverse plane with an interstice, whereby forming said double-layer reflector means, (4) the unabsorbed said pumping light internally impinges upon an air-to-solid interface from inside of said inner sleeve means, said pumping light which has angles of incidence larger than the critical angle is going to be totally reflected by the outer surfaces of said inner sleeve means due to total-internal-reflection, and the remaining pumping light which has small angles of incidence and does not meet TIR condition, is repetitively reflected by said hollow means, (5) said optical duct means is received in said inner sleeve means, mounted at the center area of said hollow means and surrounded by said fluid so as to form a step-index structure, said pump head is named the Dube Step-Index Double-Layer Reflector Pump Head, and (6) optimizing the optical and physics properties and performance parameters of said pump head in effective operative way, including the profile, size, geometric shape, location and orientation, refractive index and dopant concentration, whereby facilitating efficient and uniform multipass multipass pumping, laser operation and effective cooling.

23. In constructing said pump head by use of said fifth multipass formation as recited in claim 9, further comprising the steps of A. constructing a spatial filter means in order to form said spatial filter structure, consisting of an lens pair with AR coating, and an HR coated beam block means combined with an aperture, wherein (1) said spatial filter means is at least an one-dimensional spatial filter, (2) said lens pair serves as a beam expander or reducer likewise, (3) said AR and HR coating is at the pump wavelength, and (4) said aperture is served as said pump entrance means;

B. collimating said pumping light at least in one-dimension before entering said spatial filter means;

C. passing said collimated pumping light through said spatial filter means; and

D. making an arrangement in order to pump said laser medium means, said arrangement is selected from group including (1) a first arrangement, which additionally comprises the steps of placing a mirror properly tilted to reflect pumping light which is coming from said spatial filter means, wherein a) said laser medium means is a laser slab and placed between said beam block means and said mirror, b) said pumping light travels back and forth between said beam block means and said mirror, c) the backward-going pumping light reflected by said mirror has a small deviation from the original path and then are effectively blocked off and re-reflected by beam block means, d) said pumping light goes through said laser slab means two roundtrips, and e) said mirror is selected from group including i) a single mirror, and ii) a mirrored surface on said laser slab; and (2) a second arrangement, which additionally comprises the steps of placing a corner reflector means to reflect pumping light which is coming from said spatial filter means, and further constructing a noncircular-profile hollow reflector by use of said corner reflector means, said beam block means and a mirror means, whereby confining said pumping light substantially and enhance multipass pumping, wherein a) said laser medium means is a laser rod mounted within said corner reflector means properly;

b) said lens pair is a cylindrical lens pair, serving as a one-dimensional beam expander or reducer likewise, c) said aperture is a line-shaped opening, d) said corner reflector means reflects said pumping light toward said laser rod from four different directions of the top, back, front, and bottom, e) the backward-going pumping light reflected by said corner reflector means has a detour from the original path and then are effectively blocked off and re-reflected by said beam block means, and f) said pumping light travels back and forth between said beam block means and said corner reflector means which reflect multiple passes of said pump light through said laser rod, said pump head is named the Noncircular-Profile Corner Reflector Pump Head.

24. In constructing said pump head by use of said fifth multipass formation as recited in claim 9, further comprising the steps of
 A. constructing a semi-spatial filter means in order to form said spatial filter structure, consisting of a cylindrical lens with AR coating, and an HR coated beam block means combined with an aperture, wherein
  (1) said AR and HR coating is at pumping light wavelength, and
  (2) said aperture is a line-shaped opening, and served as said pump entrance means;
 B. passing said pumping light through said semi-spatial filter means; and
 C. making an arrangement in order to pump said laser medium means, said arrangement is selected from group including
  (1) a first arrangement, which additionally comprises the steps of placing a mirror properly tilted to reflect pumping light which is coming from said semi-spatial filter means, wherein
   a) said laser medium means is a laser slab and placed between said beam block means and said mirror,
   b) said pumping light travels back and forth between said beam block means and said mirror,
   c) the backward-going pumping light reflected by said mirror has a small deviation from the original path and then are effectively blocked off and re-reflected by beam block means,
   d) said pumping light goes through said laser slab two roundtrips, and
   e) said mirror is selected from group including i) a single mirror, and ii) a mirrored surface on said laser slab; and
  (2) a second arrangement, which additionally comprises the steps of placing a corner reflector means to reflect pumping light which is coming from said semi-spatial filter means, and further constructing a noncircular-profile hollow reflector by use of said corner reflector means, said beam block means and a mirror means, whereby confining said pumping light substantially and enhance multipass pumping, wherein
   a) said laser medium means is a laser rod mounted within said corner reflector means properly;
   b) said corner reflector means reflects said pumping light toward said laser rod from four different directions of the top, back, front, and bottom,
   c) the backward-going pumping light reflected by said corner reflector means has a detour from the original path and then are effectively blocked off and re-reflected by said beam block means, and
   d) said pumping light travels back and forth between said beam block means and said corner reflector means which reflect multiple passes of said pump light through said laser rod, said pump head is named the Noncircular-Profile Corner Reflector Pump Head.

25. In the method of claim 9, wherein said laser medium means is a laser slab or laser rod, in order to realize high power operation at a minor laser line desired particularly for producing over 2-W CW red or blue coherent light via intracavity SHG, further comprising the steps of A. setting a desired output wavelength for said minor laser line;
 B. constructing a linear laser cavity; wherein
  (1) said laser cavity includes at least two cavity mirrors, and
  (2) said pump head is placed within said laser cavity for lasing at said desired output wavelength;
 C. producing a gain region with intense pumping within said laser medium means;
 D. maximizing the cavity Q factor of said laser cavity for said desired output wavelength;
 E. minimizing the cavity Q factor of said laser cavity for undesired laser lines;
 F. locating said gain region at an optimum position, at one of ½ L, ¼ L, ¾ L, ⅙ L and ⅚ L, wherein i) L is designated as the optical length of said laser cavity, ii) within said optimum position there would be the highest possibility for a pair of longitudinal modes with a spatially anti-correlated relationship to take place and to occupy most of said gain region spatially, whereby minimizing spatial hole burning and restraining said gain region available to undesired major laser lines;
 G. making said laser cavity have a large enough optical length L to prolong an out of phase region to best match said gain region, wherein within the out of phase region two peaks in the standing wave patterns corresponding to the pair of anti-correlated longitudinal modes are out of phase;
 H. setting said gain region have a limited length less than 3-cm to best match the out of phase region, whereby restraining said gain region available to undesired major laser lines;
 I. keeping the dopant concentration of said laser medium means as low as possible while keeping the absorption efficiency of said laser medium means high for said pumping light;
 J. optionally employing the gain sweeping technique to produce a continuous oscillatory change in the optical length of said laser cavity to cause the standing wave pattern of said desired output wavelength to oscillate as a traveling wave along said cavity optical path such that the standing wave pattern moves through at least the entire gain region for extracting substantially all of the gain from said gain region, whereby only said desired output wavelength is lasing steadily; and
 K. Optionally inserting a nonlinear crystal means into said laser cavity for intracavity frequency conversion.

26. In a method in configuring a multipass apparatus by means of an optical TIR-guide disk reflector for thin-disk lasers or multipass light amplifiers, and for optical and spectral detection, including particle detection, comprising the steps of
 A. by use of a circular or noncircular disk-shaped optical duct means, constructing said reflector to have parallel two main surfaces perpendicular to an axis and an outer surface parallel to said axis, wherein said two main surfaces are exactly same and their size is larger than the thickness between them;
 B. entering a light toward the center area of said reflector, wherein
  (1) said optical duct means is optically clear to said light, and
  (2) said light is directed parallel to and confined between said two main surfaces via total-internal-reflection and undergoes multiple reflections via said outer surface; and C. in order to confine and reflect said light from said outer surface, selecting an approach from the group including:
   (1) first approach, which additionally comprises the steps of making an HR coating selectively covering predetermined portions of said outer surface, and
   (2) second approach, which additionally comprises the steps of fitting said optical disk into a heat sink chamber means, whose inwardly facing wall matches to said outer surface geometrically and has a gold coating;

whereby said light, once entering said multipass apparatus and said reflector, multiply and repeatedly passes through the center area of said reflector.

27. In the method of claim 26, in order to making a thin-disk laser pump head of said multipass apparatus to have a multipass pumping geometry and to produce and amplify coherent light along said axis direction, further comprising the steps of
   A. selecting a pump source means to provide said light as the pumping light, from the group including a diode bar means and a multiple-pump-source means having a single pump wavelength or multiple pump wavelengths, to provide the relevant pumping light for pumping;
   B. setting a coupling manner to couple said pumping light to said reflector for pumping, wherein said coupling manner includes optical fiber coupling;
   C. constructing a laser chip means to be optically integrated with or embedded into said optical duct means, wherein
      (1) said optical duct means is transparent at both the pump and laser wavelengths and its refractive index is the same as or close to that of said laser chip means, and
      (2) an optical joint approach is used for the joint of said laser chip means and said optical duct means, which is selected from the group including, i) interposing a high temperature optical-grade epoxy or cement, ii) diffusion-bonding, and iii) frit;
   D. selecting the shape of said two main surfaces from the group including
      (1) a circular shape, wherein i) said HR coating is at the pumping light wavelength and ii) at least one AR coated narrow spectral opening or uncoated narrow opening on said outer surface for inputting the pumping light, said optical duct means is made from the group including
         a) regular optical duct, said pump head is named the TIR-Guide Disk Pump Head, wherein said laser chip is eccentrically located about said optical duct means,
         b) graded-index optical duct, wherein said optical duct means has a variable refractive index in the radial direction, whereby said pumping light, once entering, to be refocussed by refraction into the center area of said pump head periodically and leading to a large acceptance cone, said pump head is named the Graded-Index TIR-Guide Disk Pump Head, and
         c) step-index optical duct, wherein said optical duct means has two sleeves with a predetermined radial extent in which the inner sleeve has a lower refractive index than that of the outer sleeve appropriately, whereby said pumping light, once entering, to be continually converged to the center area of said pump head and leading to a large acceptance cone, said pump head is named the Step-Index TIR-Guide Disk Pump Head, and
      (2) a non-circular shape, said pump head is named the Noncircular-Profile TIR-Guide Disk Pump Head, wherein i) said HR coating is at the pumping light wavelength, and ii) at least one AR coated narrow spectral opening or uncoated narrow opening on said outer surface for inputting the pumping light;
   E. conductively cooling said laser chip means surrounded by said optical disk; wherein i) one side of said optical disk is in thermal connect with an HR mirror or mirrored surface, ii) said mirror has thin substrate with high thermal conductivity, and iii) said HR mirror or said mirrored surface serves as an end or fold mirror for laser operations; and
   F. optimizing the optical and physics properties and performance parameters of said pump head in effective operative way, including the profile, size, geometric shape, location and orientation, refractive index and dopant concentration, whereby facilitating efficient and uniform multipass pumping, laser operation and effective cooling.

28. In the method of claim 26, in order to making a multipass light amplifier of said multipass apparatus to amplify coherent light, further comprising the steps of
   A. making said light as a signal input;
   B. selecting a pump source means to provide a relevant pumping light to pump a laser chip means in order to amplify said signal input;
   C. constructing said laser chip means to be surrounded by and integrated with said optical duct means, wherein
      (1) said optical duct means is transparent at both said signal input and said pumping light and its refractive index is the same as or close to that of said laser chip means, and
      (2) a joint approach is used for the joint of said laser chip means and said optical duct means, which is selected from the group including, i) interposing a high temperature optical-grade epoxy or cement, ii) diffusion-bonding, and iii) frit;
   D. constructing said reflector as an optical container to confine said signal input and optionally said pumping light, wherein
      (1) the shape of said two main surfaces has a circular shape,
      (2) said signal input, once entering, is confined between said two main surfaces and undergoes multiple reflections in consecutive order clockwise or counterclockwise, and multiple passes through said laser chip means whereby being amplified,
      (3) said signal input is amplified until outputed from an exit on said outer surface where is an AR coated opening, and
      (4) said HR coating is at said signal input wavelength and an opening on said outer surface for inputting said signal input;
   E. setting a coupling manner to couple said pumping light to said laser chip means for pumping, from the group including
      (1) a first coupling manner to be used as an axial pumping, wherein said pumping light pumps said laser chip means along said axis, and
      (2) a second coupling manner to be used as an centripetal pumping, wherein said pumping light is coupled to said outer surface, after entering, undergoes multiple reflections and multiple passes through said laser chip means until it is substantially absorbed, said HR coating is also at said pumping light wavelength and at least one AR coated narrow spectral opening or uncoated narrow opening on said outer surface for inputting said pumping light; and F. selecting an output manner to output the amplified signal input.

29. In the method of claim 26, in order to making a multipass laser intensified detector of said multipass apparatus for optical or spectral detection, including multipass absorption and particle detection, further comprising the steps of A. making said light as a probe laser beam;

B. making the shape of said two main surfaces to have a circular shape with a center hole, wherein said center hole is a detecting region for said detection;

C. constructing said disk-shaped optical duct means as an optical container to confine said probe laser beam, wherein said probe laser beam, once entering, is confined between said two main surfaces and undergoes multiple reflections in consecutive order clockwise or counterclockwise, and multiple passes through said detecting region for said detection;

D. placing a path compensating ring with a proper refractive index at said center hole so as to correct optical path distortion if there is an important difference of the refractive index between said optical duct means and said detecting region, wherein said ring has an anti-reflection coating for said probe laser beam preferably;

E. setting a detected sample, including gas, liquid and particle, within said detecting region properly; and F. arranging a detecting means and a detecting approach for said detection.

30. In a method by means of minimizing spatial hole burning effect in constructing a solid-state laser with high-power operation at a desired minor laser line, particularly for producing over 2-W CW red or blue coherent light via intracavity SHG, comprising the steps of A. setting a desired output wavelength for said minor laser line;

B. selecting a pump source means, from the group consisting of a diode bar means and a multiple-pump-source means having a single pump wavelength or the multiple pump wavelengths, to provide a relevant pumping light for pumping;

C. selecting a laser medium means from the group including laser chips, laser slabs and laser rods;

D. constructing a pump head for pumping, housing and cooling said laser medium means, capable of realizing intense uniform pumping;

E. setting a linear laser cavity; wherein
(1) said laser cavity includes at least two cavity mirrors, and
(2) said pump head is placed within said laser cavity for lasing at said desired output wavelength;

F. producing a gain region with intense pumping within said laser medium means;

G. maximizing the cavity Q factor of said laser cavity for said desired output wavelength;

H. minimizing the cavity Q factor of said laser cavity for undesired laser lines;

I. locating said gain region at an optimum position, at ½ L, ¼ L, ¾ L, ⅙ L and ⅚ L, wherein i) L is designated as the optical length of said laser cavity, ii) within said optimum position there would be the highest possibility for a pair of longitudinal modes with a spatially anti-correlated relationship to take place and to occupy most of said gain region spatially, whereby minimizing spatial hole burning and restraining said gain region available to undesired major laser lines;

J. making said laser cavity have a large enough optical length L to prolong an out of phase region to best match said gain region, wherein within the out of phase region two peaks in the standing wave patterns corresponding to the pair of anti-correlated longitudinal modes are out of phase;

K. setting said gain region have a limited length to best match the out of phase region, whereby restraining said gain region available to undesired major laser lines;

L. keeping the dopant concentration of said laser medium means as low as possible while keeping the absorption efficiency of said laser medium means high for said pumping light;

M. inserting a nonlinear crystal means into said laser cavity for intracavity frequency conversions, wherein said nonlinear crystal means is selected from the group including
(1) a regular nonlinear crystal means, and
(2) a periodically poled crystal means with quasi-phase-matching; and N. optionally employing the gain sweeping technique to produce a continuous oscillatory change in the optical length of said laser cavity to cause the standing wave pattern of said desired output wavelength to oscillate as a traveling wave along said cavity optical path such that the standing wave pattern moves through at least the entire gain region for extracting substantially all of the gain from said gain region, whereby only said desired output wavelength is lasing steadily.

* * * * *